United States Patent
Itagaki et al.

(10) Patent No.: US 10,362,601 B2
(45) Date of Patent: Jul. 23, 2019

(54) INFORMATION PROCESSING DEVICE

(71) Applicant: SONY CORPORATION, Tokyo (JP)

(72) Inventors: Takeshi Itagaki, Saitama (JP); Tomoya Yamaura, Tokyo (JP); Kazuyuki Sakoda, Chiba (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 41 days.

(21) Appl. No.: 15/323,824

(22) PCT Filed: May 8, 2015

(86) PCT No.: PCT/JP2015/063345
§ 371 (c)(1),
(2) Date: Jan. 4, 2017

(87) PCT Pub. No.: WO2016/006311
PCT Pub. Date: Jan. 14, 2016

(65) Prior Publication Data
US 2017/0171888 A1     Jun. 15, 2017

(30) Foreign Application Priority Data

Jul. 11, 2014 (JP) ................................ 2014-142950
Jan. 8, 2015 (JP) ................................ 2015-002478
Jan. 8, 2015 (JP) ................................ 2015-002479

(51) Int. Cl.
*H04W 74/08* (2009.01)
*H04L 29/06* (2006.01)
(Continued)

(52) U.S. Cl.
CPC ............. *H04W 74/08* (2013.01); *H04L 69/22* (2013.01); *H04W 72/0446* (2013.01);
(Continued)

(58) Field of Classification Search
CPC ..... H04W 80/04; H04W 88/06; H04W 88/08; H04W 84/18; H04L 29/06
See application file for complete search history.

(56) References Cited

U.S. PATENT DOCUMENTS

| | | | |
|---|---|---|---|
| 5,220,564 A | 6/1993 | Tuch et al. | |
| 8,509,771 B2 * | 8/2013 | Iwata | H04W 48/08 |
| | | | 455/435.1 |

(Continued)

FOREIGN PATENT DOCUMENTS

| | | |
|---|---|---|
| JP | 6-29981 A | 2/1994 |
| JP | 2001-144671 A | 5/2001 |

(Continued)

OTHER PUBLICATIONS

Extended European Search Report dated Feb. 13, 2018 in European Patent Application No. 15819533.9. citing documents AO through AQ therein, 7 pages.

(Continued)

*Primary Examiner* — Gbemileke J Onamuti
*Assistant Examiner* — Sanjay K Dewan
(74) *Attorney, Agent, or Firm* — Xsensus LLP

(57) ABSTRACT

To efficiently use radio resources.
An information processing device is an information processing device that receives a packet transmitted from another information processing device using wireless communication. The information processing device is an information processing device that includes a control unit. The control unit included in the information processing device performs control such that one packet detection condition is selected to be used from a plurality of packet detection conditions in regard to a plurality of packets transmitted from the other information processing device using wireless communication. The control unit included in the information processing device performs control such that one reception (Continued)

operation is selected to be performed from a plurality of reception operations in regard to a plurality of packets transmitted from the other information processing device using wireless communication.

20 Claims, 51 Drawing Sheets

(51) Int. Cl.
*H04W 84/12* (2009.01)
*H04W 72/04* (2009.01)
*H04L 29/08* (2006.01)

(52) U.S. Cl.
CPC ... *H04W 74/0808* (2013.01); *H04W 74/0816* (2013.01); *H04W 84/12* (2013.01); *H04L 67/10* (2013.01)

(56) References Cited

U.S. PATENT DOCUMENTS

| | | | | |
|---|---|---|---|---|
| 8,743,722 | B2* | 6/2014 | Miura | H04J 11/0023 370/252 |
| 2004/0132415 | A1 | 7/2004 | Furukawa | |
| 2007/0242621 | A1 | 10/2007 | Nandagopalan et al. | |
| 2009/0122926 | A1 | 5/2009 | Azenkot et al. | |
| 2009/0271512 | A1* | 10/2009 | Jorgensen | H04L 1/20 709/224 |
| 2010/0020711 | A1 | 1/2010 | Horisaki et al. | |
| 2011/0014910 | A1 | 1/2011 | Yonge, III et al. | |
| 2012/0082056 | A1* | 4/2012 | Horisaki | H04L 12/413 370/252 |
| 2015/0131555 | A1 | 5/2015 | Lee et al. | |
| 2015/0373639 | A1* | 12/2015 | Zhou | H04W 52/02 370/311 |

FOREIGN PATENT DOCUMENTS

| | | |
|---|---|---|
| JP | 2004-207921 A | 7/2004 |
| JP | 2008-42383 A | 2/2006 |
| JP | 2007-142722 A | 6/2007 |
| JP | 2010-28750 A | 2/2010 |
| JP | 2010-118804 A | 5/2010 |
| WO | WO 2014/021836 A1 | 2/2014 |

OTHER PUBLICATIONS

Extended European Search Report dated Feb. 20, 2018 in European Patent Application No. 15818368.1, citing documents AA and AB therein. 8 pages.

International Search Report dated Jun. 2, 2015, in PCT/JP2015/063345 filed May 8, 2015.

Japanese Office Action dated Mar. 5, 2019 in Japanese Application No. 2016-532474.

Graham Smith, "Dynamic Sensitivity Control Practical Usage," IEEE 802.11-14/0779r0, Jun. 2014.

* cited by examiner

FIG. 7

EXAMPLE OF SHORT-DISTANCE PHYSICAL HEADER

| 301 | 302 | 303 | 304 | 305 | 306 |
|---|---|---|---|---|---|
| Preamble | SIGNAL (Link Strength Category Field = 1) | (Extension) | Service | MPDU | FCS | a

EXAMPLE OF LONG-DISTANCE PHYSICAL HEADER (INCLUDING LEGACY PHYSICAL HEADER)

| 301 | 302 | 303 | 304 | 305 | 306 |
|---|---|---|---|---|---|
| Preamble | SIGNAL (Link Strength Category Field = 0) | (Extension) | Service | MPDU | FCS | b

| L-STF | L-LTF | L-SIG | HT-SIG | HT-STF | HT-LTF | Service | MPDU | FCS |
|---|---|---|---|---|---|---|---|---| c

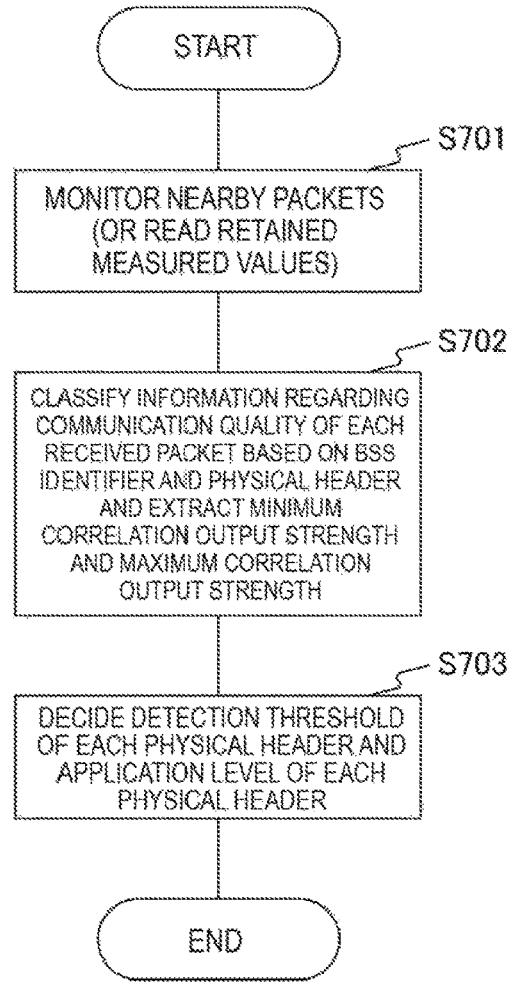

FIG. 11
EXAMPLE OF CORRELATOR (AUTOCORRELATION)
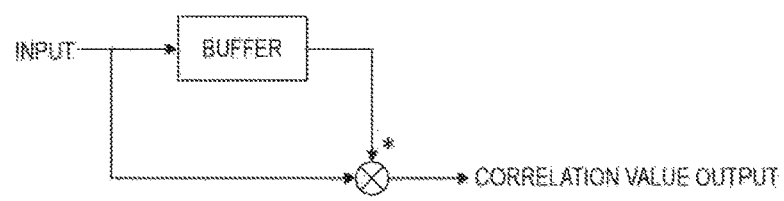
a
EXAMPLE OF CORRELATOR (CROSS-CORRELATION)
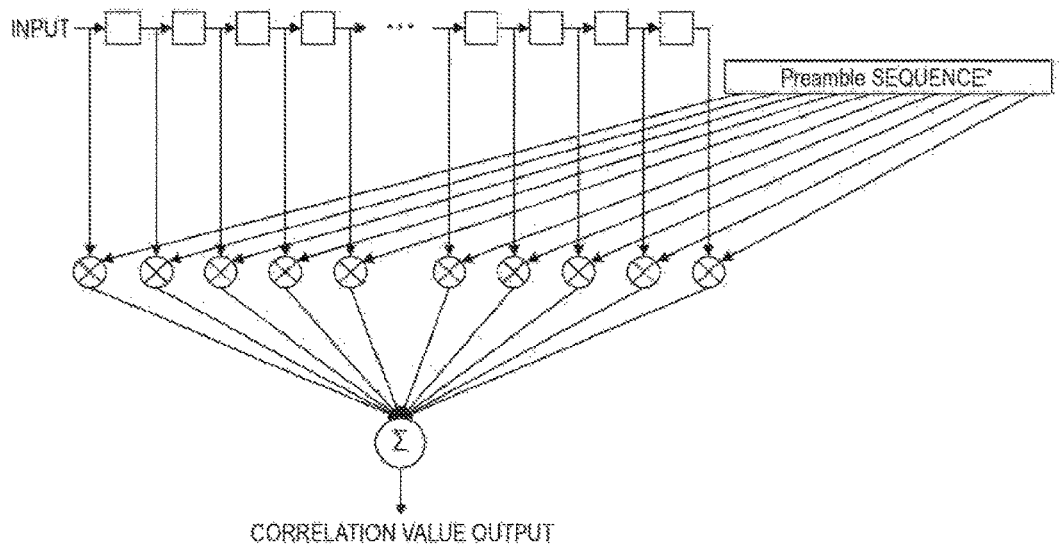
b

FIG. 20
EXAMPLE OF SHORT-DISTANCE PHYSICAL HEADER
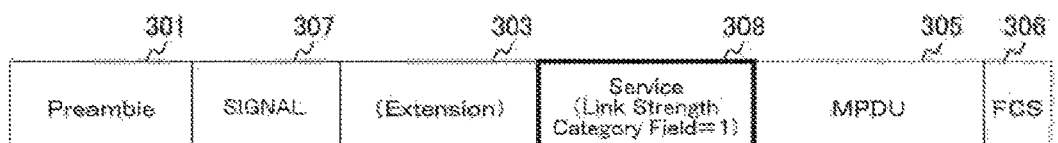
a
EXAMPLE OF LONG-DISTANCE PHYSICAL HEADER (INCLUDING LEGACY PHYSICAL HEADER)
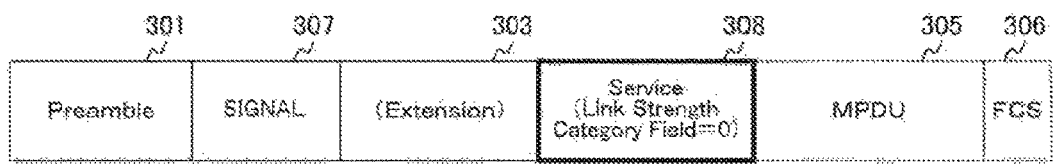
b
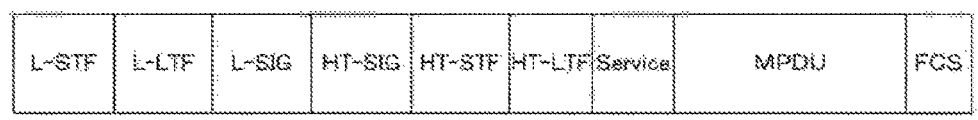
c

FIG. 21

EXAMPLE OF SHORT-DISTANCE PHYSICAL HEADER

| Preamble#1 | SIGNAL | (Extension) | Service | MPDU | FCS |
|---|---|---|---|---|---|
| 311 | 312 | 303 | 304 | 305 | 306 | a

EXAMPLE OF LONG-DISTANCE PHYSICAL HEADER (INCLUDING LEGACY PHYSICAL HEADER)

| Preamble#0 | SIGNAL | (Extension) | Service | MPDU | FCS |
|---|---|---|---|---|---|
| 311 | 312 | 303 | 304 | 305 | 306 | b

| L-STF | L-LTF | L-SIG | HT-SIG | HT-STF | HT-LTF | Service | MPDU | FCS |
|---|---|---|---|---|---|---|---|---| c

FIG. 27
EXAMPLE OF CORRELATOR (AUTOCORRELATION: PARTIALLY PROCESSED WITH SWITCH)
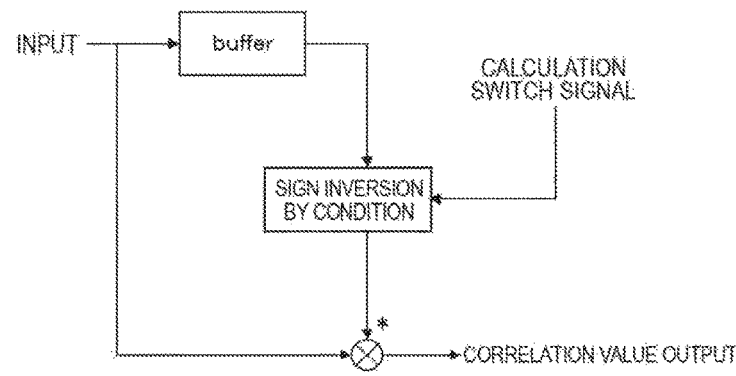
a
EXAMPLE OF CORRELATOR (CROSS-CORRELATION: PARTIALLY PROCESSED)
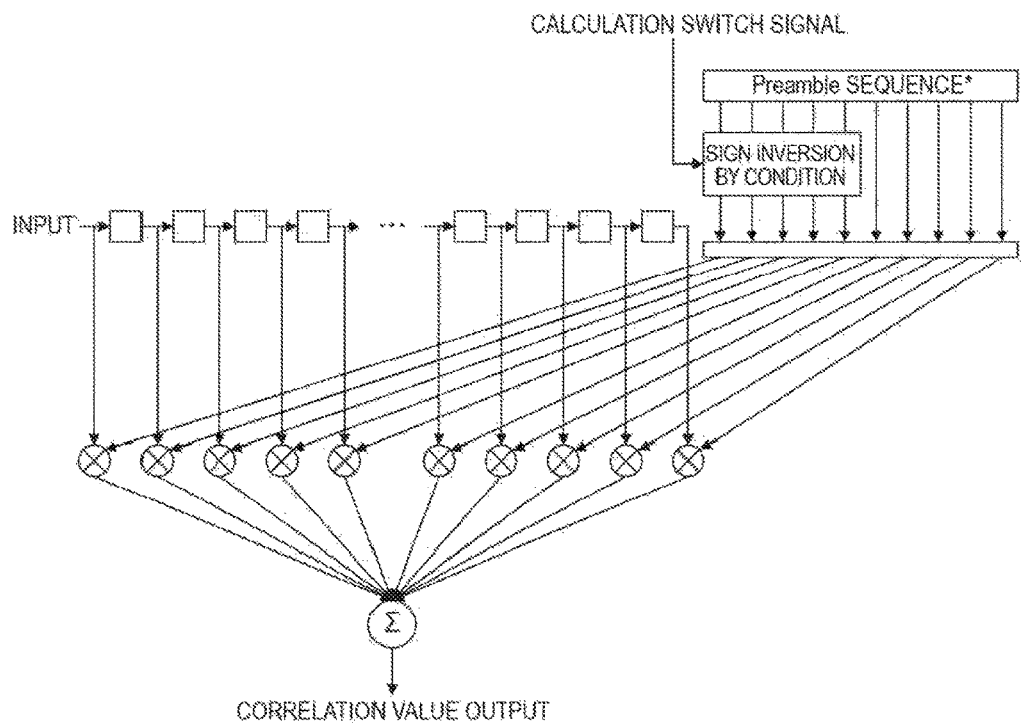
b

FIG. 31

EXAMPLE OF SHORT-DISTANCE PHYSICAL HEADER

| Preamble | SIGNAL (Link Strength Category=1, COLOR=1) | (Extension) | Service | MPDU | FCS |
|---|---|---|---|---|---|
| 301 | 331 | 303 | 304 | 305 | 306 | a

EXAMPLE OF LONG-DISTANCE PHYSICAL HEADER (INCLUDING LEGACY PHYSICAL HEADER)

| Preamble | SIGNAL (Link Strength Category=0, COLOR=1) | (Extension) | Service | MPDU | FCS |
|---|---|---|---|---|---|
| 301 | 331 | 303 | 304 | 305 | 306 | b

| L-STF | L-LTF | L-SIG | HT-SIG | HT-STF | HT-LTF | Service | MPDU | FCS |
|---|---|---|---|---|---|---|---|---| c

FIG. 38

PROCESS CLASSIFICATION TABLE

|  | NO ERROR IN CRC CALCULATION RESULT OF PHYSICAL HEADER | | | ERROR IN CRC CALCULATION RESULT OF PHYSICAL HEADER |
|---|---|---|---|---|
|  | COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| CORRELATOR OUTPUT STRENGTH IS LESS THAN DETECTION THRESHOLD CORRESPONDING TO Link Strength Category OF PHYSICAL HEADER | RECEPTION | RECEPTION STOP (IDLE) | RECEPTION STOP (IDLE) | RECEPTION STOP (ERROR) *IFS=EIFS |
| CORRELATOR OUTPUT STRENGTH IS EQUAL TO OR GREATER THAN DETECTION THRESHOLD CORRESPONDING TO Link Strength Category OF PHYSICAL HEADER | RECEPTION | RECEPTION STOP (BUSY) | RECEPTION | |

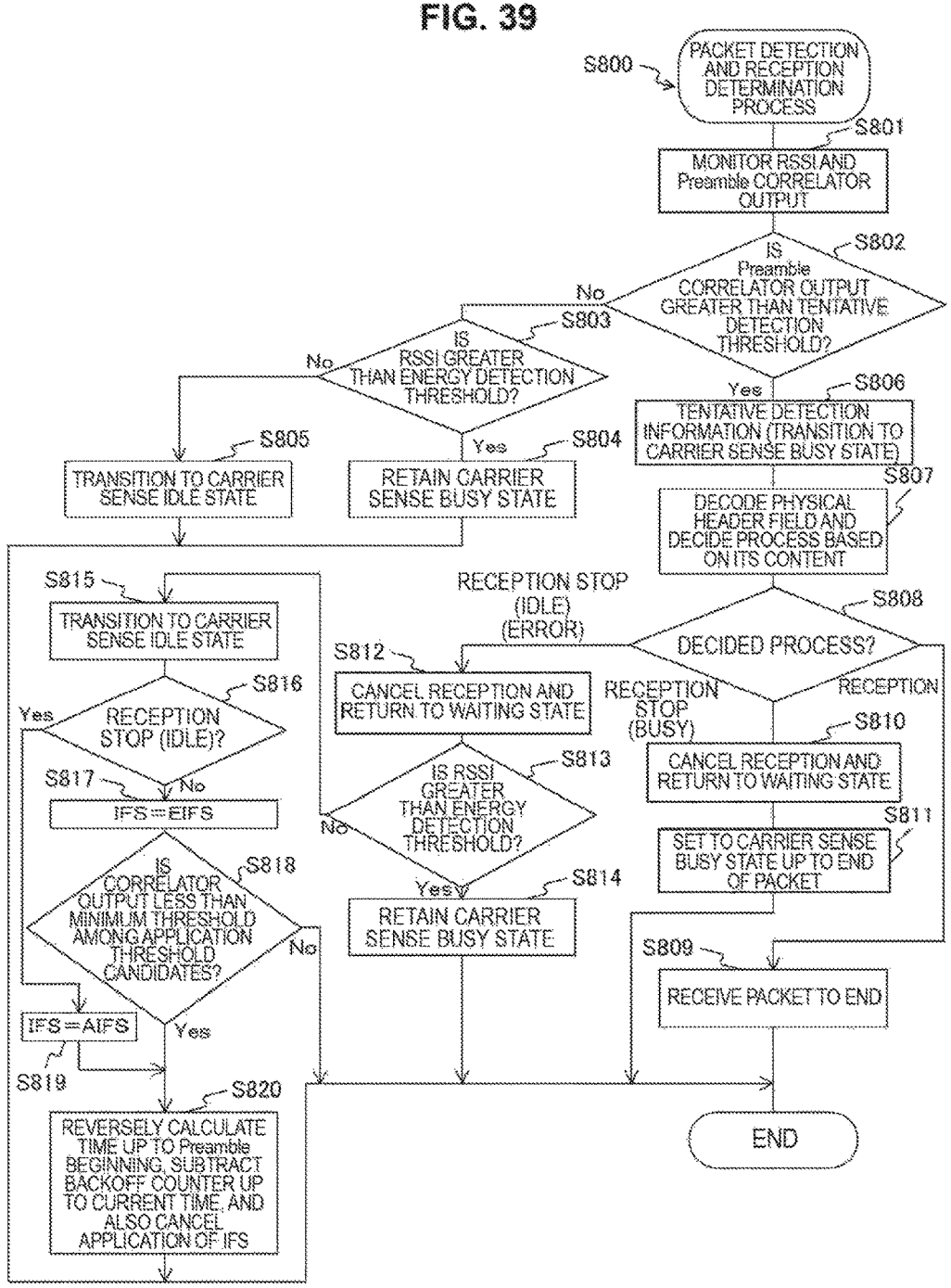

FIG. 40

EXAMPLE OF SHORT-DISTANCE PHYSICAL HEADER

| 311 | 351 | 303 | 304 | 305 | 306 |
|---|---|---|---|---|---|
| Preamble#1 | SIGNAL (COLOR=1) | (Extension) | Service | MPDU | FCS | a

EXAMPLE OF LONG-DISTANCE PHYSICAL HEADER (INCLUDING LEGACY PHYSICAL HEADER)

| 311 | 351 | 303 | 304 | 305 | 306 |
|---|---|---|---|---|---|
| Preamble#0 | SIGNAL (COLOR=1) | (Extension) | Service | MPDU | FCS | b

| L-STF | L-LTF | L-SIG | HT-SIG | HT-STF | HT-LTF | Service | MPDU | FCS |
|---|---|---|---|---|---|---|---|---| c

FIG. 41

PROCESS CLASSIFICATION TABLE

| NO ERROR IN CRC CALCULATION RESULT OF PHYSICAL HEADER ||| ERROR IN CRC CALCULATION RESULT OF PHYSICAL HEADER |
|---|---|---|---|
| COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| RECEPTION | RECEPTION STOP (BUSY) | RECEPTION | RECEPTION STOP (ERROR) *IFS=EIFS |

FIG. 43
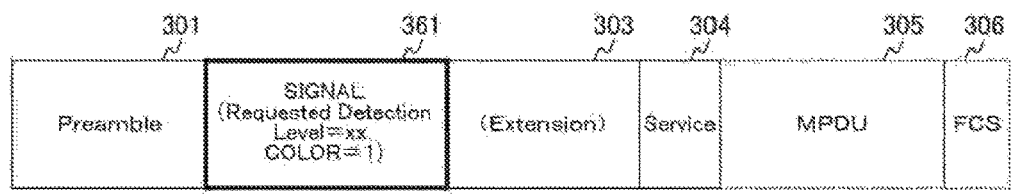
a
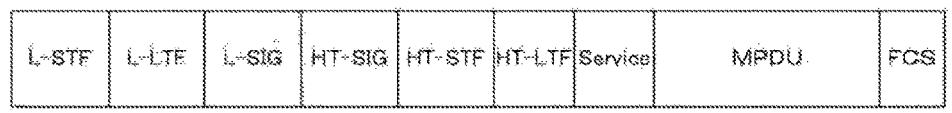
b
FIG. 44
Beacon Frame
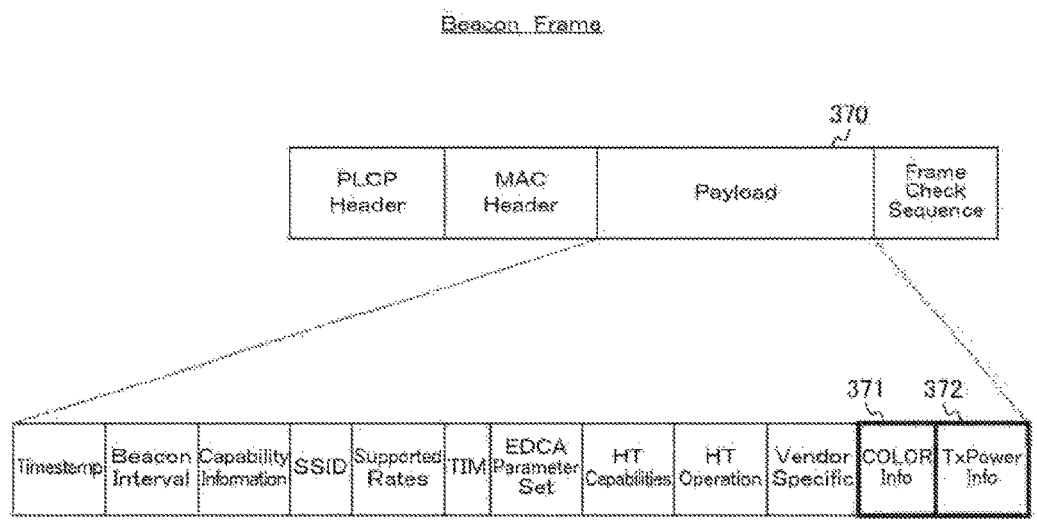

FIG. 46

PROCESS CLASSIFICATION TABLE

|  | NO ERROR IN CRC CALCULATION RESULT OF PHYSICAL HEADER | | | ERROR IN CRC CALCULATION RESULT OF PHYSICAL HEADER |
|---|---|---|---|---|
|  | COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| CORRELATOR OUTPUT STRENGTH IS LESS THAN Requested Detection Level IN PHYSICAL HEADER | RECEPTION | RECEPTION STOP (IDLE) | RECEPTION STOP (IDLE) | RECEPTION STOP (ERROR) *IFS=EIFS |
| CORRELATOR OUTPUT STRENGTH IS EQUAL TO OR GREATER THAN Requested Detection Level IN PHYSICAL HEADER | RECEPTION | RECEPTION STOP (BUSY) | RECEPTION | |

FIG. 47

EXAMPLE OF PHYSICAL HEADER IN TWELFTH EMBODIMENT

| 301 | 381 | 303 | 304 | 305 | 306 |
|---|---|---|---|---|---|
| Preamble | SIGNAL (COLOR=1) | (Extension) | Service | MPDU | FCS | a

| L-STF | L-LTF | L-SIG | HT-SIG | HT-STF | HT-LTF | Service | MPDU | FCS | b

FIG. 50

PROCESS CLASSIFICATION TABLE

| | NO ERROR IN CRC CALCULATION RESULT OF PHYSICAL HEADER | | | ERROR IN CRC CALCULATION RESULT OF PHYSICAL HEADER |
|---|---|---|---|---|
| | COLOR INFORMATION IN PHYSICAL HEADER IS SAME AS ASSOCIATED BSS | COLOR INFORMATION IN PHYSICAL HEADER IS DIFFERENT FROM ASSOCIATED BSS | NO COLOR INFORMATION | |
| CORRELATOR OUTPUT STRENGTH IS LOWER WITH RESPECT TO DETECTION THRESHOLD FOR OBSS PACKET | RECEPTION | RECEPTION STOP (IDLE) | RECEPTION STOP (IDLE) ONLY IN CASE OF PERMISSION OF RECEPTION STOP IN BSS  RECEPTION IN OTHER CASES | RECEPTION STOP (ERROR) *IFS=EIFS |
| CORRELATOR OUTPUT STRENGTH IS HIGHER WITH RESPECT TO DETECTION THRESHOLD FOR OBSS PACKET | RECEPTION | RECEPTION STOP (BUSY) | RECEPTION STOP (BUSY) ONLY IN CASE OF PERMISSION OF RECEPTION STOP IN BSS  RECEPTION IN OTHER CASES | |

INFORMATION PROCESSING DEVICE

TECHNICAL FIELD

The present technology relates to an information processing device, and particularly, to an information processing device that exchanges information using wireless communication.

BACKGROUND ART

In the related art, there are wireless communication technologies for exchanging information using wireless communication. For example, communication methods (for example, autonomous distributed wireless networks) of autonomously performing mutual connection between information processing devices that approach each other have been proposed. By using such communication methods, it is possible to exchange information between two information processing devices using wireless communication even when connection is not made with wired circuits.

In autonomous distributed wireless networks, carrier senses are adopted as adjustment methods of avoiding packet collision at the time of communication between information processing devices.

For example, wireless communication devices performing transmission suppression by dynamically setting carrier sense level thresholds using desired wave powers as standards have been proposed (for example, see Patent Literature 1).

CITATION LIST

Patent Literature

Patent Literature 1: JP 2007-142722A

SUMMARY OF INVENTION

Technical Problem

In the technologies of the above-described related art, even when transmission is possible at reception signal intensities equal to or less than the carrier sense level thresholds, transmission can be set not to be performed at the time of a desired-wave-to-interference power ratio at which transmission is erroneous.

However, when the number of information processing devices configured in a network increases, excessive transmission suppression occurs and there is a concern of transmission efficiency of an entire system deteriorating. Accordingly, it is important to efficiently use radio resources while maintaining communication quality.

It is desirable to provide the present technology capable of efficiently using radio resources.

Solution to Problem

The present technology has been made to solve the above problem. A first aspect of the present technology is an information processing device including a control unit configured to perform control such that one packet detection condition is selected to be used from a plurality of packet detection conditions and one reception operation is selected to be performed from a plurality of reception operations in regard to a plurality of packets transmitted from another information processing device using wireless communication, an information processing method thereof, and a program causing a computer to perform the method. Thus, it is possible to obtain an operational effect in which one packet detection condition is selected to be used from a plurality of packet detection conditions and one reception operation is selected to be performed from a plurality of reception operations in regard to a plurality of packets transmitted from another information processing device using wireless communication.

In the first aspect, the control unit may select a correlator to be applied based on a reception signal strength of an incoming packet and set a condition that an output of the selected correlator be great on the basis of a detection threshold as the packet detection condition. Thus, it is possible to obtain an operational effect in which a correlator to be applied is selected based on a reception signal strength of an incoming packet and a condition that an output of the selected correlator be great on the basis of a detection threshold is set as the packet detection condition.

In the first aspect, the control unit may select a detection threshold of a correlator output to be applied based on a reception signal strength of an incoming packet and set a condition that the correlator output be great on the basis of the selected detection threshold as the packet detection condition. Thus, it is possible to obtain an operational effect in which a detection threshold of a correlator output to be applied is selected based on a reception signal strength of a received packet and a condition that the correlator output be great on the basis of the selected detection threshold is set as the packet detection condition.

In the first aspect, when a plurality of correlators in which detection thresholds in antenna input conversion are different are disposed in parallel, the control unit may set a condition that one of the correlators be great on the basis of the corresponding detection threshold as the packet detection condition. Thus, it is possible to obtain an operational effect in which, when a plurality of correlators in which detection thresholds in antenna input conversion are different are disposed in parallel, a condition that one of the correlators be great on the basis of the corresponding detection threshold is set as the packet detection condition.

In the first aspect, when information regarding an identifier for identifying a network is present in a specific field subsequent to a preamble of an incoming packet and the identifier is different from an identifier of a network to which the information processing device belongs despite satisfaction of the packet detection condition, the control unit may stop reception of the packet and return to a waiting state. Thus, it is possible to obtain an operational effect in which, when information regarding an identifier for identifying a network is present in a specific field and the identifier is different from an identifier of a network to which the information processing device belongs despite satisfaction of the packet detection condition, reception of the packet is stopped and a state is returned to a waiting state.

In the first aspect, one or more preamble correlators may be further included. The control unit may set a condition that a correlator output in antenna input conversion be great on the basis of a detection threshold specified by content of a specific field subsequent to a preamble after tentative detection in each correlator as the packet detection condition. Thus, it is possible to obtain an operational effect in which a condition that a correlator output in antenna input conversion be great on the basis of a detection threshold specified by content of a specific field subsequent to a preamble after tentative detection in each correlator is set as the packet detection condition.

In the first aspect, the control unit may use a more relaxed condition than the packet detection conditions as a preamble detection condition in the tentative detection. Thus, it is possible to obtain an operational effect in which a more relaxed condition than the packet detection conditions is used as the preamble detection condition in the tentative detection.

In the first aspect, the control unit may stop subsequent reception when the packet detection condition is not satisfied after the tentative detection. Thus, it is possible to obtain an operational effect in which subsequent reception is stopped when the packet detection condition is not satisfied after the tentative detection.

In the first aspect, the content of the specific field may indicate a packet detection condition of a signal including the specific field. Thus, it is possible to obtain an operational effect in which the content of the specific field indicating a packet detection condition of a signal including the specific field is used.

In the first aspect, when information regarding an identifier for identifying a network is present in the specific field and the identifier is different from an identifier of a network to which the information processing device belongs despite satisfaction of the packet detection condition, the control unit may stop reception of the packet and return to a waiting state. Thus, it is possible to obtain an operational effect in which, when information regarding an identifier for identifying a network is present in the specific field and the identifier is different from an identifier of a network to which the self-device belongs despite satisfaction of the packet detection condition, reception of the packet is stopped and a state is returned to a waiting state.

In the first aspect, when information regarding an identifier for identifying a network is present in the specific field and the identifier is identical to an identifier of a network to which the information processing device belongs despite non-satisfaction of the packet detection condition, the control unit may continue a process of receiving the packet. Thus, it is possible to obtain an operational effect in which, when information regarding an identifier for identifying a network is present in the specific field and the identifier is identical to an identifier of a network to which the self-device belongs despite non-satisfaction of the packet detection condition, a process of receiving the packet is continued.

In the first aspect, when the packet detection condition is not satisfied and reception power strength of the plurality of packets is not greater than an energy detection threshold of carrier sense, the control unit may return to a waiting state and treat a wireless state as a vacant state. Thus, it is possible to obtain an operational effect in which, when the packet detection condition is not satisfied and reception power strength of the plurality of packets is not greater than an energy detection threshold of carrier sense, a state is returned to a waiting state and a wireless state is treated as a vacant state.

In the first aspect, when the packet detection condition is not satisfied and reception power strength of the plurality of packets is greater than an energy detection threshold of carrier sense, the control unit may prohibit transmission from the information processing device during a continuity period of the plurality of packets. Thus, it is possible to obtain an operational effect in which, when the packet detection condition is not satisfied and reception power strength of the plurality of packets is greater than an energy detection threshold of carrier sense, transmission from the information processing device during a continuity period of the plurality of packets is prohibited.

In the first aspect, when a frame which is destined for the information processing device and requests a reply is received, the control unit may transmit the reply. Thus, it is possible to obtain an operational effect in which, when a frame which is destined for the information processing device and requests a reply is received, the reply is transmitted.

In the first aspect, the control unit may use the packet detection condition in which a condition is most relaxed until a connection process with the other information processing device is completed. Thus, it is possible to obtain an operational effect in which the packet detection condition in which a condition is most relaxed is used until a connection process with the other information processing device is completed.

In the first aspect, the control unit may decide the plurality of packet detection conditions and physical header selection conditions corresponding to the packet detection conditions based on communication quality of communication with the other information processing device. Thus, it is possible to obtain an operational effect in which the plurality of packet detection conditions and physical header selection conditions corresponding to the packet detection conditions are decided based on communication quality of communication with the other information processing device.

In the first aspect, the control unit may perform control such that the plurality of packet detection conditions and the selection conditions are transmitted to the other information processing device using wireless communication. Thus, it is possible to obtain an operational effect in which the plurality of packet detection conditions and the selection conditions are transmitted to the other information processing device using wireless communication.

In the first aspect, the control unit may perform control such that an identifier for identifying a network to which the information processing device belongs is transmitted to the other information processing device using wireless communication. Thus, it is possible to obtain an operational effect in which an identifier for identifying a network to which the information processing device belongs is transmitted to the other information processing device using wireless communication.

In the first aspect, the control unit may decide the plurality of packet detection conditions and physical header selection conditions corresponding to the packet detection conditions based on information described in a packet transmitted from the other information processing device. Thus, it is possible to obtain an operational effect in which the plurality of packet detection conditions and physical header selection conditions corresponding to the packet detection conditions are decided based on information described in a packet transmitted from the other information processing device.

In the first aspect, when a packet which is destined for the information processing device and is received requests an instant reply, the control unit may add the same kind of physical header as the packet and transmit the reply. Thus, it is possible to obtain an operational effect in which, when a packet which is destined for the information processing device and is received requests an instant reply, a same kind of physical header as the packet is added and the reply is transmitted.

Advantageous Effects of Invention

According to the present technology, it is possible to obtain the advantageous effect in which radio resources can be efficiently used. Note that the advantageous effects described above are not necessarily limitative, and the advantageous effects described in the present disclosure may be achieved.

BRIEF DESCRIPTION OF DRAWINGS

FIG. 7 is a diagram showing an example of the format of a PPDU exchanged between the devices included in the communication system 10 according to the first embodiment of the present technology.

FIG. 9 is a diagram schematically showing an example of content of a setting information list 161 stored in a memory of an information processing device 200 according to the first embodiment of the present technology.

FIG. 10 is a flowchart showing an example of a processing order of a physical header parameter decision process by the information processing device 200 according to the first embodiment of the present technology.

FIG. 11 is a diagram showing an example of the configuration of a correlator included in the information processing device 200 according to the first embodiment of the present technology.

FIG. 20 is a diagram showing an example of the format of a PPDU exchanged between devices included in a communication system 10 according to a third embodiment of the present technology.

FIG. 21 is a diagram showing an example of the format of a PPDU exchanged between devices included in a communication system 10 according to a fourth embodiment of the present technology.

FIG. 27 is a diagram showing an example of the configuration of a correlator included in the information processing device 100 according to the sixth embodiment of the present technology.

FIG. 31 is a diagram showing an example of the format of a PPDU exchanged between the devices included in the communication system 10 according to a ninth embodiment of the present technology.

FIG. 38 is a diagram showing an example of a relation (process classification table) between a physical header and a process performed by the information processing device 100 according to the ninth embodiment of the present technology.

FIG. 39 is a flowchart showing a packet detection and reception determination process in the transmission and reception process by the information processing device 100 according to the ninth embodiment of the present technology.

FIG. 40 is a diagram showing an example of the format of a PPDU exchanged between devices included in a communication system 10 according to a tenth embodiment of the present technology.

FIG. 41 is a diagram showing an example of a relation (process classification table) between a physical header and a process performed by an information processing device 100 according to a tenth embodiment of the present technology.

FIG. 43 is a diagram showing an example of the format of a PPDU exchanged between devices included in a communication system 10 according to an eleventh embodiment of the present technology.

FIG. 44 is a diagram showing an example of a beacon frame format exchanged between the devices included in the communication system 10 according to the eleventh embodiment of the present technology.

FIG. 46 is a diagram showing an example of a relation (process classification table) between a physical header and a process performed by the information processing device 100 according to the eleventh embodiment of the present technology.

FIG. 47 is a diagram showing an example of the format of a PPDU exchanged between devices included in a communication system 10 according to a twelfth embodiment of the present technology.

FIG. 50 is a diagram showing an example of a relation (process classification table) between a physical header and a process performed by the information processing device 100 according to the twelfth embodiment of the present technology.

DESCRIPTION OF EMBODIMENT(S)

Hereinafter, modes for carrying out the present technology (hereinafter referred to as embodiments) will be described. The description will be made in the following order.
1. First embodiment (example in which Link Strength Category field is set up in SIGNAL field of IEEE 802.11 standard and packet detection condition is set according to information processing device)
2. Second embodiment (example in which no transmission is performed when packet detection determination result is only-energy detection and transmission suppression is set)
3. Third embodiment (example in which Link Strength Category field is set up in Service field of IEEE 802.11 standard)
4. Fourth embodiment (example in which plurality of preamble sequences with different detection thresholds are used on transmission side and preamble correlation detector applied by RSSI is switched on reception side)
5. Fifth embodiment (example in which physical header used by subordinate information processing device is selected by master station side)
6. Sixth embodiment (example in which plurality of PLCP preambles for discrimination are generated by processing part of original sequence rather than completely different sequences)
7. Seventh embodiment (example in which direct communication between slave stations is performed)
8. Eighth embodiment (example in which physical header parameters used between direct links are decided by slave station)
9. Ninth embodiment (example in which information regarding identifier of BSS is stored in signal field of IEEE 802.11 standard)
10. Tenth embodiment (example in which plurality of preamble sequences are defined and COLOR information is used together)
11. Eleventh embodiment (example in which physical header parameter decision process is omitted)
12. Twelfth embodiment (example in which field storing information regarding identifier of BSS in SIGNAL field of IEEE 802.11 standard is set up)
13. Application examples 1. First Embodiment

[Configuration Example of Communication System]

Figure 1:
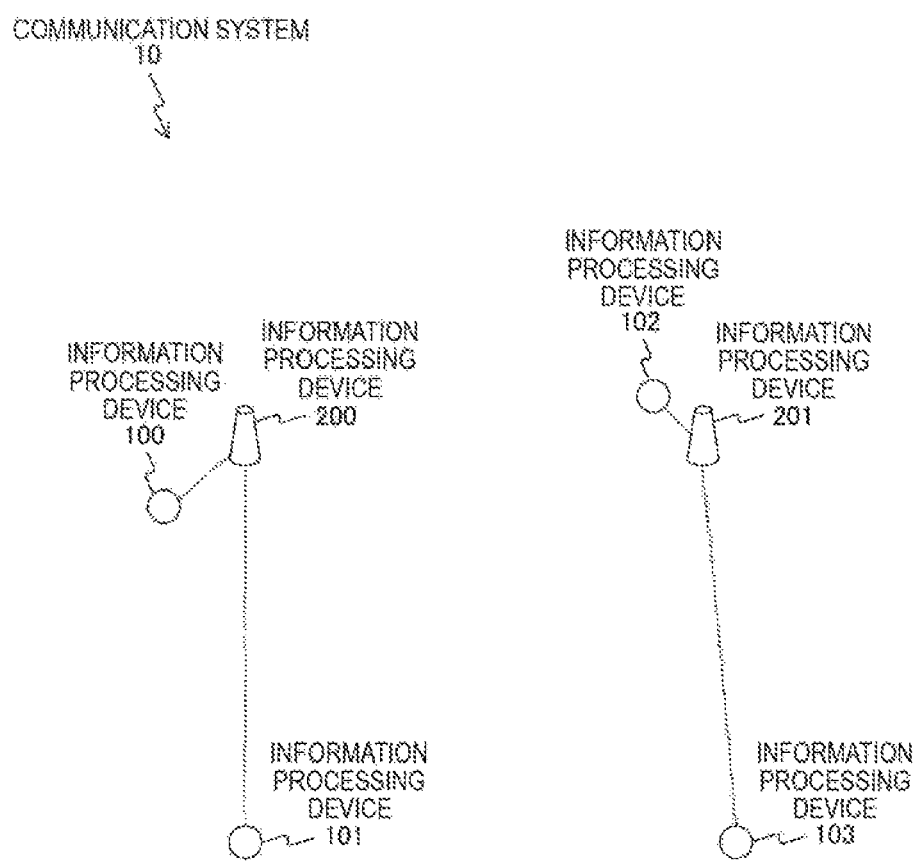
FIG. 1 is a diagram showing a system configuration example of a communication system 10 according to a first embodiment of the present technology.

FIG. 1 is a diagram showing a system configuration example of a communication system 10 according to a first embodiment of the present technology.

The communication system 10 is configured to include information processing devices 100 to 103 and information processing devices 200 and 201.

The information processing devices 100 to 103 are, for example, portable information processing devices that have a wireless communication function. Here, the portable information processing devices are, for example, information processing devices such as smartphones, mobile phones, or tablet terminals. The information processing devices 100 to 103 are assumed to have a communication function in conformity with, for example, a wireless local area network (LAN) standard of Institute of Electrical and Electronic Engineers (IEEE) 802.11. As the wireless LAN, for example, Wireless Fidelity (Wi-Fi), Wi-Fi Direct, or Wi-Fi CERTIFIED Miracast specification (technical specification name: Wi-Fi Display) can be used. Wireless communication using another communication scheme may be used.

The information processing devices 200 and 201 are, for example, fixed information processing devices that have a wireless communication function. Here, the fixed information processing devices are, for example, information processing devices such as access points or base stations. As in the information processing devices 100 to 103, the information processing devices 200 and 201 are assumed to have a communication function in conformity with, for example, a wireless LAN standard of IEEE 802.11. Wireless communication using another communication scheme may be used.

The information processing devices 200 and 201 are assumed to function as master stations and the information processing devices 100 to 103 are assumed to function as slave stations. That is, in the first embodiment of the present technology, a communication example between master and slave stations in a star type topology configured by the master and subordinate slave stations will be described. In the first embodiment of the present technology, a communication example in which a destination for transmission by subordinate slave stations is restricted to a master station will be described.

The information processing devices 100 and 102 and the information processing devices 200 and 201 are assumed to have specific functions (specific functions described in each embodiment of the present technology). Conversely, the information processing devices 101 and 103 are assumed to have no specific function. In this way, the information processing devices that have no specific function are referred to as legacy devices. The specific function will be described in each embodiment of the present technology. The legacy devices can be configured as, for example, information processing devices that have a communication function in conformity with a wireless LAN standard of IEEE 802.11a, IEEE 802.11g, IEEE 802.11n, or IEEE 802.11ac.

In the first embodiment of the present technology, a communication example between the devices when the information processing devices 100 and 101 are connected and the information processing devices 201 and 102 are connected will be described.

FIG. 1 shows an example in which the communication system 10 is configured of four slave stations (the information processing devices 100 to 103), but the number of slave stations (the information processing devices) is not limited to 4. That is, an embodiment of the present technology can also be applied to a communication system configured of three or five or more slave stations (information processing devices).

In a relation between two information processing devices performing communication, one of the information processing devices may serve as a master slave and the other information processing device may serve as a slave station. Connection between two information processing devices may be direct communication connection between slave stations.

Here, in an autonomous distributed wireless network, a scheme referred to as carrier sense is generally adopted as an adjustment structure for avoiding packet collision. The carrier sense is a scheme of monitoring a nearby wireless situation for a given time and confirming whether there is another information processing device performing transmission before performing transmission. When reception power equal to or greater than a threshold is detected during the confirmation, a wireless state is determined to be a busy state, a transmission operation is stopped, and thus the transmission is not performed.

In the carrier sense, there are two kinds of detection algorithms: preamble detection in which detection is performed through power comparison between correlator outputs of specific preambles and energy detection in which detection is performed through power comparison between received signals. In general, the two kinds of detection algorithms are used together. Hereinafter, the two kinds of detection algorithms are collectively referred to as the carrier sense in the description unless otherwise stated.

As described above, when the number of information processing devices in a network increases, there is a concern of excessive transmission suppression and a situation in which transmission efficiency of an entire system deteriorates in the above-described carrier sense scheme.

Here, an example of a positional relation in which such a situation arises will be described with reference to FIG. 1. In FIG. 1, there are two master stations (the information processing devices 200 and 201) and four slave stations (the information processing devices 100 to 103). In FIG. 1, the information processing devices 100 and 101 are connected to the information processing device 200 and the information processing devices 102 and 103 are connected to the information processing device 201 to perform communication with one another. In FIG. 1, connection relations between the devices are schematically indicated by dotted lines.

In FIG. 1, the information processing devices 100 to 103, 200, and 201 are assumed to be present in a positional relation in which transmission of all the information processing devices can be mutually detected by the carrier sense.

Here, for example, the information processing device 100 is assumed to perform transmission to the information processing device 200 and the information processing device 102 is assumed to perform transmission to the information processing device 201.

[Example of Carrier Sense Detection Range]

Figure 2:
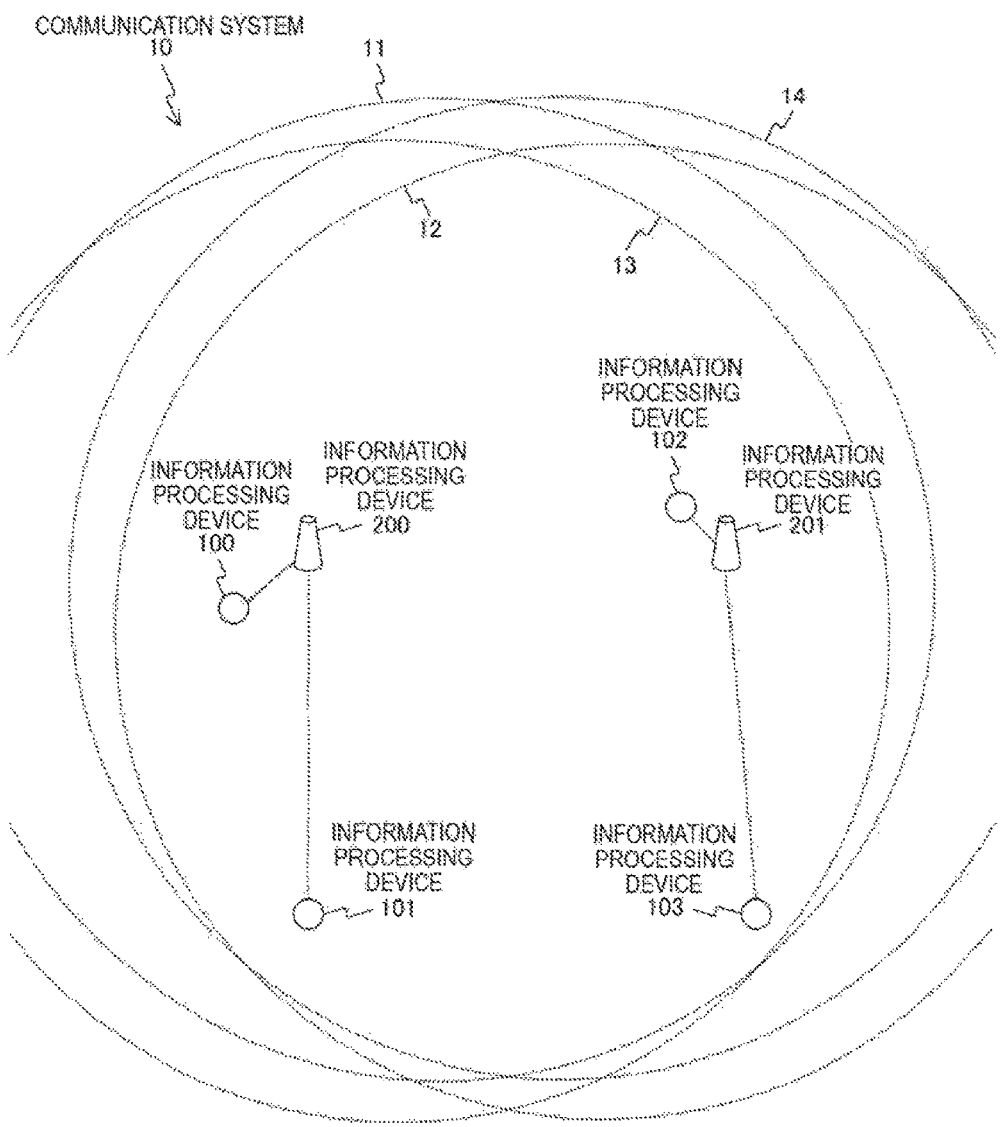
FIG. 2 is a diagram showing a system configuration example of the communication system 10 according to the first embodiment of the present technology.
Figure 3:
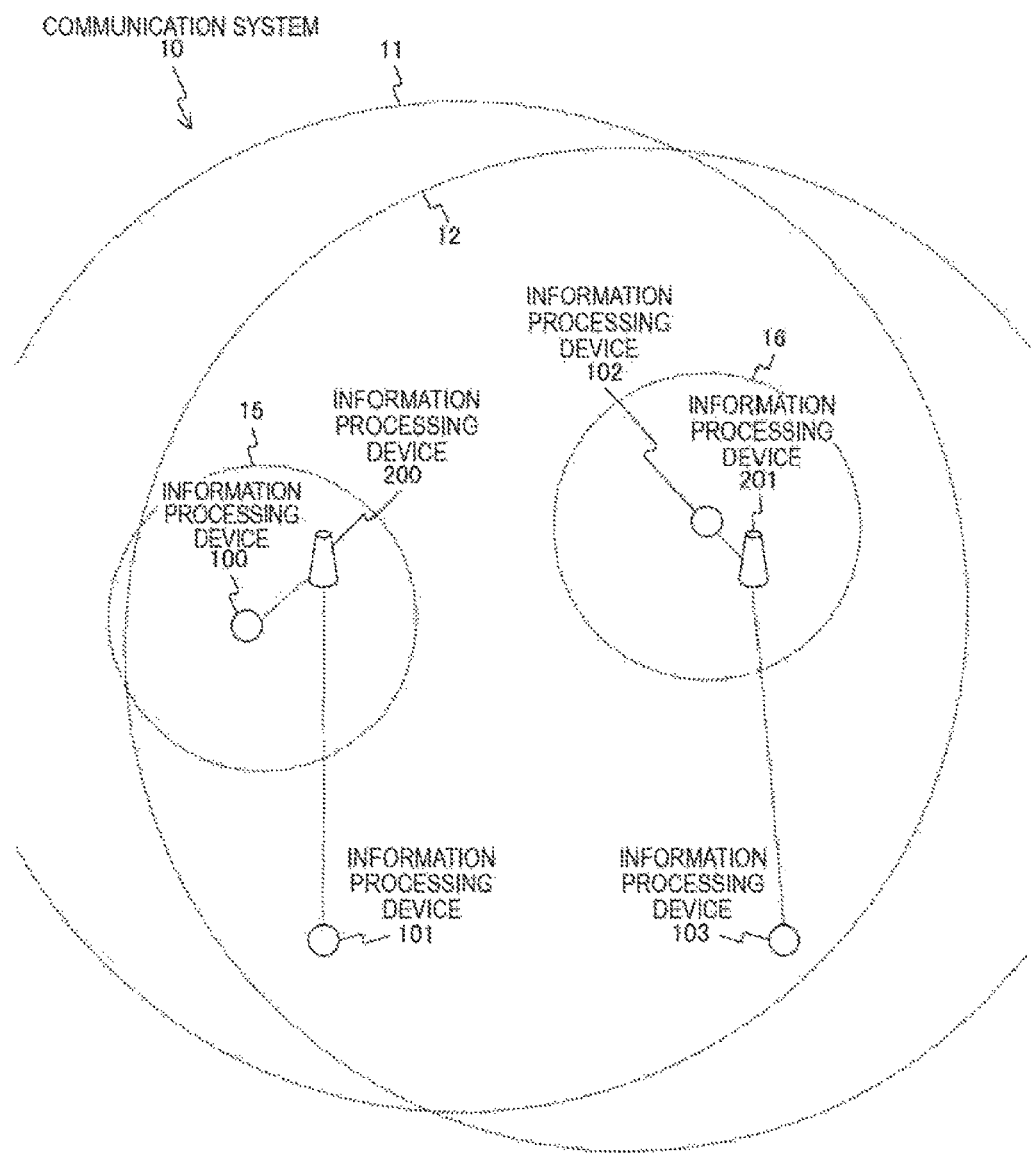
FIG. 3 is a diagram showing a system configuration example of the communication system 10 according to the first embodiment of the present technology.

FIGS. 2 and 3 are diagrams showing system configuration examples of the communication system 10 according to the first embodiment of the present technology. FIGS. 2 and 3 show examples in which carrier sense detection ranges of the information processing devices in the example shown in FIG. 1 overlap.

In FIGS. 2 and 3, carrier sense detection ranges 11 to 16 of the information processing devices 100, 102, 200, and 201 are schematically indicated by dotted circles.

Specifically, in FIGS. 2 and 3, the carrier sense detection range 11 indicates a carrier sense detection range of the information processing device 200 and the carrier sense detection range 12 indicates a carrier sense detection range of the information processing device 201.

In FIG. 2, the carrier sense detection range 13 indicates a carrier sense detection range of the information processing device 100 and the carrier sense detection range 14 indicates a carrier sense detection range of the information processing device 102.

In FIG. 3, the carrier sense detection range 15 indicates a carrier sense detection range of the information processing device 100 after the carrier sense detection range 13 shown in FIG. 2 is changed. The carrier sense detection range 16 indicates a carrier sense detection range of the information processing device 102 after the carrier sense detection range 14 shown in FIG. 2 is changed.

As described above, the carrier sense is an example of the adjustment structure for avoiding packet collision and is a scheme of performing transmission suppression according to whether there is another information processing device performing transmission. The carrier sense detection range is decided to correspond to a threshold used at the time of detection of a signal transmitted from another information processing device.

Here, for example, it is assumed that the information processing device 100 performs the carrier sense to perform transmission while the information processing device 102 performs transmission to the information processing device 201. For example, when the information processing device 100 detects the transmission of the information processing device 102, the transmission is suppressed, and thus the transmission may not be performed until the transmission of the information processing device 102 ends.

However, even when the information processing device 100 performs the transmission to the information processing device 200 during the transmission by the information processing device 102, the information processing devices 200 and 201 which are reception sides can also perform reception according to a ratio between desired waves and interference waves. The desired waves are radio waves from the information processing device 100 to the information processing device 200 or radio waves from the information processing device 102 to the information processing device 201. The interference waves are radio waves from the information processing device 100 to the information processing device 201 or radio waves from the information processing device 102 to the information processing device 200.

For example, as shown in FIG. 1, reception possibility is assumed to be higher between the information processing devices 102 and 200 when a distance therebetween is greater than a distance between the information processing devices 100 and 200. Accordingly, when collision avoidance is ensured and an improvement is potentially achieved, it is important to improve efficiency of a carrier sense mechanism that suppresses transmission.

For example, as shown in FIG. 3, a case in which carrier sense detection thresholds of the information processing devices 100 and 102 are changed to be set to be higher so that mutual transmission radio waves are not detectable will be assumed. In this case, since the information processing device 100 is configured not to detect transmission from the information processing device 102, the information processing devices 100 and 102 can each simultaneously perform transmission and simultaneously use radio resources.

However, when an information processing device of a reception side does not reliably wait for transmission opportunities despite an increase in the transmission opportunities of an information processing device on a transmission side, a case in which a gain is not obtained without transmission success is assumed. This example is shown in FIG. 4.

Figure 4:
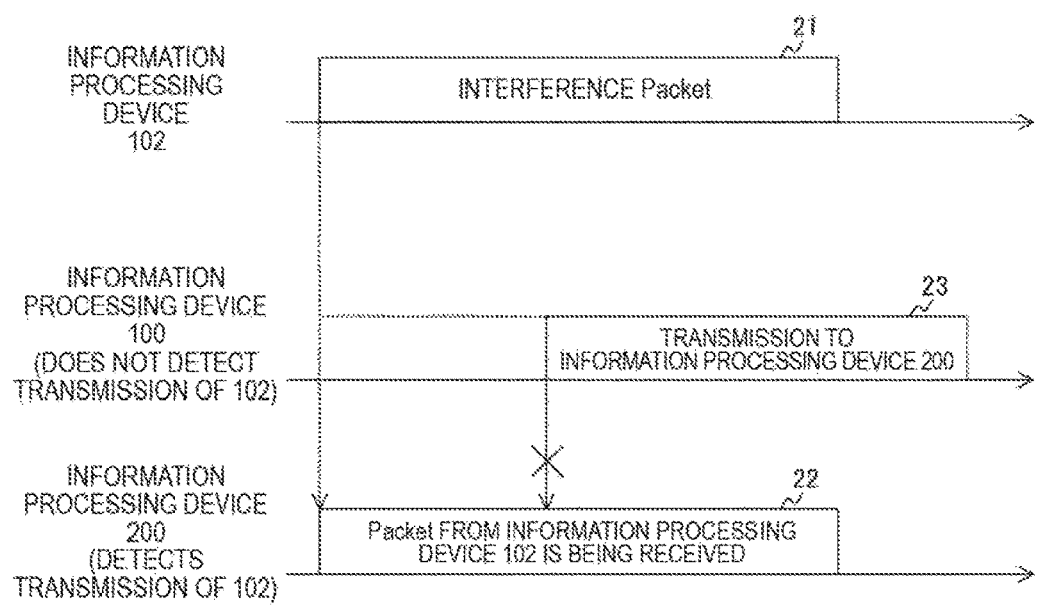
FIG. 4 is a diagram showing an example of a transmission and reception process by information processing devices included in the communication system 10 in a time series manner according to the first embodiment of the present technology.

FIG. 4 is a diagram showing an example of a transmission and reception process by the information processing devices included in the communication system 10 in a time series manner according to the first embodiment of the present technology.

FIG. 4 shows an example of a case in which the information processing device 100 performs transmission to the information processing device 200 while the information processing device 102 performs transmission to the information processing device 201 in the example shown in FIG. 1.

For example, as shown in FIG. 3, the information processing device 102 is in the carrier sense detection range 11 of the information processing device 200. Therefore, when the information processing device 200 first detects transmission (21) of the information processing device 102 and starts reception of an interference side (22), the information processing device 200 may not receive transmission (23) from the information processing device 100 newly obtaining a transmission opportunity (22). In this way, even when a ratio of signal waves to interference waves is sufficiently high, there is a concern of reception failing.

Accordingly, for example, raising the carrier sense detection threshold of the information processing device 200 can be considered. However, the master station has a plurality of subordinate information processing devices and necessarily waits simultaneously. Therefore, when the master station uniformly raises the carrier sense detection threshold, there is a concern that communication with the subordinate information processing devices from which information is to be received may not be appropriately detected. Therefore, a case in which the carrier sense detection threshold is changed is preferably restricted only to, for example, a case in which the change in the carrier sense detection threshold is actually necessary or a case in which improvement is reliably expected.

Accordingly, in an embodiment of the present technology, an example in which radio resources are appropriately reused when improvement can be achieved while suppressing side effects caused due to the raising of the carrier sense detection threshold as small as possible will be described. In this case, reception levels of packets transmitted and received from a third party can also be set as examination targets.

Specifically, in an embodiment of the present technology, a transmission side information processing device is configured to change content of a Physical Layer Convergence Protocol (PLCP) header according to communication quality (for example, a propagation attenuation amount) with a destination. A reception side information processing device is configured to detect only a desired packet by changing a packet detection threshold to be applied using a part of the received content of the PLCP header.

Here, the PLCP is a protocol for transmitting a portion that is necessary to be commonly received through modulation at a given speed irrespective of a transmission rate and encapsulating a MAC frame to transmit a data portion subsequent to the portion by various methods according to a device and a situation at that time.

For example, a PLCP preamble is used to detect a packet or estimate a propagation path gain. The PLCP header is used to convey information such as the modulation of the data portion or the length of a frame.

[Configuration Example of Information Processing Device]

Figure 5:
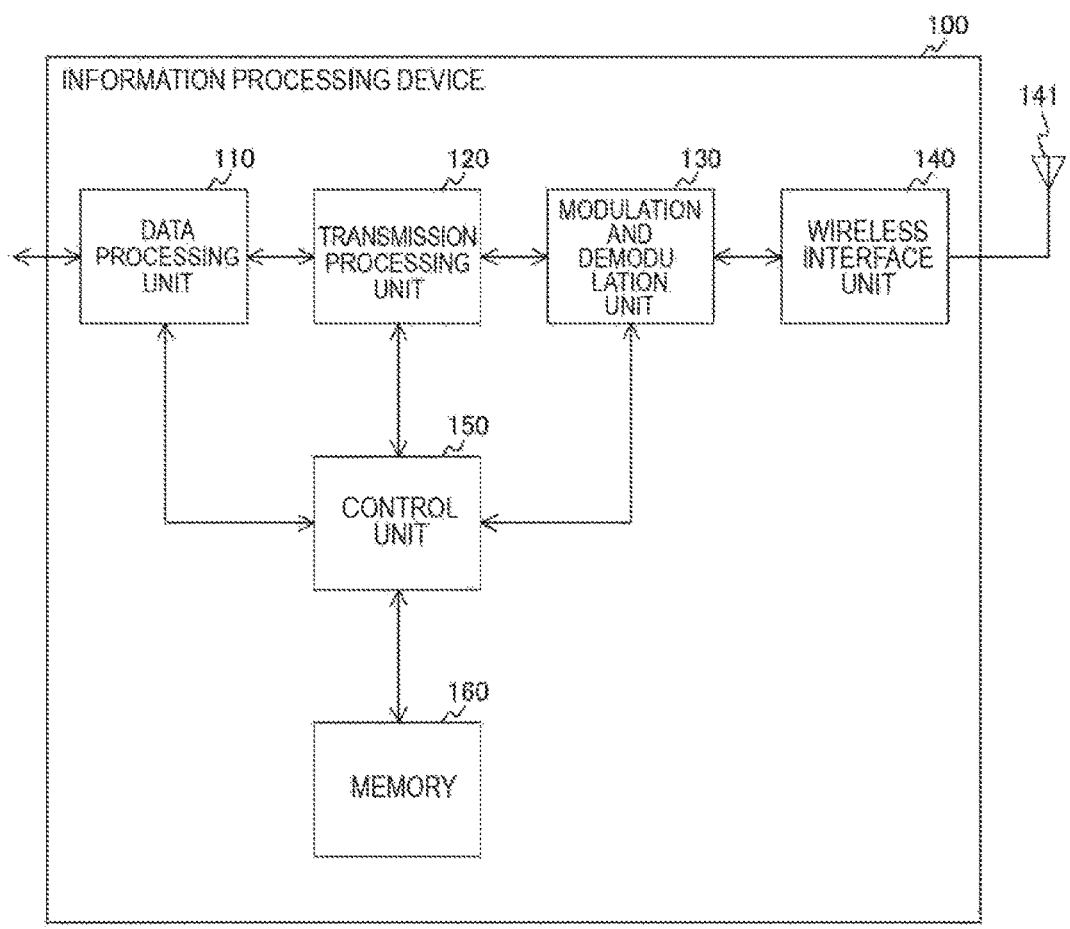
FIG. 5 is a block diagram showing a functional configuration example of an information processing device 100 according to the first embodiment of the present technology.

FIG. 5 is a block diagram showing a functional configuration example of the information processing device 100 according to the first embodiment of the present technology. Since functional configurations (functional configurations related to wireless communication) of the information processing devices 101 to 103, 200, and 201 are substantially the same as those of the information processing device 100, the description thereof will be omitted herein.

The information processing device 100 includes a data processing unit 110, a transmission processing unit 120, a modulation and demodulation unit 130, a wireless interface unit 140, an antenna 141, a control unit 150, and a memory 160.

The data processing unit 110 processes various kinds of data under the control of the control unit 150. For example, the data processing unit 110 generates bodies of various data frames, data packets, and the like. For example, when a transmission operation is performed, the data processing unit 110 generates various data frames and data packets and supplies the various data frames and data packets to the transmission processing unit 120 in response to a request from an upper layer. For example, when a reception operation is performed, the data processing unit 110 processes and analyzes various data frames and data packets supplied from the transmission processing unit 120.

The transmission processing unit 120 performs various transmission processes under the control of the control unit 150. For example, when a transmission operation is performed, the transmission processing unit 120 performs a process such as addition of a header or addition of an error detection code to a packet generated by the data processing unit 110 for media access control. For example, the transmission processing unit 120 performs a process such as addition of a Media Access Control (MAC) header for the MAC or addition of an error detection code to a packet generated by the data processing unit 110. Then, the transmission processing unit 120 supplies the processed data to the modulation and demodulation unit 130.

When the carrier sense is used, the transmission processing unit 120 calculates a Network Allocation Vector (NAV) to be added. Here, as described above, the carrier sense is an example of the adjustment structure for packet collision avoidance and is a scheme of describing a transmission suppression time in content of a wireless packet and setting transmission suppression in an information processing device receiving the packet. The NAV is the transmission suppression time.

For example, when a reception operation is performed, the transmission processing unit 120 performs a reverse process (for example, packet error detection or analysis and removal of a MAC header) to the transmission operation on a bit stream supplied from the modulation and demodulation unit 130. Then, when it is confirmed that there is no error in the data frame based on the error detection code, the transmission processing unit 120 supplies various data frames to the data processing unit 110.

The transmission processing unit 120 performs a virtual carrier sense process. In this case, when the NAV is set in the header of the received packet and the transmission suppression is applied, the transmission processing unit 120 notifies the control unit 150 that the NAV is set and the transmission suppression is applied.

The modulation and demodulation unit 130 performs modulation and demodulation processes under the control of the control unit 150. For example, when a transmission operation is performed, the modulation and demodulation unit 130 performs encoding, interleaving, modulation, and addition of a PLCP header and a PLCP preamble on the bit stream input from the transmission processing unit 120 based on coding and a modulation scheme set by the control unit 150. Then, the modulation and demodulation unit 130 generates a data symbol string and supplies the data symbol string to the wireless interface unit 140.

For example, when a reception operation is performed, the modulation and demodulation unit 130 performs a reverse process to the transmission operation on an input from the wireless interface unit 140 and supplies the result to the transmission processing unit 120. The modulation and demodulation unit 130 performs a carrier sense process. In this case, when reception power equal to or greater than a threshold is detected or a value of preamble correlation equal to or greater than a predetermined output is detected, the modulation and demodulation unit 130 determines that a wireless state is a busy state and notifies the control unit 150 that the wireless state is the busy state.

The wireless interface unit 140 is an interface that is connected to another information processing device to transmit and receive various kinds of information. For example, when a transmission operation is performed, the wireless interface unit 140 converts an input from the modulation and demodulation unit 130 into an analog signal, performs amplification, filtering, and frequency upconverting, and transmits the result as a wireless signal from the antenna 141. For example, when a reception operation is performed, the wireless interface unit 140 performs a reverse process to the transmission operation on an input from the antenna 141 and supplies the result to the modulation and demodulation unit 130.

The control unit 150 controls reception and transmission operations of each of the data processing unit 110, the transmission processing unit 120, the modulation and demodulation unit 130, and the wireless interface unit 140. For example, the control unit 150 performs delivery of information between the units, setting of communication parameters, and scheduling of packets in the transmission processing unit 120. For example, when the control unit 150 receives notification of carrier sense results from the modulation and demodulation unit 130 and the transmission processing unit 120, the control unit 150 performs each process related to setting of the transmission suppression or cancellation of the setting based on the notification.

For example, a control unit (corresponding to the control unit 150) of the information processing device 200 performs control such that physical headers (for example, a PLCP preamble and a PLCP header) used for packets transmitted by another information processing device are transmitted to another information processing device using wireless communication.

For example, the control unit 150 performs control such that one header is selected from a plurality of physical header candidates (for example, PLCP preambles and PLCP headers) and is used for a transmission target packet. Here, the plurality of physical header candidates correspond to information regarding a plurality of physical headers (for example, PLCP preambles and PLCP headers) transmitted from the information processing device 200.

For example, the control unit of the information processing device 200 performs control such that packet detection conditions (for example, detection thresholds of the PLCP preambles) used by another information processing device are transmitted to another information processing device using wireless communication.

For example, the control unit 150 performs control such that one packet detection condition is selected to be used from a plurality of packet detection conditions (for example, detection thresholds of the PLCP preambles) in regard to a plurality of packets transmitted from the information processing device 200 using wireless communication. Here, the plurality of packet detection conditions correspond to the plurality of packet detection conditions transmitted from the information processing device 200.

For example, the control unit 150 performs control such that one reception operation is selected to be performed from a plurality of reception operations in regard to a plurality of packets transmitted from the information processing device 200 using wireless communication. The plurality of reception operations will be described according to the first to eleventh embodiments of the present technology.

The memory 160 has a role of a working area of data processing by the control unit 150 or a function of a storage medium that retains various kinds of data. As the memory 160, for example, a storage medium such as a non-volatile memory, a magnetic disk, an optical disc, or a magneto-optical (MO) disc can be used. As the non-volatile memory, for example, an electrically erasable programmable read-only memory (EEPROM) or an erasable programmable ROM (EPROM) can be used. As the magnetic disk, for example, a hard disk or a discoid magnetic disk can be used. As the optical disc, for example, a compact disc (CD), a digital versatile disc recordable (DVD-R), or a Blu-Ray Disc (BD: registered trademark) can be used.

In each embodiment of the present technology, an example in which each transmission succeeds when uplink transmission from the information processing device 100 to the information processing device 200 and uplink transmission from the information processing device 102 to the information processing device 201 are performed simultaneously (or substantially simultaneously) will be described. An embodiment of the present technology can also be applied to transmission between the information processing devices other than such transmission.

[Communication Example]

Figure 6:
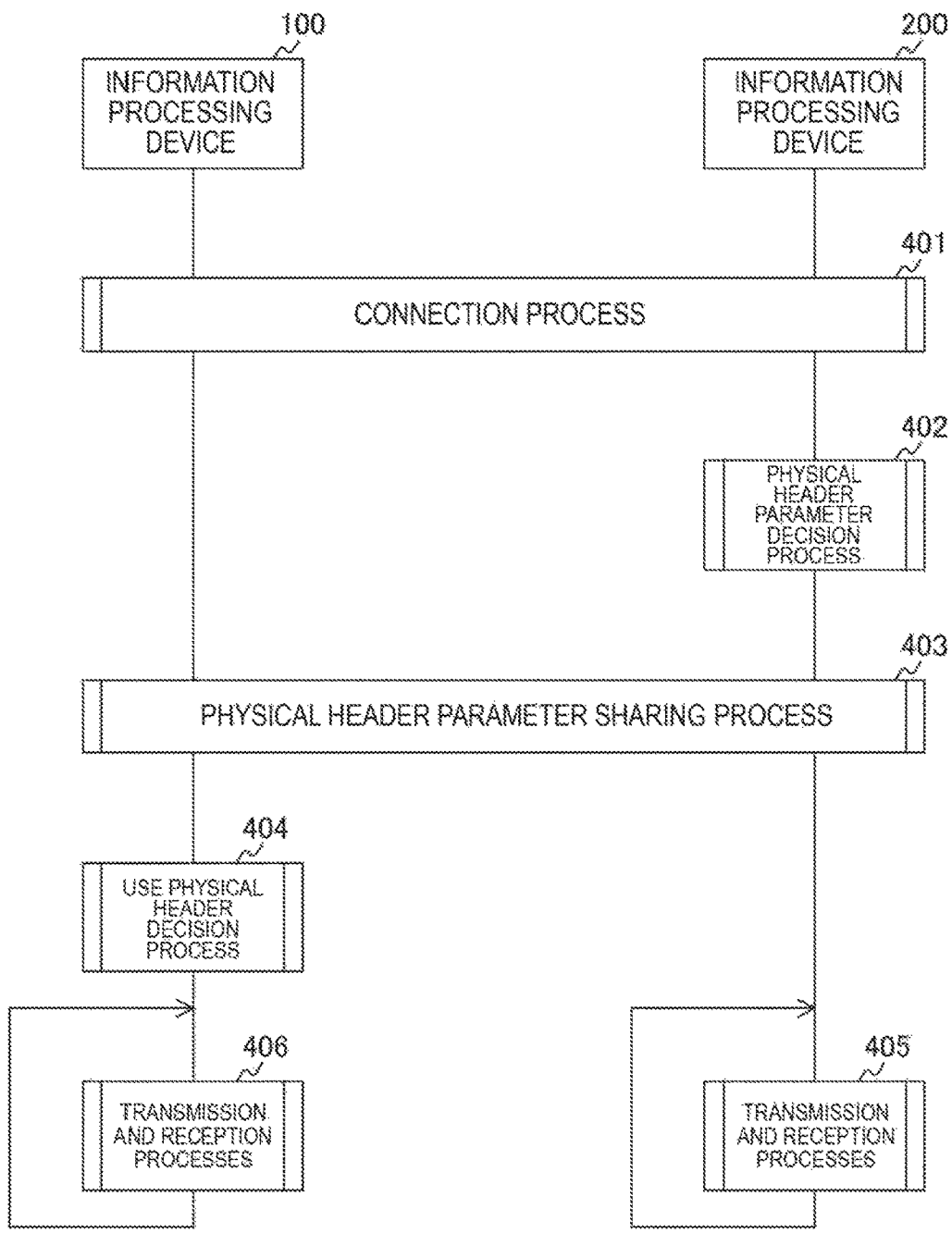
FIG. 6 is a sequence chart showing a communication processing example between devices included in the communication system 10 according to the first embodiment of the present technology.

FIG. 6 is a sequence chart showing a communication processing example between the devices included in the communication system 10 according to the first embodiment of the present technology.

FIG. 6 shows a communication processing example when uplink transmission from the information processing device 100 to the information processing device 200 is performed. The same also applies to a relation between other information processing devices (for example, the information processing devices 102 and 201).

First, a connection process between the information processing devices 100 and 200 is performed (401). The connection process will be described in detail with reference to FIG. 8.

Subsequently, the information processing device 200 performs a physical header parameter decision process (402). The physical header parameter decision process will be described in detail with reference to FIG. 10.

Subsequently, a physical header parameter sharing process is performed between the information processing devices 100 and 200 (403). That is, a process of sharing physical header parameters decided through the physical header parameter decision process between the information processing devices 100 and 200 is performed (403).

Subsequently, the information processing device 200 performs a transmission and reception process (405).

The information processing device 100 performs a use physical header decision process (404). The use physical header decision process will be described in detail with reference to FIG. 16. Subsequently, the information processing device 100 performs the transmission and reception process (406).

[Example of Format of Presentation-Layer Protocol Data Unit (PPDU)]

FIG. 7 is a diagram showing an example of the format of a PPDU exchanged between the devices included in the communication system 10 according to the first embodiment of the present technology.

The PPDU is configured to include Preamble 301, SIGNAL 302, Extension 303, Service 304, MAC Protocol Data Unit (MPDU) 305, and Frame Check Sequence (FCS) 306.

The Preamble 301 indicates a portion corresponding to an IEEE 802.11 Legacy Short Training Field (L-STF) or Legacy Long Training Field (L-LTF) shown in c of FIG. 7. The Preamble 301 is assumed to have a format compatible with this field.

The SIGNAL 302 indicates an IEEE 802.11 Legacy SIGNAL (L-SIG) or High Throughput SIGNAL (HT-SIG) field shown in c of FIG. 7. HT Mixed Mode Format of IEEE 802.11n is shown as an example in c of FIG. 7. The HT-SIG may be replaced with a Very High Throughput SIGNAL-A (VHT-SIG-A) field, in IEEE 802.11ac and with High Efficiency SIGNAL (HE-SIG) field in IEEE 802.11ax.

In accordance with a format, additional fields (HT-STF, HT-LTF, VHT-STF, VHT-LTF, and VHT-SIG-B) are attached subsequently in some cases.

Here, in the first embodiment of the present technology, "Link Strength Category field" is newly prepared in a part of the field of the SIGNAL 302 which is a PLCP header of the physical header. That is, "Link Strength Category field" is newly set up in a portion treated as being reserved in the SIGNAL 302 of the PLCP header. Each information processing device (other than a legacy device) changes "Link Strength Category field" according to the quality of a link with a designation at the time of transmission.

An example in which 1 is stored in "Link Strength Category field" is shown in a of FIG. 7. An example in which 0 is stored in "Link Strength Category field" is shown in b of FIG. 7. In this way, the examples in which the value (0 or 1) of two stages is stored in "Link Strength Category field" are shown in a and b of FIG. 7, but a value of 3 or more stages may be stored.

In this way, in the first embodiment of the present technology, "Link Strength Category field" is set up a portion treated as being reserved in the SIGNAL 302. Thus, it is possible to realize a specific function in the first embodiment of the present technology without interfering with reception of the legacy device.

In the first embodiment of the present technology, a physical header of Link Strength Category field=0 is referred to as "long-distance physical header." Further, a physical header of Link Strength Category field=1 is referred to as "short-distance physical header." A physical header transmitted from a legacy device is assumed to be treated as a "long-distance physical header."

An information processing device (other than a legacy device) receiving a packet including Link Strength Category field changes a detection threshold to be applied according to content (0 or 1) of Link Strength Category field.

[Example of Connection Process]

Figure 8:
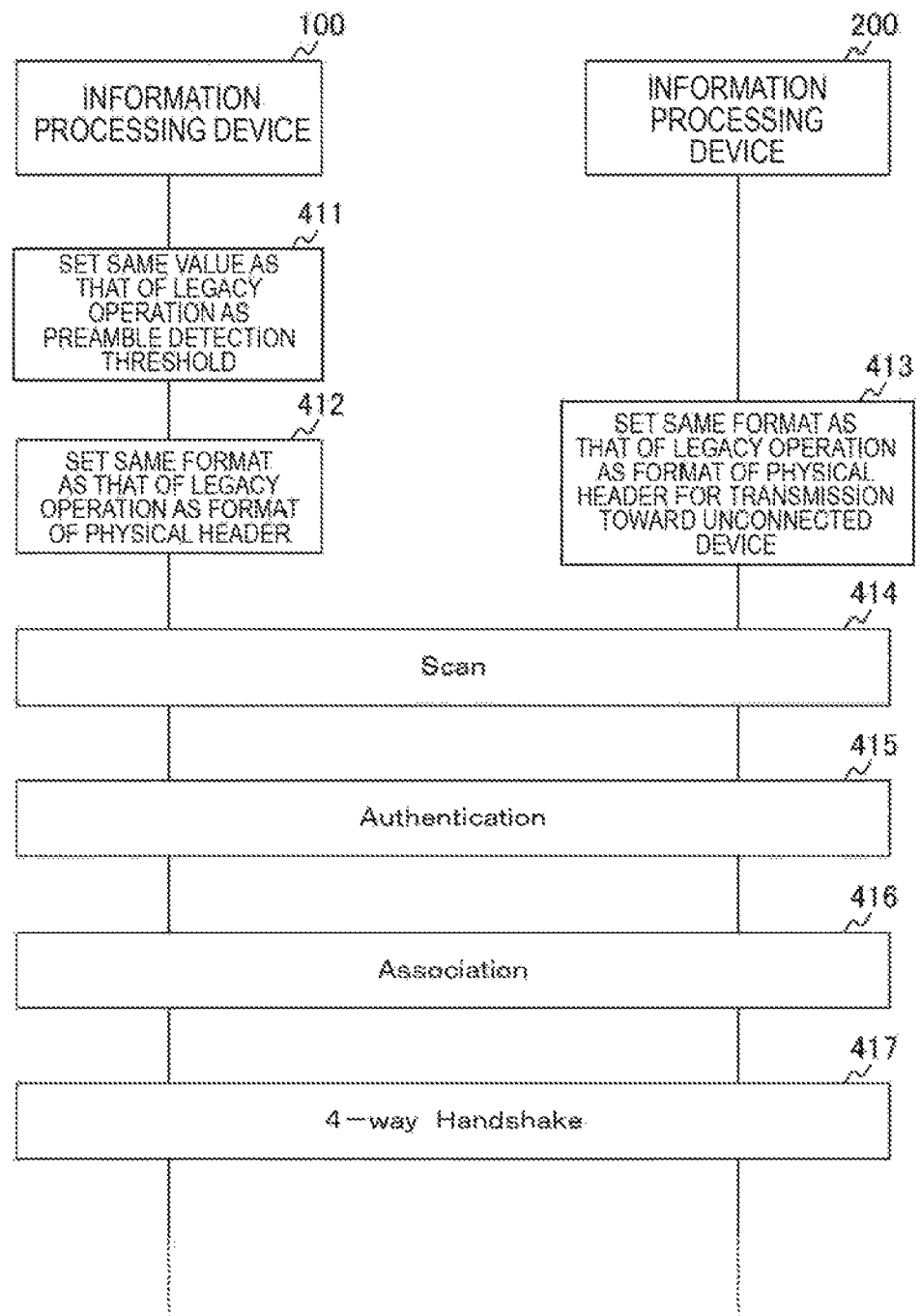
FIG. 8 is a sequence chart showing an example of a connection process between the devices included in the communication system 10 according to the first embodiment of the present technology.

FIG. 8 is a sequence chart showing an example of a connection process between the devices included in the communication system 10 according to the first embodiment of the present technology.

FIG. 8 shows a processing example until connection between the information processing devices 100 and 200 is established. The same also applies to a relation between the information processing devices 102 and 201.

When connection is attempted, link quality between the information processing devices 100 and 200 is unknown. For this reason, to reliably perform connection, the information processing device 100 uses the same preamble detection threshold and physical header as those of the legacy device without performing adjustment of the threshold.

That is, the information processing device 100 sets the same value as that of a legacy operation (an operation of the legacy device) as the preamble detection threshold (411). The information processing device 100 sets the same format as that of a legacy operation (an operation of the legacy device) as the format of the physical header (412).

The information processing device 200 sets the same format as that of a legacy operation (an operation of the legacy device) as the format of the physical header (413).

Subsequently, scanning is performed (414), Authentication is performed (415), Association is performed (416), and 4-way Handshake is performed (417).

When the connection is established in this way, the control unit of the information processing device 200 generates a list (setting information list) of the setting information used by each information processing device (for example, the information processing devices (subordinate terminals) connected to the information processing device 200). The setting information list is a list that is formed by a combination of each detection threshold of the physical header and an application level (application condition) of the physical header used by each information processing device. The setting information list will be described in detail with reference to FIG. 9.

In the embodiment of the present technology, a pair of the detection threshold of the physical header and the application level of the physical header is referred to as a physical header parameter.

The information processing device 200 updates content of information already generated in information included in the setting information list.

[Example of Content of Setting Information List]

FIG. 9 is a diagram schematically showing an example of content of a setting information list 161 stored in the memory (corresponding to the memory 160 shown in FIG. 5) of an information processing device 200 according to the first embodiment of the present technology.

In the setting information list 161, an index 162, a detection threshold 163, and an application level 164 are stored in association therewith.

A value (0 or 1) indicating far or near is stored in the index 162.

The detection threshold of the physical header decided through the physical header parameter decision process is stored in the detection threshold 163. The physical header parameter decision process is shown in FIG. 10.

The application level of the physical header decided through the physical header parameter decision process is stored in the application level 164.

[Operation Example of Physical Header Parameter Decision Process]

FIG. 10 is a flowchart showing an example of a processing order of a physical header parameter decision process by the information processing device 200 according to the first embodiment of the present technology.

First, the control unit of the information processing device 200 performs tentative decision of the physical header parameter used by the subordinate terminals in a self-basic service set (BSS) and the self-device. The control unit of the information processing device 200 tentatively decides a detection threshold PD_near of the short-distance physical header and a detection threshold PD_far of the long-distance physical header.

Here, since there is no physical header of the application condition below the detection threshold PD_far of the long-distance physical header, a setting value PD_default for the legacy device is tentatively set as the detection threshold.

The setting value PD_default for the legacy device is a value indicating a reference level of the preamble detection used by the legacy device. In the IEEE 802.11 standard, as a standard value, a value such as −82 dBm every 20 MHz bandwidth is referred to. As the setting value PD_default for the legacy device, a value other than −82 dBm may be used.

Subsequently, the control unit of the information processing device 200 decides application levels L_near and L_far of the physical headers based on the detection threshold PD_near of the short-distance physical header and the detection threshold PD_far of the long-distance physical header. Specifically, the control unit of the information processing device 200 decides the application levels L_near and L_far of the physical headers so that the following Expressions 1 and 2 are satisfied. Here, Expressions 1 and 2 are descriptions in which calculation in logarithm (dB) is assumed.

$$L\_near > PD\_near + O\_near \qquad \text{Expression 1}$$

$$L\_far = -\infty \qquad \text{Expression 2}$$

Here, the application levels L_near and L_far of the physical headers are thresholds used to select physical headers (a long-distance physical header and a short-distance physical header) to be used based on and communication quality with a destination device. For example, when the information processing device 100 performs transmission, the application levels L_near and L_far of the physical headers are used as thresholds at the time of selection of the physical headers to be used as the communication quality with the destination device.

In Expression 1, O_near is an offset amount of a margin for a preamble detection error by a variation in a reception level. For example, a value of about 10 dBm to 20 dBm can be used as O_near. Further, a value other than 10 dBm to 20 dBm may be used as O_near.

As indicated in Expression 2, L_far is set to the infinitesimal since there is no physical header of the application condition below L_far.

Subsequently, the control unit of the information processing device 200 performs packet monitoring (step S701). Then, the control unit of the information processing device 200 acquires information regarding communication quality with each subordinate information processing device in the self-BSS and information regarding communication quality of packets from other BSSs (OBSSs) (step S701).

Here, an example in which correlation output strength of the PLCP preamble is used as an index of the communication quality will be described. The correlation output strength is not a correlator output in which power is normalized, but is assumed to indicate an absolute level obtained by multiplying a correlator output by a received signal strength indicator (RSSI). That is, the correlation output strength is a correlator output corrected to an antenna input conversion. When there is a reception history at a relatively close time, a record of the correlation output strength at that time may be properly used. At the time of monitoring, the detection threshold may be temporarily lowered so that a more reliable sample is collected.

Here, a relation between the RSSI and a correlation output strength COL (Correlator Output Level) can be simply indicated by the following expression.

correlation output strength COL=RSSI×normalized correlator output

An example of the configuration of a correlator is shown in FIG. 11.

[Example of Configuration of Correlator]

FIG. 11 is a diagram showing an example of the configuration of a correlator included in the information processing device 200 according to the first embodiment of the present technology FIG. 11 shows an example of the configuration of a general correlator serving as a reference. Here, an operator (*) described in FIG. 11 indicates complex conjugate calculation.

Here, for the correlator, in general, there are largely two configurations according to the characteristics of the preamble. For example, there are two configurations, a configuration of autocorrelation detection for generally detecting a signal with certain periodicity and a configuration of cross-correlation detection for detecting correlation with a decided pattern. An example of the configuration of the autocorrelation detection is shown in a of FIG. 11 and an example of the configuration of the cross-correlation detection is shown in b of FIG. 11.

In FIG. 10, the control unit of the information processing device 200 classifies information regarding the communication quality according to "Link Strength Category field" in the physical header used at the time of reception (step S702).

For example, the control unit of the information processing device 200 sets a minimum correlation output strength to COL_self_far in a packet in which the BSS identifier (BSSID) is the self-BSS and a physical header is a long-distance physical header and there is no error.

The control unit of the information processing device 200 sets a maximum correlation output strength to COL_other_near in a packet in which the BSS identifier (BSSID) is the self-BSS and a physical header is a short-distance physical header and there is no error.

The control unit of the information processing device 200 sets a maximum correlation output strength to COL_other_far in a packet in which the BSS identifier (BSSID) is the self-BSS and a physical header is a long-distance physical header and there is no error. COL for which there is no packet sample of a corresponding condition is assumed to be replaced with PD_default.

Subsequently, the control unit of the information processing device 200 decides the detection threshold PD_near of the short-distance physical header and the detection threshold PD_far of the long-distance physical header (step S703). That is, the control unit of the information processing device 200 corrects the tentatively decided detection threshold PD_near of the short-distance physical header and the tentatively decided detection threshold PD_far of the long-distance physical header so that relations of the following Expressions 3 to 5 are established (step S703).

PD_near>COL_other_near    Expression 3

PD_far<COL_self_far    Expression 4

PD_far>COL_other_far    Expression 5

When there is no PD_far for which Expressions 4 and 5 are compatible, PD_far is decided so that Expression 4 is preferentially established.

When these detection thresholds are decided (updated), the control unit of the information processing device 200 corrects the application levels L_near and L_far of the physical headers based on the above-described Expressions 1 and 2 (step S703).

In this way, the detection threshold PD_near of the short-distance physical header, the detection threshold PD_far of the long-distance physical header, and the application levels L_near and L_far of the physical headers are decided. The control unit of the information processing device 200 stores the values decided in this way in the setting information list 161 (shown in FIG. 9) and refers to the subsequent values for use for itself. Specifically, the control unit of the information processing device 200 stores PD_far in the detection threshold 163 corresponding to "0" of the index 162 and stores L_far in the application level 164 corresponding to "0" of the index 162. The control unit of the information processing device 200 stores PD_near in the detection threshold 163 corresponding to "1" of the index 162 and stores L_near in the application level 164 corresponding to "1" of the index 162.

Here, the monitoring of the nearby packets and the updating of the setting values described above may be performed periodically or aperiodically. For example, the monitoring and the updating may be performed periodically every given time or may be performed whenever connection of a new subordinate terminal starts.

[Example of Carrier Sense Detection Range]

Figure 12:
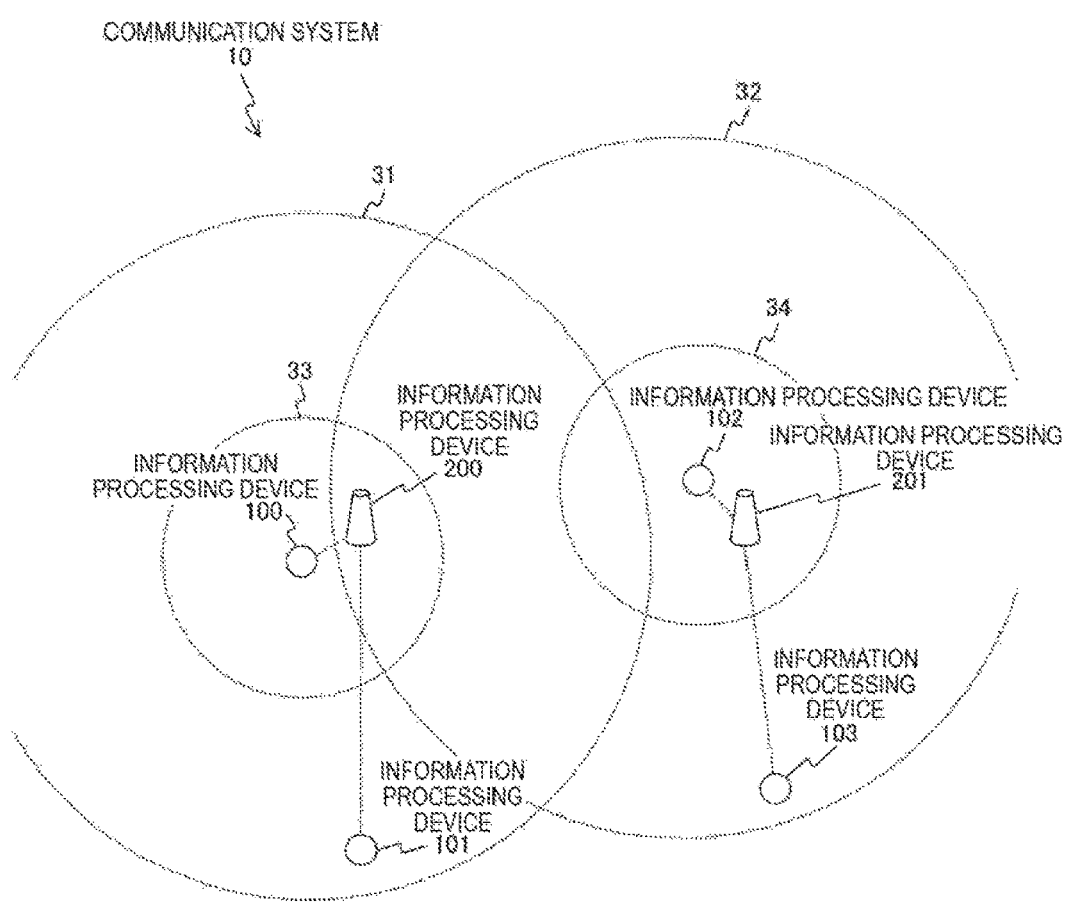
FIG. 12 is a diagram showing a system configuration example of the communication system 10 according to the first embodiment of the present technology.
Figure 13:
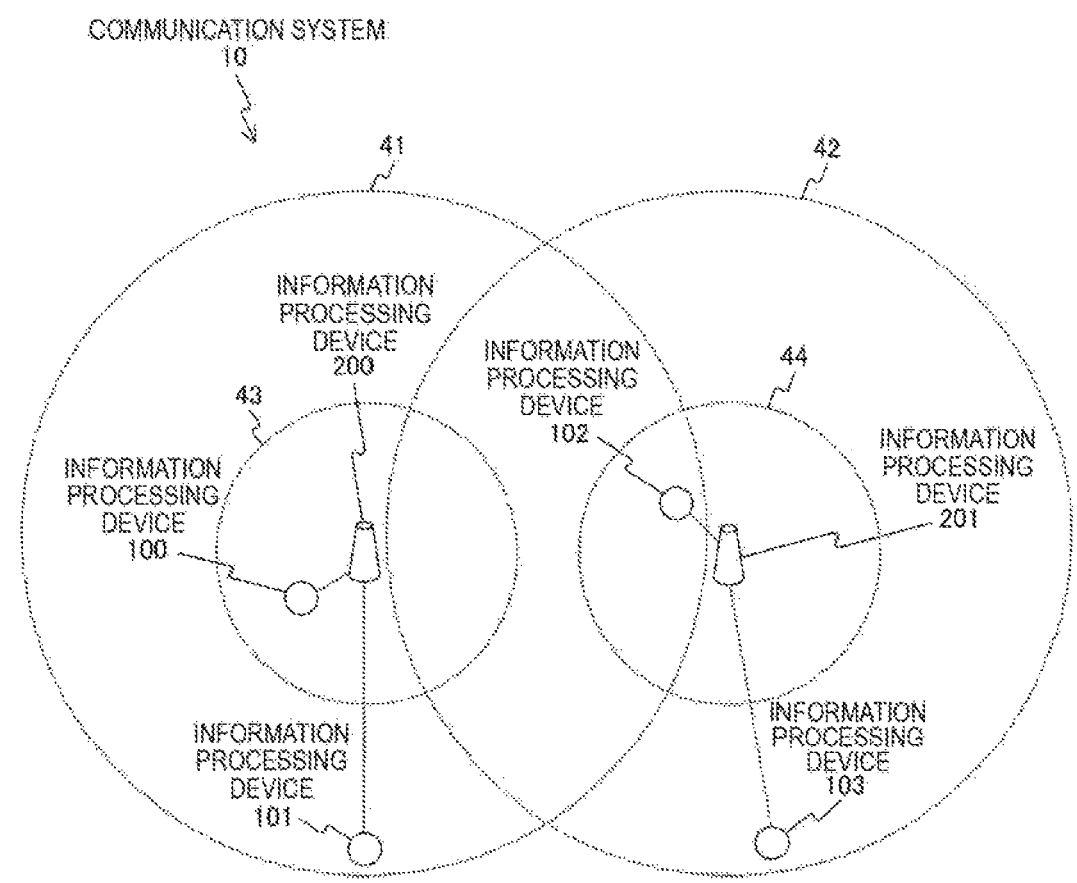
FIG. 13 is a diagram showing a system configuration example of the communication system 10 according to the first embodiment of the present technology.

FIGS. 12 and 13 are diagrams showing system configuration examples of the communication system 10 according to the first embodiment of the present technology.

FIGS. 12 and 13 show examples of the carrier sense detection ranges of the information processing devices set based on the detection threshold PD_near of the short-distance physical header and the detection threshold PD_far of the long-distance physical header decided by the information processing device 200.

In FIG. 12, carrier sense detection ranges 31 to 34 of the information processing devices 100 and 102 are schematically indicated by dotted circles. In FIG. 13, carrier sense detection ranges 41 to 44 of the information processing devices 200 and 201 are schematically indicated by dotted circles.

Specifically, in FIG. 12, the carrier sense detection range 31 indicates the carrier sense detection range of the information processing device 100 set based on the detection threshold PD_far of the long-distance physical header. The carrier sense detection range 33 indicates the carrier sense detection range of the information processing device 100 set based on the detection threshold PD_near of the short-distance physical header.

In FIG. 12, the carrier sense detection range 32 indicates the carrier sense detection range of the information processing device 102 set based on the detection threshold PD_far of the long-distance physical header. The carrier sense detection range 34 indicates the carrier sense detection range of the information processing device 102 set based on the detection threshold PD_near of the short-distance physical header.

In FIG. 13, the carrier sense detection range 41 indicates the carrier sense detection range of the information processing device 200 set based on the detection threshold PD_far of the long-distance physical header. The carrier sense detection range 43 indicates the carrier sense detection range of the information processing device 200 set based on the detection threshold PD_near of the short-distance physical header.

In FIG. 13, the carrier sense detection range 42 indicates the carrier sense detection range of the information processing device 201 set based on the detection threshold PD_far of the long-distance physical header. The carrier sense detection range 44 indicates the carrier sense detection range of the information processing device 201 set based on the detection threshold PD_near of the short-distance physical header.

The examples in which the classification of two values of the short distance and the long distance is performed have been described above, but classification of three or more values (N values) may be performed. For example, detection thresholds of the physical headers are set to PD_0, PD_1, . . . , and PD_N and the application levels of the PLCPs are set to L_0, L_1, . . . , and L_N in order for the long distance. Further, the detection thresholds of the physical headers and offset amounts between the application levels of the physical headers are set to O_0, O_1, . . . , and O_N. In this case, values are decided so that the following relation expressions (Expressions 6 to 9) are satisfied. Here, Expressions 6 to 9 are description in which calculation in logarithm (dB) is assumed.

$$PD\_n > COL\_other\_n \qquad \text{Expression 6}$$

(where n=0 to N)

$$PD\_0 < COL\_self\_0 \qquad \text{Expression 7}$$

$$L\_n > PD\_n + O\_n \qquad \text{Expression 8}$$

(where n=1 to N)

$$L\_0 = -\infty \qquad \text{Expression 9}$$

In the case of the classification of three or more values, PD_0 is decided so that Expression 7 is preferentially established when there is no PD_0 for which Expressions 6 and 7 are compatible.

[Example of Beacon Frame Format]

Figure 14:
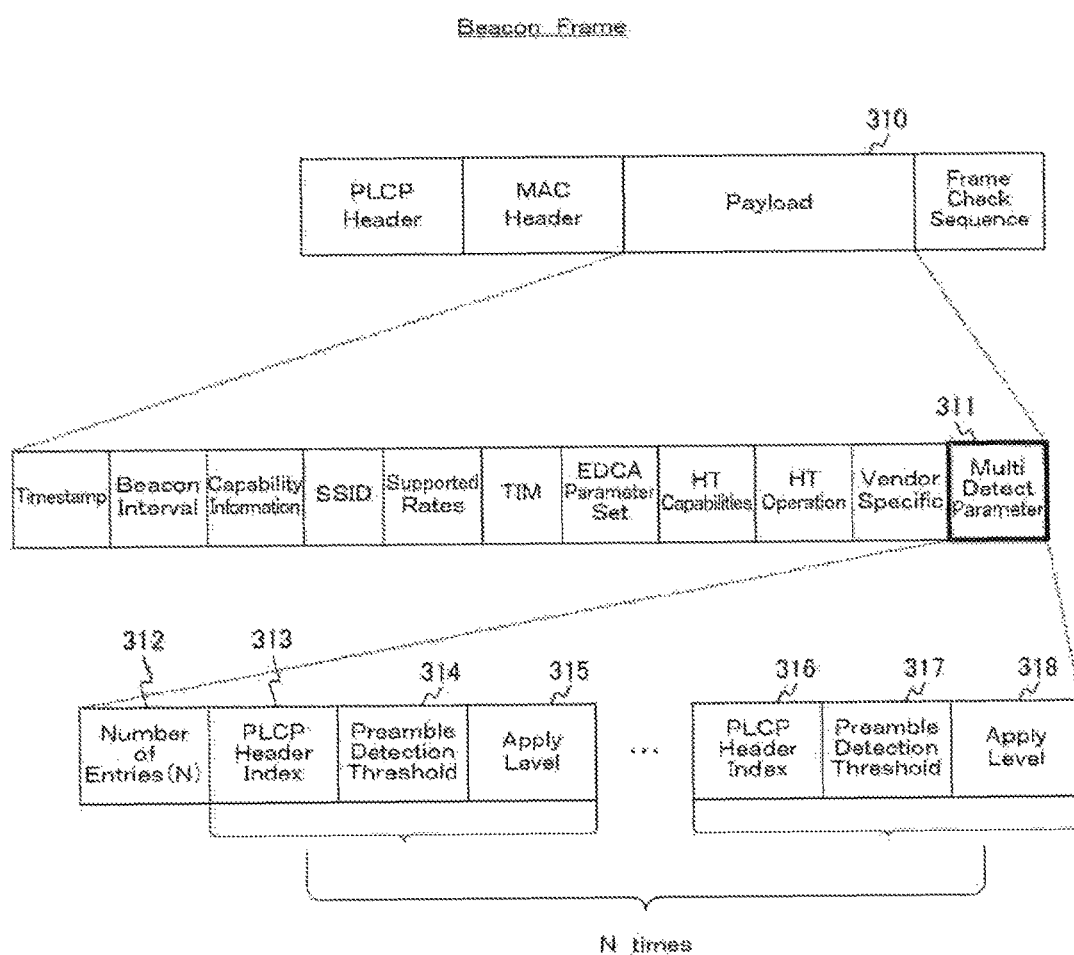
FIG. 14 is a diagram showing an example of a beacon frame format exchanged between the devices included in the communication system 10 according to the first embodiment of the present technology.

FIG. 14 is a diagram showing an example of a beacon frame format exchanged between the devices included in the communication system 10 according to the first embodiment of the present technology. Here, an example of a beacon frame transmitted from the information processing device 200 to another information processing device will be described.

FIG. 14 shows an example in which an element such as "Multi Detect Parameter" 311 is newly added to a payload 310. In "Multi Detect Parameter" 311, an index (0 or 1) indicating far or near is stored in "PLCP Header Indexes" 313 and 316. The detection threshold PD_far of the long-distance physical header and the detection threshold PD_near of the short-distance physical header are stored in "Preamble Detection Thresholds" 314 and 317. The application levels of the physical headers are stored in "Apply Levels" 315 and 318.

Generated combinations are set up as combinations of "PLCP Header Index," "Preamble Detection Threshold," and "Apply Level." For example, as shown in FIG. 9, a case in which two pairs of pieces of information (two pairs of "0" and "1" of the index 162) are stored in the setting information list 161 will be assumed. In this case, two pairs of combinations are set up as combinations of "PLCP Header Index," "Preamble Detection Threshold," and "Apply Level."

Specifically, the control unit of the information processing device 200 stores each piece of content of the setting information list 161 shown in FIG. 9 in the beacon frame to transmit the content. That is, the control unit of the information processing device 200 stores information stored in association with "0" of the index 162 in a first combination ("PLCP Header Index" 313 to "Apply Lever" 315). The control unit of the information processing device 200 stores information stored in association with "1" of the index 162 in a subsequent combination ("PLCP Header Index" 316 to "Apply Level" 318).

Then, the control unit of the information processing device 200 transmits a beacon in which each piece of information indicated in "Multi Detect Parameter" 311 is stored to nearby information processing devices to inform the nearby information processing devices of the beacon. That is, the control unit of the information processing device 200 transmits the information regarding the packet detection condition (for example, a packet detection threshold (the detection threshold 163 shown in FIG. 9) and a selection condition (the application level 164 shown in FIG. 9) for selecting the packet detection threshold) to nearby information processing devices to inform the nearby information processing devices of the information. The selection condition can be ascertained as a selection condition for selecting one physical header from a plurality of physical header candidates and a selection condition of the physical header corresponding to each packet detection condition.

[Communication Example of Physical Header Parameter Sharing Process]

Figure 15:
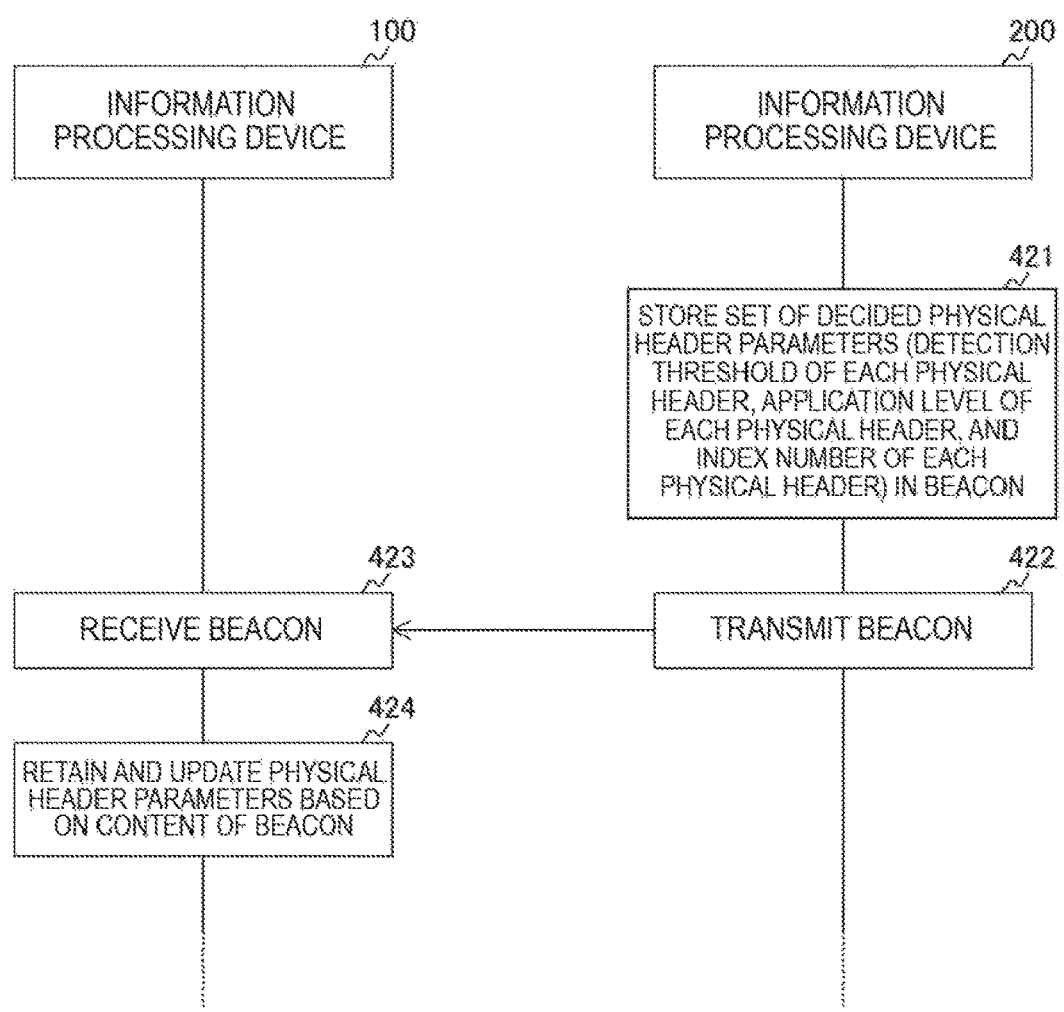
FIG. 15 is a sequence chart showing an example of a physical header parameter sharing process between the devices included in the communication system 10 according to the first embodiment of the present technology.

FIG. 15 is a sequence chart showing an example of a physical header parameter sharing process between the devices included in the communication system 10 according to the first embodiment of the present technology.

FIG. 15 shows an example of a sharing process in which the control unit 150 of the information processing device 100 receives a beacon transmitted from the information processing device 200 and shares the physical header parameters. The same also applies to a case in which other information processing devices receive a beacon transmitted from the information processing device 200. For example, the control unit of the information processing device 200 can notify the subordinate terminal of the physical header parameters using the beacon frame shown in FIG. 14.

First, the control unit of the information processing device 200 stores a set of the detection threshold of each physical header, and the application level of each physical header and the index of each physical header in the beacon (421). Then, the control unit of the information processing device 200) transmits the beacon to the subordinate information processing devices (422 and 423).

When the beacon from the control unit of the information processing device 200 is received (423), the control unit 150 of the information processing device 100 acquires and retains the content of "Multi Detect Parameter" 311 (shown in FIG. 14) included in the beacon (424).

When the content of "Multi Detect Parameter" 311 included in the subsequent beacon is changed, the control unit 150 of the information processing device 100 adopts and retains new information after the change in the content. That is, the old information is updated.

When the content of "Multi Detect Parameter" 311 is already acquired and retained, the control unit 150 of the information processing device 100 updates the retained content based on a newly received beacon (424).

The example in which the control unit of the information processing device 200 notifies each information processing device of the physical header parameters using the beacon has been described FIG. 15, but the physical header parameters may be notified of using a signal other than the beacon. For example, the control unit of the information processing device 200 may perform the notification using a unicast data frame or management frame to a subordinate terminal using determination by the self-device or an information acquisition request from the subordinate terminal as a trigger. In this case, the control unit 150 of the information processing device 100 similarly acquires and retains the content of "Multi Detect Parameter" included in the unicast frame.

[Operation Example of Use Physical Header Decision Process]

Figure 16:
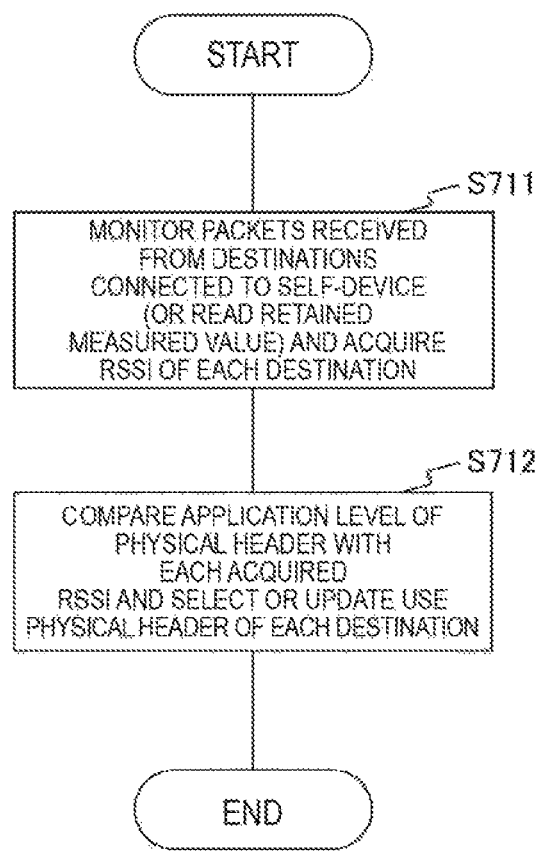
FIG. 16 is a flowchart showing an example of a processing order of a use physical header decision process by the information processing device 100 according to the first embodiment of the present technology.

FIG. 16 is a flowchart showing an example of a processing order of a use physical header decision process (transmission physical header selection process) by the information processing device 100 according to the first embodiment of the present technology.

First, the control unit 150 of the information processing device 100 monitors packets received from designations connected to the self-device and acquires the RSSI of each designation (step S711). The RSSI (monitoring result) acquired in this way is set to RSSI_peer.

When measured values of the packets received from the destinations connected to the self-device are retained, the control unit 150 of the information processing device 100 may read the measured value to acquire the RSSI of each destination (step S711).

Here, in the case of the information processing device (for example, the information processing device 100) connected to the master station (for example, the information processing device 200), only the master station is basically set as the destination. In this case, the reception level of a previous beacon may be used as a monitoring result.

Subsequently, the control unit 150 of the information processing device 100 compares the acquired RSSI_peer to the application level L_near of the physical header and decides the index of the physical header to be used for transmission by the self-device based on the comparison result (step S712). The application level L_near of the physical header is included in the beacon transmitted from the information processing device 200.

For example, when the acquired RSSI_peer is greater than the application level L_near of the physical header, the control unit 150 of the information processing device 100 decides 1 (for the short distance) as the index of the physical header to be used for transmission by the self-device (step S712). Conversely, when the acquired RSSI_peer is equal to or less than the application level L_near of the physical header, the control unit 150 of the information processing device 100 decides 0 (for the long distance) as the index of the physical header to be used for transmission by the self-device (step S712).

When the index of the physical header to be used for transmission by the self-device is already decided and a new index is decided, the already decided index is updated to the new index (step S712).

In FIG. 16, the example in which the use physical header is decided based on the classification of two values of the short distance and the long distance has been described, but the use physical header may be decided based on classification of three or more values (N values). For example, the application levels of the PLCPs are set to L_0, L_1, . . . , L_N in order for the long distance. In this case, n satisfying the following relation expression (Expression 10) is selected as the index of the physical header to be used for transmission. Here, Expression 10 is description in which calculation in logarithm (dB) is assumed.

$$L\_n \leq \text{RSSI\_peer} < L\_n+1 \quad \text{Expression 10}$$

(where n=0 to N)

The operation example of the slave station side in the case of uplink transmission from the slave station side to the master station side has been described with reference to FIG. 16. In the case of downlink transmission, however, the same operation may be performed on the master station side.

The example in which the RSSI is used has been described in FIG. 16. However, the correlation output strength COL may be used instead of the RSSI.

[Operation Example of Transmission and Reception Process]

Figure 17:
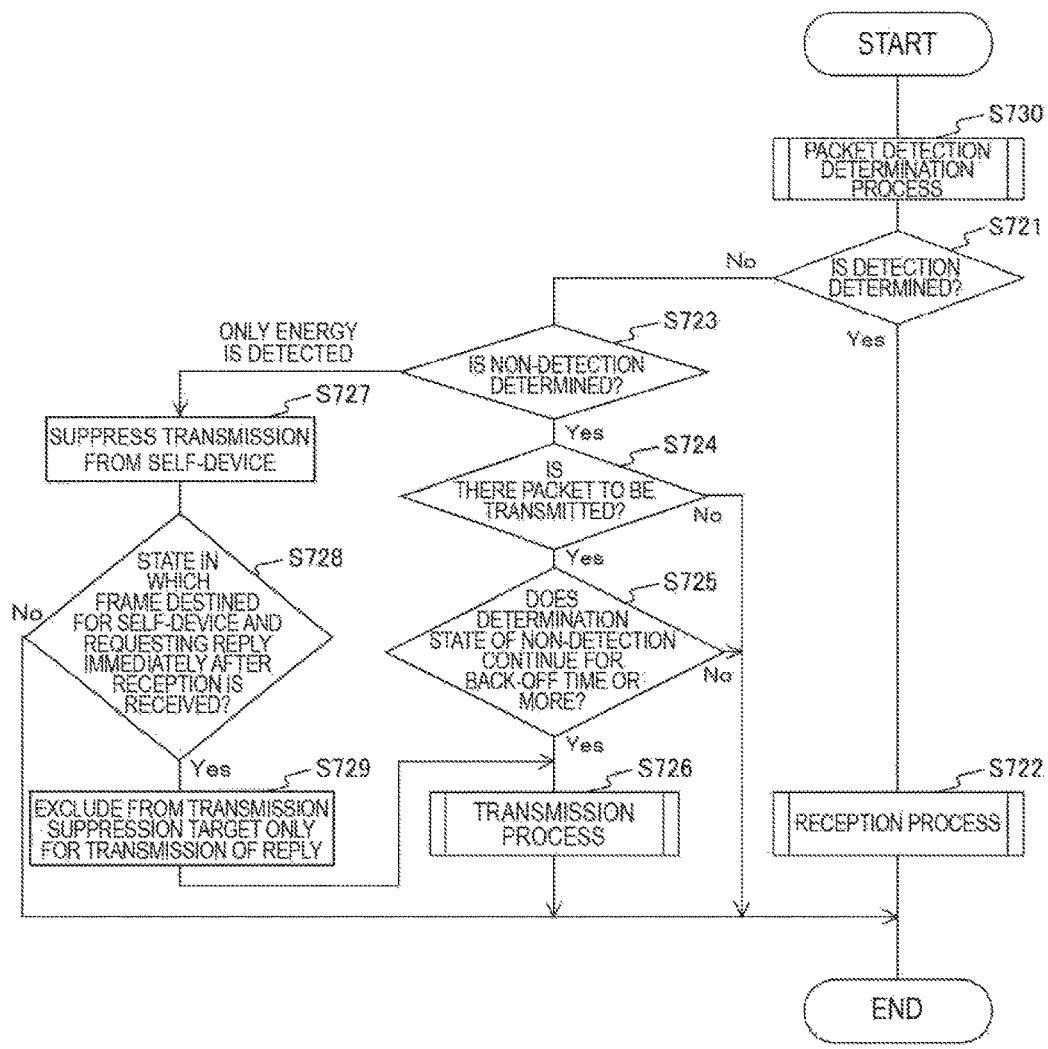
FIG. 17 is a flowchart showing an example of a processing order of a transmission and reception process by the information processing device 100 according to the first embodiment of the present technology.

FIG. 17 is a flowchart showing an example of a processing order of a transmission and reception process by the information processing device 100 according to the first embodiment of the present technology. In FIG. 17, the information processing device 100 will be described, but the same can also apply to the other information processing devices (for example, the information processing device 200). That is, the transmission and reception process is the same on both of the master station side and the terminal side.

The control unit 150 of the information processing device 100 performs a packet detection determination process for a time other than during transmission and during reception (step S730). The packet detection determination process will be described in detail with reference to FIG. 18.

Subsequently, the control unit 150 of the information processing device 100 determines whether a determination result obtained in the packet detection determination process is "detection" (step S721). When the determination result obtained in the packet detection determination process is "detection" (step S721), the control unit 150 of the information processing device 100 performs a reception process of continuing reception (step S722). Then, after the reception is completed, the control unit 150 of the information processing device 100 returns to a waiting state. When the received packet is destined for the self-device and an instant reply is requested, the control unit 150 of the information processing device 100 adds and transmits a physical header including the same "Link Strength Category" field as a target packet. That is, portions in the SIGNAL field in which the information regarding the detection thresholds is stored are set to be the same, and information decided in the self-device is stored in other portions (for example, Modulation and Coding Scheme (MCS) and length).

When the determination result obtained in the packet detection determination process is not "detection" (step S721), the control unit 150 of the information processing device 100 determines whether the determination result obtained in the packet detection determination process is "non-detection" (step S723). When the determination result obtained in the packet detection determination process is "non-detection" (step S723), the control unit 150 of the information processing device 100 determines whether there is a packet to be transmitted (step S724).

When there is a packet to be transmitted, the control unit 150 of the information processing device 100) determines whether a determination state of the non-detection continues for an inter frame space (IFS) and a backoff time or more as defined in the procedure of Carrier Sense Multiple Access with Collision Avoidance (CSMA/CA) (step S725).

When the determination state of the non-detection continues for the IFS and the backoff time or more (step S725), the control unit 150 of the information processing device 100 performs a transmission process since transmission can be performed (step S726). In the transmission process, for example, the control unit 150 of the information processing device 100 uses the physical header with the format of the PPDU shown in FIG. 7 for the transmission based on the index of the physical header decided in the transmission physical header decision process shown in FIG. 16.

Specifically, when 1 (for the short distance) is decided as the index in the transmission physical header decision process, the control unit 150 of the information processing device 100 stores 1 in the "Link Strength Category field" to perform the transmission (step S726). Conversely, when 0 (for the long distance) is decided as the index in the transmission physical header decision process, the control unit 150 of the information processing device 100 stores 0 in "Link Strength Category field" to perform the transmission (step S726).

For example, the control unit 150 of the information processing device 100 selects a modulation and communication path coding scheme by which a destination device can perform reception at a high probability according to the detection threshold corresponding to the decided physical header for the purpose of modulation used in a data portion, and performs the transmission using the selected scheme. For example, the control unit 150 of the information processing device 100 may select a modulation and communication path coding scheme (MCS (Modulation and Coding Scheme)) by which a destination device can perform reception at a high probability according to the detection threshold corresponding to the decided physical header and perform the transmission. When there is no packet to be transmitted, the state returns to the waiting state.

When the determination result obtained in the packet detection determination process is not "non-detection" (when the determination result is "only-energy detection") (step S723), the control unit 150 of the information processing device 100 basically treats a wireless state as a busy state and suppresses transmission from the self-device (step S727). Here, the control unit 150 of the information processing device 100 performs the transmission of the reply packet (step S729) only when the packet destined for the self-device is received and a reply immediately after the reception is requested (step S728).

Figure 18:
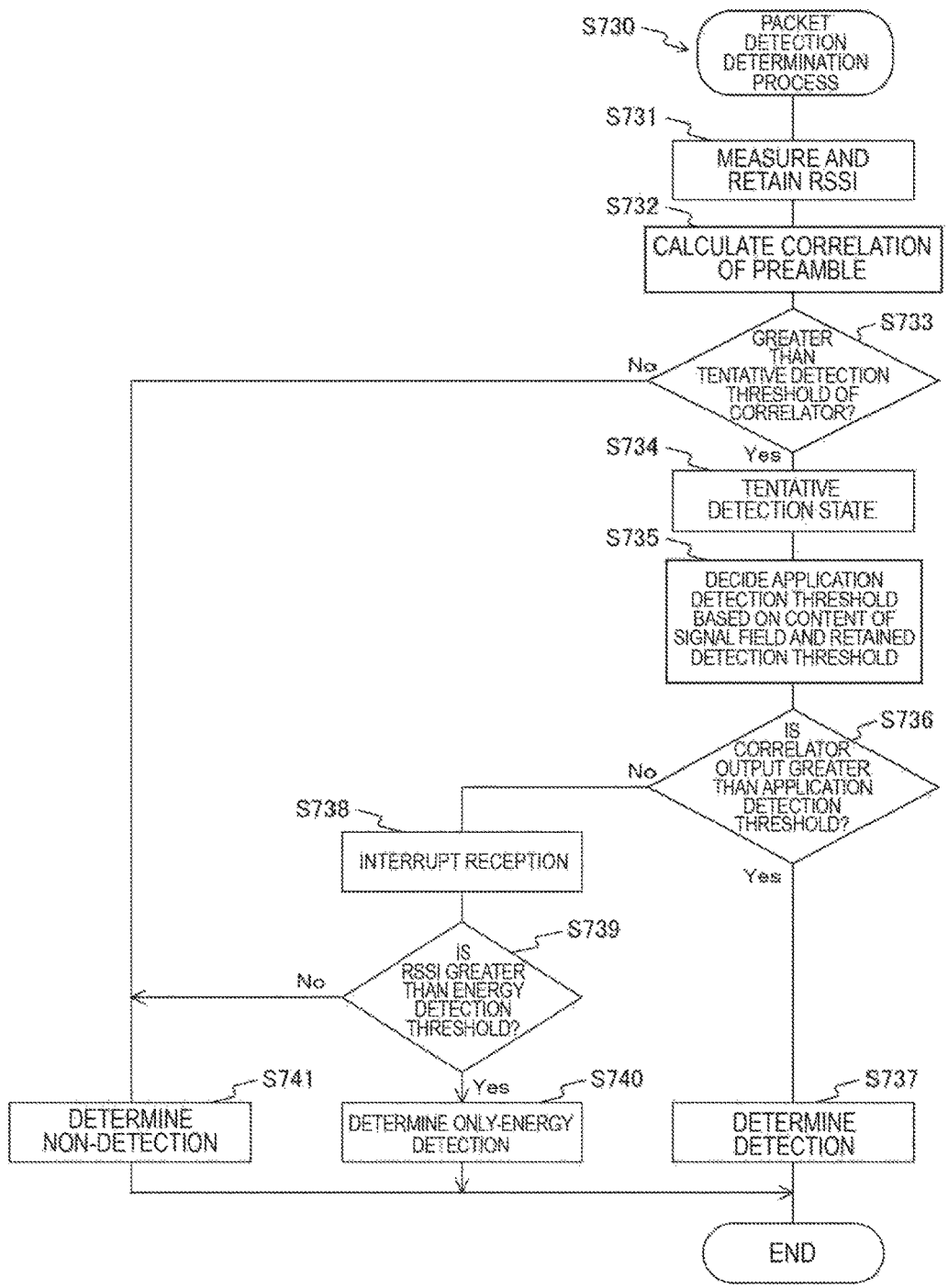
FIG. 18 is a flowchart showing a packet detection determination process in the transmission and reception process by the information processing device 100 according to the first embodiment of the present technology.

FIG. 18 is a flowchart showing a packet detection determination process (the processing order of step S730 shown in FIG. 17) in the transmission and reception process by the information processing device 100 according to the first embodiment of the present technology.

First, the control unit 150 of the information processing device 100 performs measurement of the RSSI on a signal input via the antenna 141 and retains the RSSI obtained through the measurement (step S731).

Subsequently, the control unit 150 of the information processing device 100 performs correlation calculation of a Preamble pattern to obtain a correlator output (step S732). The correlator output is the above-described correlation output strength COL. That is, the correlator output is not a normalized correlator output level, but is a correlator output converted by reflecting reception power.

Subsequently, the control unit 150 of the information processing device 100 compares the value of the correlator output to a tentative detection threshold to determine whether the value of the correlator output is greater than the tentative detection threshold (step S733). Here, the tentative detection is detection performed to determine whether to read the SIGNAL field before the detection determination. The tentative detection value is set to a value that is equal to or less than both of PD_near and PD_far described above. The tentative detection threshold may be set to PD_default described above.

When the value of the correlator output is greater than the tentative detection threshold (step S733), the control unit 150 of the information processing device 100 determines that the state is the tentative detection state (step S734).

Subsequently, the control unit 150 of the information processing device 100 reads "Link Strength Category field" in the subsequent SIGNAL field of the physical header. As described above, information indicating the detection threshold to be applied is stored in "Link Strength Category field."

Here, the control unit 150 of the information processing device 100 retains the content of "Preamble Detection Threshold" shared in the physical header parameter sharing process shown in FIG. 15. The control unit 150 of the information processing device 100 decides the detection threshold to be applied (an application detection threshold) based on the content of "Preamble Detection Threshold" and the content of "Link Strength Category field" (step S735).

For example, in the case of Link Strength Category=0, the control unit 150 of the information processing device 100 decides PD_far as the application detection threshold. Conversely, in the case of Link Strength Category=1, the control unit 150 of the information processing device 100 decides PD_near as the application detection threshold. When the transmission and reception process is performed, the control unit 150 of the information processing device 100 uses the decided application detection threshold (PD_far or PD_near).

Subsequently, the control unit 150 of the information processing device 100 compares the measured and retained RSSI to the decided application detection threshold to determine whether the RSSI is greater than the application detection threshold (PD_far or PD_near) (step S736). When the RSSI is greater than the application detection threshold (step S736), the control unit 150 of the information processing device 100 sets the packet detection determination result as "detection" (step S737).

Here, the packet detection determination result may be set to "detection" only when another condition is satisfied. For example, an error detection code including "Link Strength Category field" as a target may be set up in a reserved field remaining in the SIGNAL field. A condition that validity of the content of "Link Strength Category field" be confirmed by the error detection code including "Link Strength Category field" as the target may be set as an additional determination condition.

Here, the error detection code including "Link Strength Category field" as the target may be inserted into a reserved field remaining in the service field. A condition that validity of the content of "Link Strength Category field" be confirmed by the error detection code including "Link Strength Category field" as the target may be set as an additional determination condition.

Conversely, when the RSSI is equal to or less than the application detection threshold (step S736), the control unit 150 of the information processing device 100 interrupts the reception (step S738). Subsequently, the control unit 150 of the information processing device 100 compares the RSSI to an energy detection threshold ED to determine whether the RSSI is greater than the energy detection threshold ED (step S739). Here, for example, the energy detection threshold ED can be set to −62 dBm every 20 MHz bandwidth.

When the RSSI is greater than the energy detection threshold ED (step S739), the control unit 150 of the information processing device 100 sets the packet detection determination result to "only-energy detection" (step S740).

When the RSSI is equal to or less than the energy detection threshold ED (step S739), the control unit 150 of the information processing device 100 sets the packet detection determination result to "non-detection" (step S741).

Each of the above-described comparison processes may be performed using the above-described correlation output strength COL instead of the RSSI.

According to the first embodiment of the present technology, the master stations and the slave stations can perform the transmission and reception process simultaneously (or substantially simultaneously) and can reuse radio resources.

For example, when a slave station (for example, the information processing device 100) performs transmission to a master station (for example, the information processing device 200), a case in which a slave station (for example, the information processing device 102) of the OBSS side starts transmission before that transmission is assumed.

Even in this case, the control unit 150 of the information processing device 100 performs the detection determination according to the physical header using the detection threshold PD_near or PD_far of the physical header. For example, as shown in FIG. 12, the carrier sense detection ranges 31 and 33 of the information processing device 100 are set. Thus, while the information processing device 102 transmits a signal, the control unit 150 of the information processing device 100 can treat the signal as not being detected and can perform transmission to the information processing device 200.

When the information processing device 100 can perform transmission but the information processing device 200 receives transmission of the information processing device 102 earlier, the information processing device 200 may not receive the transmission from the information processing device 100. Accordingly, in the first embodiment of the present technology, as shown in FIG. 13, the carrier sense detection ranges 41 and 43 of the information processing device 200 are set. Accordingly, the information processing device 200 can wait for reception from the information processing device 100 since the transmission of the information processing device 102 is not detected.

Here, when the information processing device 200 uniformly raises the detection thresholds, there is a concern of the packets from the information processing device 101 being undetectable. Accordingly, since transmission from the information processing device 101 (the legacy device) located at a long distance is treated with a long-distance physical header to be detected, the long-distance detection threshold is applied. Thus, the information processing device 200 can smoothly receive reception from each information processing device.

Here, when the IEEE 802.11 standard is assumed, the detection threshold of the L-STF portion can be set as the "detection threshold" in the first embodiment of the present technology. However, instead of the detection threshold of the L-STF portion, the detection threshold of the L-LTE portion may be set or the detection threshold common to both of the L-STF portion and the L-LTF portion may be set. By independently changing the detection thresholds of the L-STF portion and the L-LTF portion, both of the detection thresholds may be designated as the physical header parameters.

The physical header parameters of the self-device may be decided based on Capability which can be used by the other information processing devices.

2. Second Embodiment

In the first embodiment of the present technology, the example in which the transmission suppression is temporarily cancelled even when the packet detection determination result is "only-energy detection" and the transmission suppression is set has been described. That is, the example in which the transmission suppression is temporarily cancelled despite the setting of the transmission suppression to transmit the reply packet only when the packet destined for the self-device is received and the reply immediately after the reception is requested has been described.

In a second embodiment of the present technology, an example in which none of the transmission is performed when the packet detection determination result is "only-energy detection" and the transmission suppression is set will be described. The configurations of information processing devices in the second embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

Some of the processes and the formats in the second embodiment of the present technology are common to those of the first embodiment of the present technology. Therefore, the same reference numerals as those of the first embodiment of the present technology are given to common portions to those of the first embodiment of the present technology, and the description thereof will be partially omitted.

[Operation Example of Transmission and Reception Process]

Figure 19:
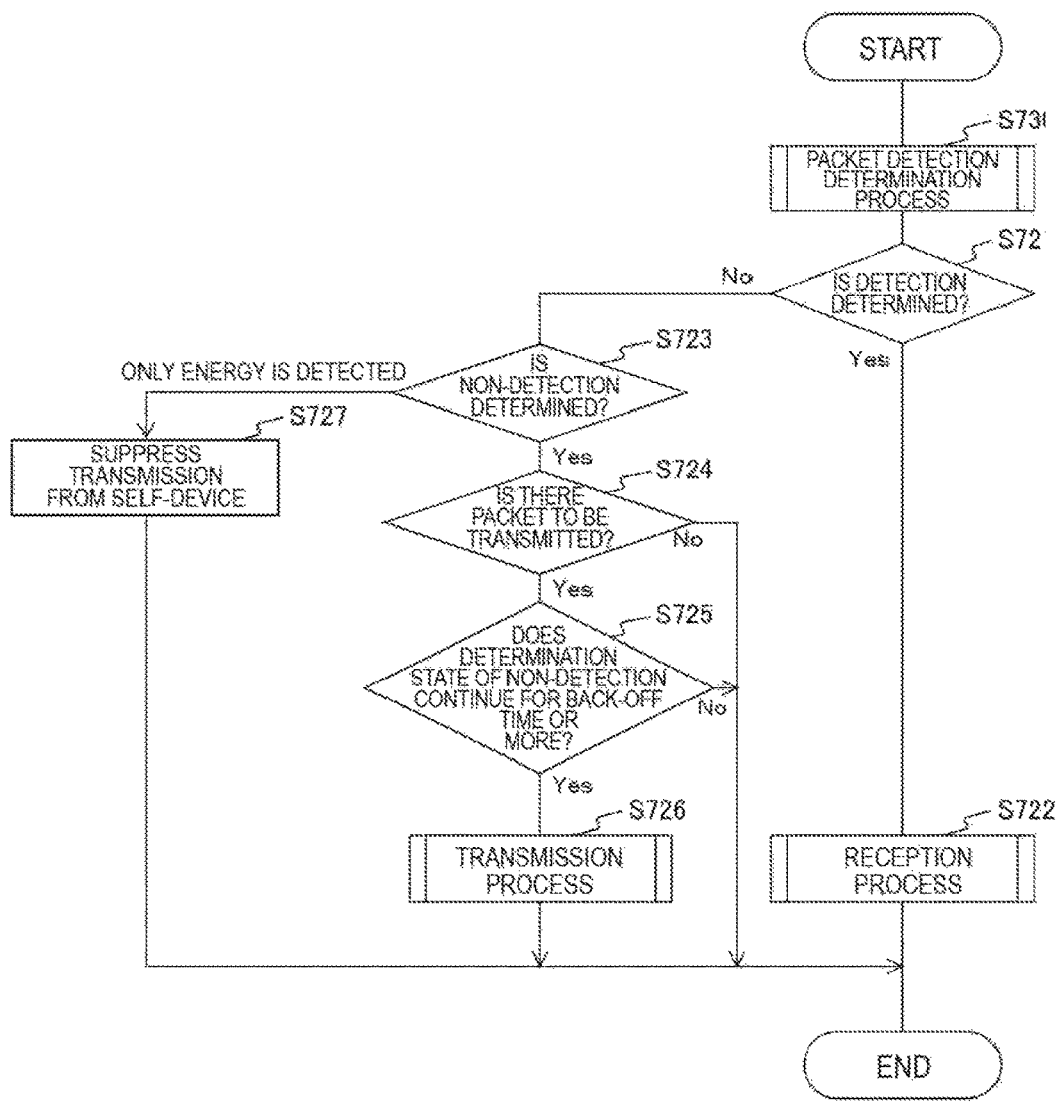
FIG. 19 is a flowchart showing an example of a processing order of the transmission and reception process by the information processing device 100 according to a second embodiment of the present technology.

FIG. 19 is a flowchart showing an example of a processing order of the transmission and reception process by the information processing device 100 according to the second embodiment of the present technology. In FIG. 19, a part of the transmission and reception process shown in FIG. 17 is modified. Therefore, the same reference numerals as those of FIG. 17 are given to common portions to the transmission and reception process shown in FIG. 17, and the description thereof will be partially omitted.

When the determination result obtained in the packet detection determination process is "only-energy detection" (step S723), the control unit 150 of the information processing device 100 basically treats a wireless state as a busy state and suppresses transmission from the self-device (step S727). When the wireless state is treated as the busy state in this way, all of the transmission is suppressed in the second embodiment of the present technology.

In this way, in the second embodiment of the present technology, all of the transmission is suppressed when the determination result obtained in the packet detection determination process is "only-energy detection." Thus, it is possible to further improve safety of the operation of the transmission and reception process.

3. Third Embodiment

In the first embodiment of the present technology, the example in which Link Strength Category field is set up in the SIGNAL field of the IEEE 802.11 standard has been described.

In a third embodiment of the present technology, an example in which Link Strength Category field is set up in a service field of the IEEE 802.11 standard will be described. The configurations of information processing devices in the third embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

Some of the processes and the formats in the third embodiment of the present technology are common to those of the first embodiment of the present technology. Therefore, the same reference numerals as those of the first embodiment of the present technology are given to common portions to those of the first embodiment of the present technology, and the description thereof will be partially omitted.

[Example of Format of PPDU]

FIG. 20 is a diagram showing an example of the format of a PPDU exchanged between the devices included in the communication system 10 according to the third embodiment of the present technology.

Here, the example shown in FIG. 20 is the same as the example shown in FIG. 7 except that Link Strength Category field is set up in a Service field rather than in the SIGNAL field. Accordingly, the same reference numerals as those of FIG. 7 are given to common portions to those of FIG. 7, and the description thereof will be partially omitted.

The PPDU is configured to include Preamble 301, SIGNAL 307, Extension 303, Service 308, MPDU 305, and FCS 306.

Here, in the third embodiment of the present technology, "Link Strength Category field" is newly prepared in a part of the field of Service 308 of the physical header. That is, "Link Strength Category field" is newly set up in a portion treated as being reserved in Service 308 of the physical header. Then, each information processing device (other than a legacy device) changes "Link Strength Category field" according to the quality of a link with a destination at the time of transmission.

In this way, in the third embodiment of the present technology, "Link Strength Category field" is set up in the portion treated as being reserved in Service 308. Thus, as in the first embodiment of the present technology, it is possible to realize the specific function without interfering with reception of the legacy device.

[Operation Example of Transmission and Reception Process]

By replacing "SIGNAL field" with "Service field" in the transmission and reception process (step S735) shown in FIG. 18 and performing the same process as the transmission and reception process shown in FIGS. 17 and 18, it is possible to realize the third embodiment of the present technology.

Here, the error detection code including "Link Strength Category field" as the target may be inserted into a reserved field remaining in the service field. A condition that validity of the content of "Link Strength Category field" be confirmed by the error detection code including "Link Strength Category field" as the target may be set as an additional determination condition.

In this way, in the third embodiment of the present technology, Link Strength Category field is set up in the Service field of the IEEE 802.11 standard. Thus, more information can be stored than in the first embodiment of the present technology. For example, even when the modes of PLCP are set with multiple values, the information can be appropriately stored.

4. Fourth Embodiment

In the first to third embodiments of the present technology, the examples in which the detection thresholds of PLCP are changed based on the content of the fields of the physical header have been described.

In a fourth embodiment of the present technology, an example in which a plurality of preamble sequences with different detection thresholds are used on a transmission side and preamble correlation detectors applied by the RSSI are switched on a reception side will be described. Thus, the reception side can receive only a desired packet. The configurations of information processing devices in the fourth embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

Some of the processes and the formats in the fourth embodiment of the present technology are common to those of the first embodiment of the present technology. Therefore, the same reference numerals as those of the first embodiment of the present technology are given to common portions to those of the first embodiment of the present technology, and the description thereof will be partially omitted.

[Example of Format of PPDU]

FIG. 21 is a diagram showing an example of the format of a PPDU exchanged between the devices included in the communication system 10 according to the fourth embodiment of the present technology.

Here, the example shown in FIG. 21 is the same as the example shown in FIG. 7 except that Link Strength Category field is not set up in the SIGNAL field, but the plurality of Preamble sequences are defined. Accordingly, the same reference numerals as those of FIG. 7 are given to common portions to those of FIG. 7, and the description thereof will be partially omitted.

The PPDU is configured to include Preamble 311, SIGNAL 312, Extension 303, Service 304, MPDU 305, and FCS 306.

Here, in the fourth embodiment of the present technology, a sequence of a plurality of Preambles 311 is defined. For example, as shown in a of FIG. 21, a sequence such as "Preamble #1" is defined in Preamble 311. As shown in b of FIG. 21, a sequence such as "Preamble #0" is defined. Then, each information processing device (other than the legacy device) changes the sequence to be used according to the quality of the link with the destination at the time of transmission. FIG. 21 shows an example in which two kinds of Preambles are prepared, but three or more kinds of Preambles may be prepared.

In the fourth embodiment of the present technology, the physical header in which the sequence such as "Preamble #0" is used in Preamble 311 is referred to as a "long-distance physical header." The physical header in which the sequence such as "Preamble #1" is used in Preamble 311 is referred to as a "short-distance physical header." The Preamble sequences are generated by different rules and have low mutual correlation. Preamble sequence #0 is assumed to be the same sequence as the Preamble used by the legacy device.

Each information processing device (other than the legacy device) receiving the packet that includes such a physical header changes the correlator (and the thresholds determined in detection) to be applied according to the magnitude of the RSSI of a signal.

Here, when the IEEE 802.11 standard is assumed, "another Preamble" is assumed to mean that at least one of L-STF and L-LTF is different.

[Operation Example of Transmission and Reception Process]

Figure 22:
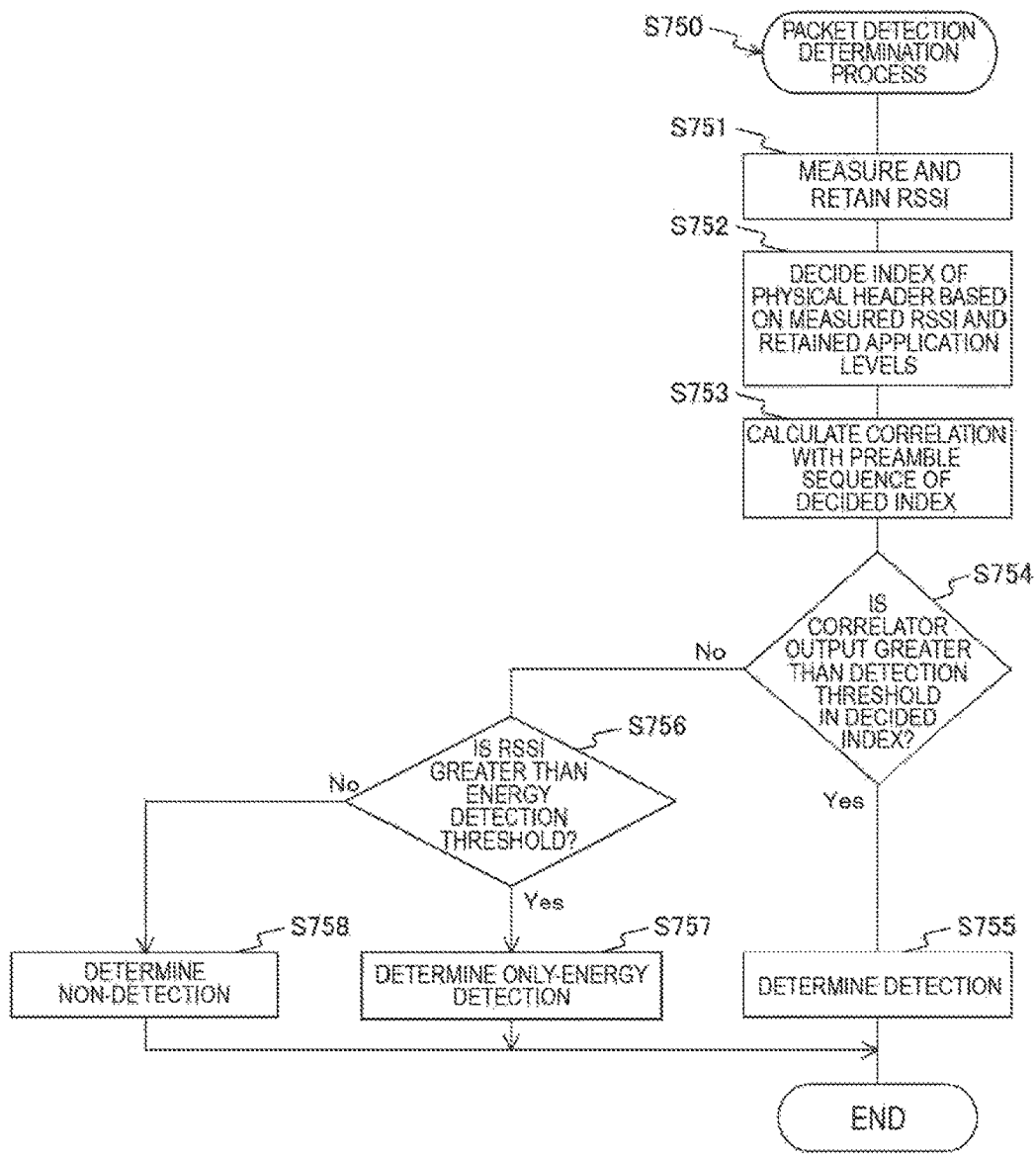
FIG. 22 is a flowchart showing a packet detection determination process in the transmission and reception process by the information processing device 100 according to the fourth embodiment of the present technology.

FIG. 22 is a flowchart showing a packet detection determination process (the processing order of step S730 shown in FIG. 17) in the transmission and reception process by the information processing device 100 according to the fourth embodiment of the present technology.

First, the control unit 150 of the information processing device 100 performs measurement of the RSSI on a signal input via the antenna 141 and retains the RSSI obtained through the measurement (step S751).

Subsequently, the control unit 150 of the information processing device 100 compares the measured RSSI to the retained application levels (L_far and L_near) of the physical headers and decides the index of the physical header to be applied to detection (step S752). For example, as in the selection method of selecting the transmission physical header of the self-device, it is possible to decide the index of the physical header to be applied to the detection.

For example, when the measured RSSI is compared to the value of L_near and the measured RSSI is greater than L_near, the control unit 150 of the information processing device 100 decides 1 (for the short distance) as the index of the physical header to be used for the correlation detection of the self-device. Conversely, when the measured RSSI is equal to or less than L_near, the control unit 150 of the information processing device 100 decides 0 (for the long distance) as the index of the physical header to be used for the correlation detection of the self-device.

In the decision procedure, it is assumed that there is no difference in transmission power between the slave and master stations. However, when information regarding a difference in the transmission power is retained in advance despite the difference in the transmission power between the slave and master stations, the determination can be performed after appropriate correction is applied based on the retained information regarding the difference in the transmission power.

Subsequently, the control unit 150 of the information processing device 100 performs correlation calculation using the correlator corresponding to the preamble sequence generated by the different rules, as described above, in the physical header with the decided index (step S753). Here, a correlator output is a correlation output strength COL as in the first embodiment of the present technology. That is, the correlator output is not a normalized correlator output level, but is a correlator output converted by reflecting reception power.

Subsequently, the control unit 150 of the information processing device 100 compares the correlator output of the selected correlator to the detection threshold of the physical header in the decided index to determine whether the value of the correlator output is greater than the detection threshold (step S754).

When the value of the correlator output is greater than the detection threshold (step S754), the control unit 150 of the information processing device 100 sets the packet detection determination result as "detection" (step S755).

When the value of the correlator output is equal to or less than the detection threshold (step S754), the control unit 150 of the information processing device 100 compares the measured RSSI to the energy detection threshold ED (step S756). Then, the control unit 150 of the information processing device 100 determines whether the RSSI is greater than the energy detection threshold ED (step S756).

When the RSSI is greater than the energy detection threshold ED (step S756), the control unit 150 of the information processing device 100 sets the packet detection determination result to "only-energy detection" (step S757).

When the RSSI is equal to or less than the energy detection threshold ED (step S756), the control unit 150 of the information processing device 100 sets the packet detection determination result to "non-detection" (step S758).

Here, when the IEEE 802.11 standard is assumed, the detection threshold of the L-STF portion can be set as the "detection threshold" in the fourth embodiment of the present technology. However, instead of the detection threshold of the L-STF portion, the detection threshold of the L-LTE portion may be set or the detection threshold common to both of the L-STF portion and the L-LTF portion may be set. By independently changing the detection thresholds of the L-STF portion and the L-LTF portion, both of the detection thresholds may be designated as the physical header parameters.

5. Fifth Embodiment

A fifth embodiment of the present technology is a modification example of the fourth embodiment of the present technology. An example in which a master station side selects a physical header which is used by a subordinate information processing device will be described. An example in which a reception side operates correlators of preamble sequences which are candidates normally in parallel will be described.

The configurations of information processing devices in the fifth embodiment of the present technology are substantially the same as the configurations of the information processing devices 100 to 103, 200, and 201 shown in FIG. 1 and the like. Therefore, the same reference numerals as those of the first to fourth embodiments of the present technology are given to common portions to those of the first to fourth embodiments of the present technology, and the description thereof will be partially omitted.

Some of the processes and the formats in the fifth embodiment of the present technology are common to those of the first to fourth embodiments of the present technology. Therefore, the same reference numerals as those of the first to fourth embodiments of the present technology are given to common portions to those of the first to fourth embodiments of the present technology, and the description thereof will be partially omitted.

[Example of Beacon Frame Format]

Figure 23:
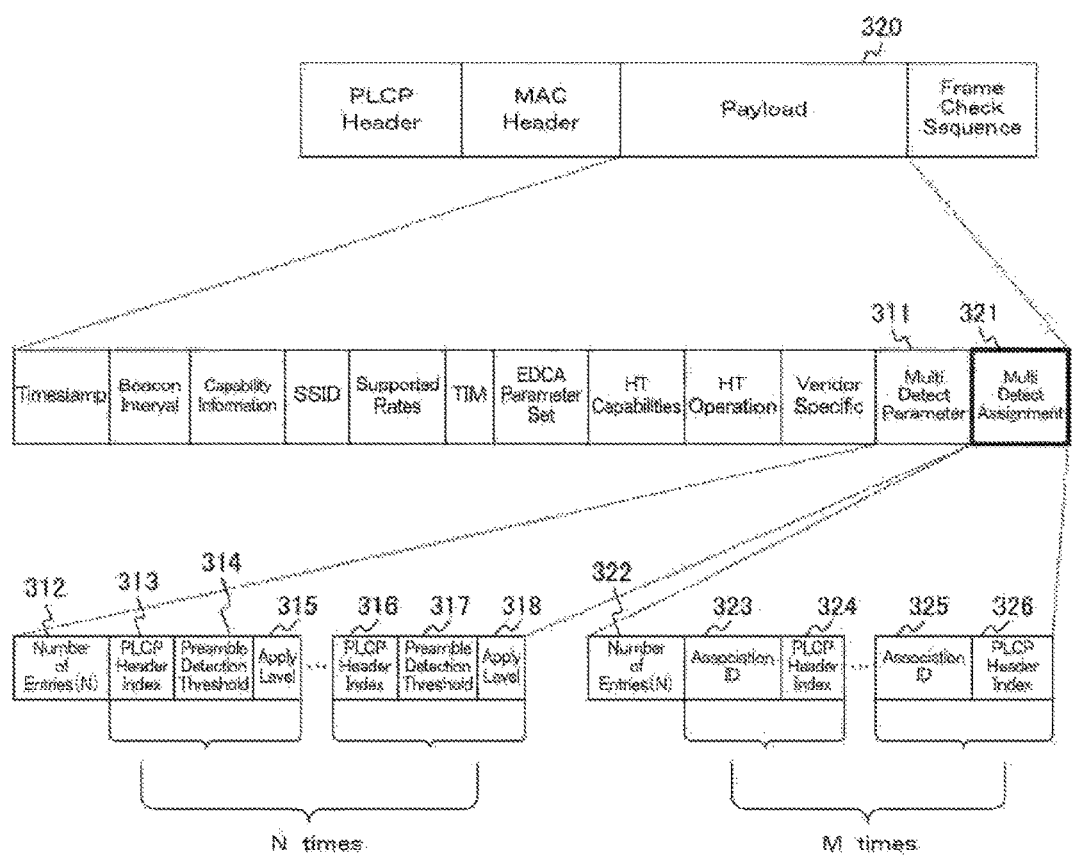
FIG. 23 is a diagram showing an example of a beacon frame format exchanged between devices included in a communication system 10 according to a fifth embodiment of the present technology.

FIG. 23 is a diagram showing an example of a beacon frame format exchanged between the devices included in a communication system 10 according to the fifth embodiment of the present technology. Since FIG. 23 is a modification example of FIG. 14, the same reference numerals as those of FIG. 14 are given to common portions to those of FIG. 14, and the description thereof will be partially omitted.

FIG. 23 shows an example in which an element such as "Multi Detect Assignment" 321 is newly added to Payload 320 along with "Multi Detect Parameter" 311.

In "Multi Detect Assignment" 321, information for specifying the subordinate information processing devices is stored in "Association ID" 323 and 325. In FIG. 23, the example in which Association ID is stored as the information for specifying the information processing devices is shown, but other information capable of specifying the information processing devices may be stored. For example, MAC addresses may be stored.

The index (0 or 1) of the physical header to be used by the information processing devices is stored in "PLCP Header Index" 324 and 326. Such combinations are arranged and stored in regard to all of the subordinate information processing devices (other than the legacy devices).

The control unit of the information processing device 200 transmits a beacon in which the information indicated in "Multi Detect Parameter" 311 and "Multi Detect Assignment" 321 is stored to nearby information processing devices to inform the nearby information processing devices of the beacon.

[Communication Example of Physical Header Parameter Sharing Process]

Figure 24:
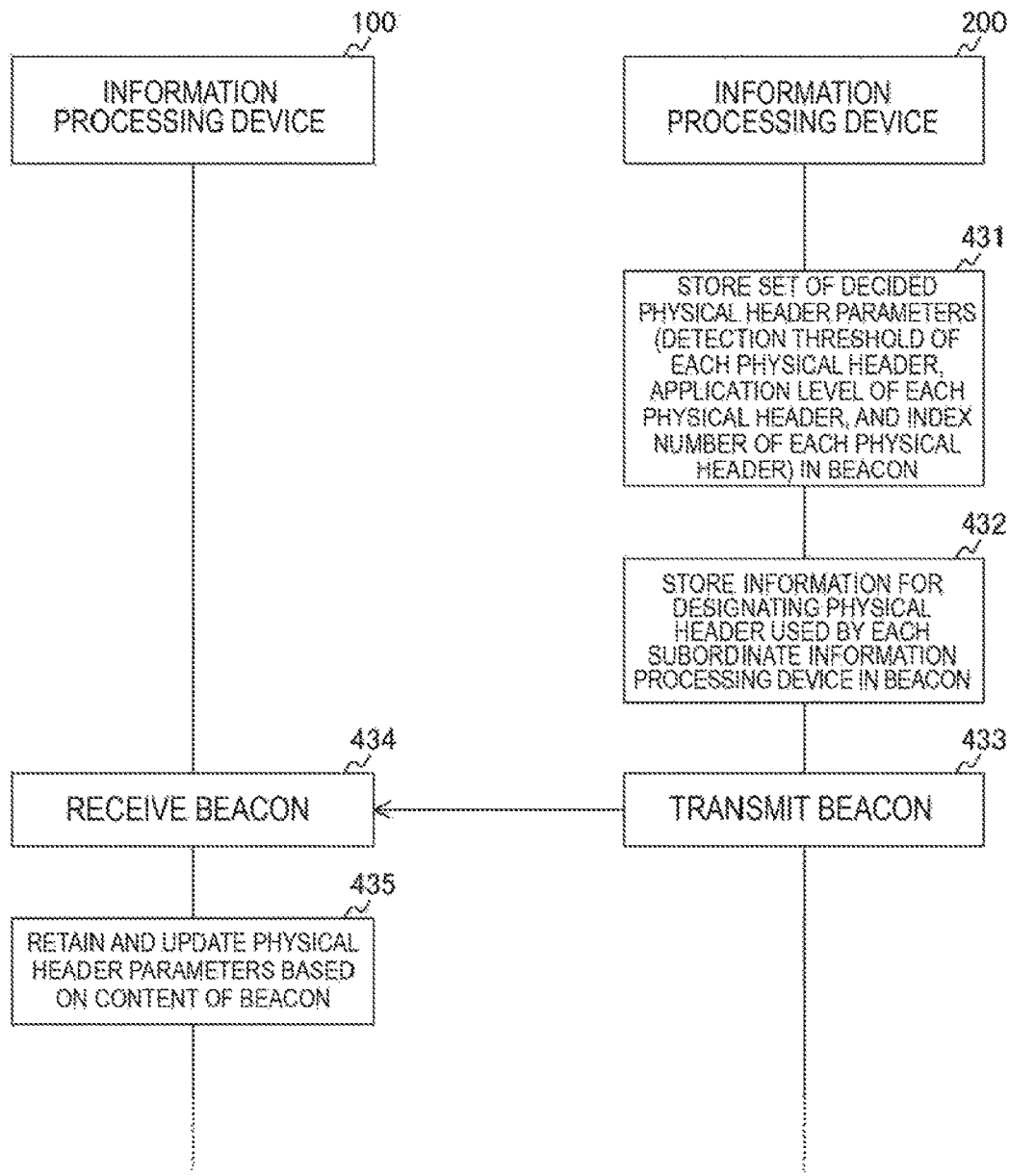
FIG. 24 is a sequence chart showing an example of a connection process between the devices included in the communication system 10 according to the fifth embodiment of the present technology.

FIG. 24 is a sequence chart showing an example of a connection process between the devices included in the communication system 10 according to the fifth embodiment of the present technology.

Since FIG. 24 is a modification example of FIG. 15, the description of common portions to those of FIG. 15 will be partially omitted. That is, FIG. 24 shows an example in which physical header parameters are included in a beacon to be transmitted and information for designating the physical header to be used by each subordinate information processing device is also included in the beacon to be transmitted.

First, the control unit of the information processing device 200 stores a set of the detection threshold of each physical header, and the application level of each physical header and the index of each physical header in "Multi Detect Parameter" 311 (shown in FIG. 23) of the beacon (431).

The control unit of the information processing device 200 stores the set of the information for designating the physical header to be used by each subordinate information processing device in "Multi Detect Assignment" 321 (shown in FIG. 23) of the beacon (432).

Here, a case in which content of the "Multi Detect Assignment" field is stored will be described. The control unit of the information processing device 200 confirms whether a generation function and a correlation detection function for the Preamble sequences designated by the Capability of each subordinate information processing device are supported, and then stores only the corresponding Preamble sequence. When each subordinate information processing device corresponding to a specific function selects the physical header to be used, information regarding link quality between the master station and each subordinate slave station is determined to be used. Therefore, packets received from destinations connected to the self-device are monitored (or retained measured values are read) and the RSSI for each destination is acquired to be used. Instead of the RSSI, the above-described correlation output strength COL may be used.

Subsequently, the control unit of the information processing device 200 transmits the beacon to the subordinate information processing devices (433 and 434).

When the beacon from the information processing device 200 is received (434), the control unit ISO of the information processing device 100 acquires and retains each piece of content included in the beacon (435). That is, the control unit 150 of the information processing device 100 acquires and retains the content of "Multi Detect Parameter" 311 and the content of "Multi Detect Assignment" 321 (shown in FIG. 23) included in the beacon (435).

The control unit 150 of the information processing device 100 uses the corresponding physical header according to the index of the physical header designated with the beacon by the master station (the information processing device 200). That is, the control unit 150 of the information processing device 100 does not perform the autonomous determination.

[Operation Example of Transmission and Reception Process]

Figure 25:
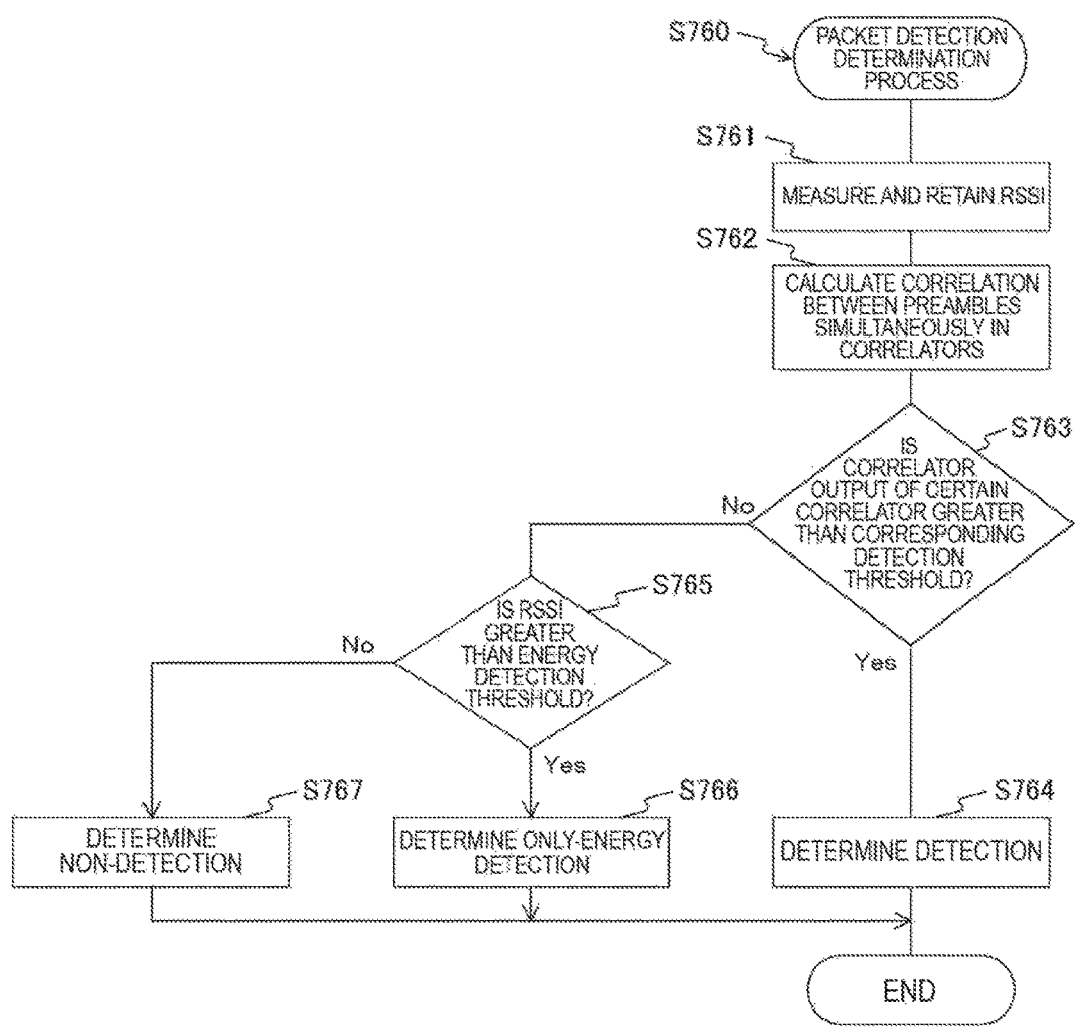
FIG. 25 is a flowchart showing a packet detection determination process in the transmission and reception process by the information processing device 100 according to the fifth embodiment of the present technology.

FIG. 25 is a flowchart showing a packet detection determination process (the processing order of step S730 shown in FIG. 17) in the transmission and reception process by the information processing device 100 according to the fifth embodiment of the present technology.

FIG. 25 shows an example in which each master station and each slave station corresponding to the specific function operate all of the correlators of the PLCP Preambles supported by the self-device in parallel.

First, the control unit 150 of the information processing device 100 performs measurement of the RSSI on a signal input via the antenna 141 and retains the RSSI obtained through the measurement (step S761).

Subsequently, the control unit 150 of the information processing device 100 inputs an input signal to each correlator and performs correlation calculation (step S762). That is, the control unit 150 of the information processing device 100 calculates correlation between the preambles simultaneously in the correlators (step S762).

Here, as each detection threshold for determining the detection based on each correlator output, the detection threshold of each physical header designated from the master station is used in the physical header parameter sharing process. The correlator output is the correlation output strength COL as in the first embodiment of the present technology. That is, the correlator output is not a normalized correlator output level, but is a correlator output converted by reflecting reception power.

Subsequently, the control unit 150 of the information processing device 100 determines whether the correlator output of a certain correlator among the plurality of correlators is greater than the corresponding detection threshold (step S763).

When the correlator output of the certain correlator among the plurality of correlators is greater than the corresponding detection threshold (step S763), the control unit 150 of the information processing device 100 sets the packet detection determination result as "detection" (step S764).

When none of the correlator outputs of the plurality of correlators is greater than the corresponding detection threshold (step S763), the control unit 150 of the information processing device 100 compares the measured RSSI to the energy detection threshold ED (step S765). Then, the control unit 150 of the information processing device 100 determines whether the RSSI is greater than the energy detection threshold ED (step S765).

When the RSSI is greater than the energy detection threshold ED (step S765), the control unit 150 of the information processing device 100 sets the packet detection determination result to "only-energy detection" (step S766).

When the RSSI is equal to or less than the energy detection threshold ED (step S765), the control unit 150 of the information processing device 100 sets the packet detection determination result to "non-detection" (step S767).

6. Sixth Embodiment

A sixth embodiment of the present technology is a modification example of the fourth embodiment of the present technology. An example in which a plurality of PLCP preambles for discrimination are generated by processing part of an original sequence rather than completely different sequences will be described. Thus, it is possible to simplify the configuration of the plurality of correlators on a reception side. By setting the preamble sequence of the processing origin as a sequence of a format for a legacy device, it is also possible to detect a preamble for an information processing device not corresponding to a specific function according to a condition, and thus it is possible to allow backward compatibility to partially remain.

The configurations of information processing devices in the sixth embodiment of the present technology are substantially the same as the configurations of the information processing devices 100 to 103, 200, and 201 shown in FIG. 1 and the like. Therefore, the same reference numerals as those of the first to fourth embodiments of the present technology are given to common portions to those of the first to fourth embodiments of the present technology, and the description thereof will be partially omitted.

Some of the processes and the formats in the sixth embodiment of the present technology are common to those of the first to fourth embodiments of the present technology. Therefore, the same reference numerals as those of the first to fourth embodiments of the present technology are given to common portions to those of the first to fourth embodiments of the present technology, and the description thereof will be partially omitted.

[Example of Format of PPDU]

The format of the PPDU in the sixth embodiment of the present technology is the same as the example of the format shown in FIG. 21.

That is, in the sixth embodiment of the present technology, a sequence of a plurality of Preambles 311 (in FIG. 21) is defined. For example, as shown in a of FIG. 21, a sequence such as "Preamble #1" is defined in Preamble 311. As shown in b of FIG. 21, a sequence such as "Preamble #0" is defined. Then, each information processing device (other than the legacy device) changes the sequence to be used according to the quality of the link with the destination at the time of transmission. FIG. 21 shows an example in which two kinds of Preambles are prepared, but three or more kinds of Preambles may be prepared.

In the sixth embodiment of the present technology, the physical header in which the sequence such as "Preamble #0" is used in Preamble 311 is referred to as a "long-distance physical header." The physical header in which the sequence such as "Preamble #1" is used in Preamble 311 is referred to as a "short-distance physical header." Preamble sequence #0 is assumed to be the same sequence as the Preamble used by the legacy device.

Here, the sixth embodiment of the present technology and the fourth embodiment of the present technology are different in a method of generating a Preamble sequence other than Preamble #0. Specifically, in the sixth embodiment of the present technology, a sequence other than Preamble #0 is obtained by processing a part of the content through positive and negative inversion using Preamble #0 as a base. The processing is not limited to the positive and negative inversion. For example, another calculation may be performed, for example, a part of content may be decimated and set to 0, as long as a certain sequence is used as a base to perform the processing.

Here, when the IEEE 802.11 standard is assumed, "another Preamble sequence" is assumed to mean a sequence in which a difference is made by applying the above-described processing to at least one of L-STF and L-LTF.

Each information processing device (other than the legacy device) receiving the packet that includes such a physical header changes the correlation calculation (and the packet detection determination threshold) to be applied according to the magnitude of the RSSI of a signal.

[Operation Example of Physical Header Parameter Decision Process]

A physical header parameter decision process in the sixth embodiment of the present technology is substantially the same as that of the fourth embodiment of the present technology. Here, in the sixth embodiment of the present technology, the following extension may be added to a relation expression of a determination standard of the detection threshold of each physical header.

The above-described Expressions 3 and 6 may be replaced by introducing a threshold offset in which deterioration due to the inclusion of the processing such as the positive and negative inversion is considered into the preamble sequence. For example, when an output expectation value of the original correlator with respect to an input of the preamble of which a part is subjected to the positive and negative inversion is multiplied by A, Expression 3 can be changed to the following Expression 11 and Expression 6 can be changed as in the following Expression 12. Here, Expressions 11 and 12 are description in which calculation in logarithm (dB) is assumed.

$$PD\_near > COL\_other\_near + A\_near \quad \text{Expression 11}$$

$$PD\_n > COL\_other\_n + A\_n \quad \text{Expression 12}$$

(where n=0 to N)

[Operation Example of Transmission and Reception Process]

Figure 26:
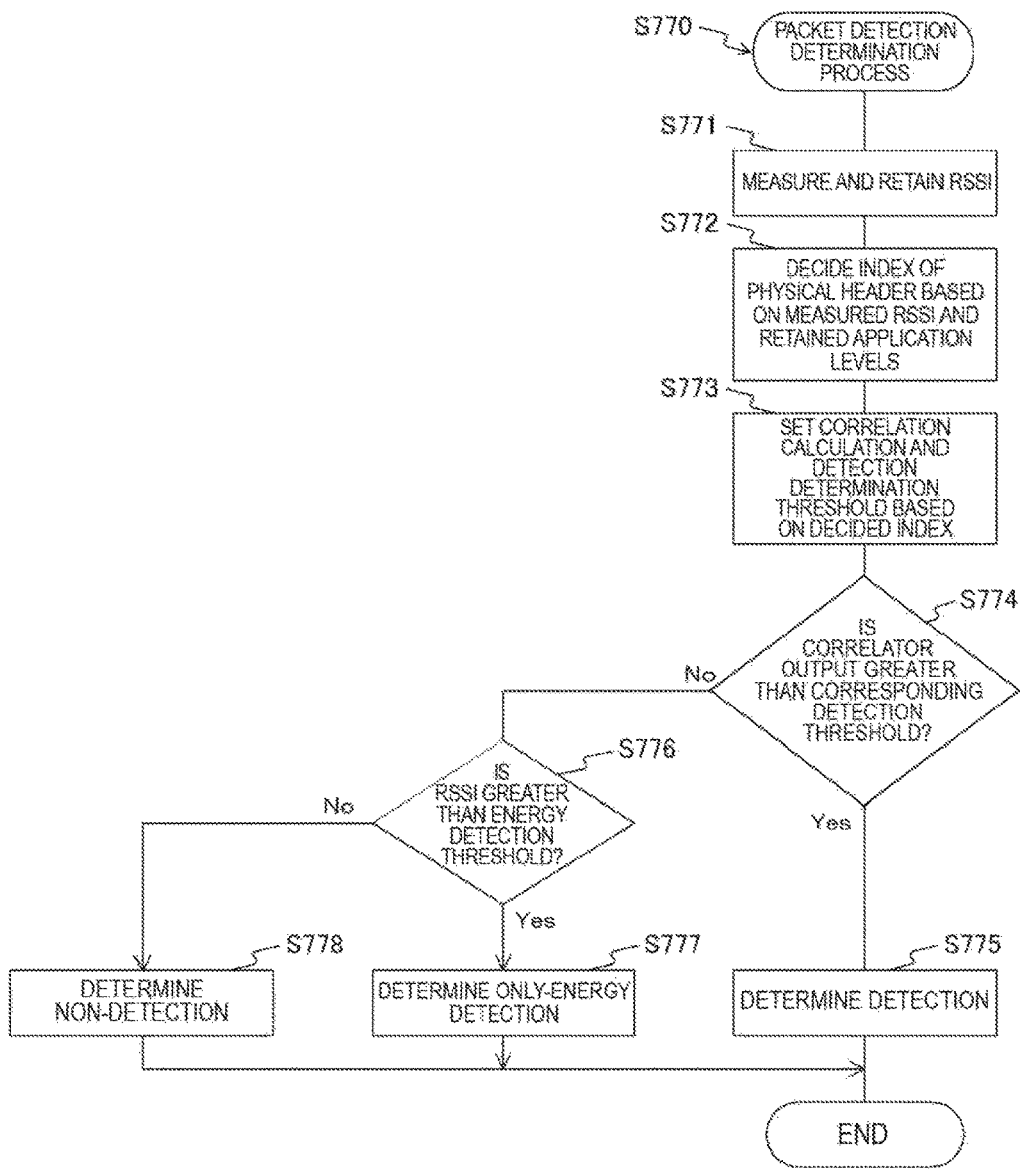
FIG. 26 is a flowchart showing a packet detection determination process in the transmission and reception process by an information processing device 100 according to a sixth embodiment of the present technology.

FIG. 26 is a flowchart showing a packet detection determination process (the processing order of step S730 shown in FIG. 17) in the transmission and reception process by the information processing device 100 according to the sixth embodiment of the present technology.

First, the control unit 150 of the information processing device 100 performs measurement of the RSSI on a signal input via the antenna 141 and retains the RSSI obtained through the measurement (step S771).

Subsequently, the control unit 150 of the information processing device 100 compares the measured RSSI to the retained application levels (L_far and L_near) of the physical headers and decides the index of the physical header to be applied to detection (step S772). For example, as in the selection method of selecting the transmission physical header of the self-device, it is possible to decide the index of the physical header to be applied to the detection.

For example, when the measured RSSI is compared to the value of L_near and the measured RSSI is greater than L_near, the control unit 150 of the information processing device 100 decides 1 (for the short distance) as the index of the physical header to be used for the correlation detection of the self-device. Conversely, when the measured RSSI is equal to or less than L_near, the control unit 150 of the information processing device 100 decides 0 (for the long distance) as the index of the physical header to be used for the correlation detection of the self-device.

In the decision procedure, it is assumed that there is no difference in transmission power between the slave and master stations. However, when information regarding a difference in the transmission power is retained in advance despite the difference in the transmission power between the slave and master stations, the determination can be performed after appropriate correction is applied based on the retained information regarding the difference in the transmission power.

Subsequently, the control unit 150 of the information processing device 100 switches internal calculation of the correlator and performs the correlation calculation to correspond to the preamble sequence of the physical header with the decided index (step S773). Here, the switching of the internal calculation is the same process as the process corresponding to "positive and negative inversion on a part of content" which is the above-described method of generating the PLCP Preamble portion.

[Example of Configuration of Correlator]

FIG. 27 is a diagram showing an example of the configuration of a correlator included in the information processing device 100 according to the sixth embodiment of the present technology. Here, a of FIG. 27 is a modification example of a of FIG. 11 and b of FIG. 27 is a modification of b of FIG. 11. FIG. 27 shows an example of the configuration of the correlator in which calculation of sign inversion is applied based on a switch signal determined with the RSSI. By realizing the configuration in this way, it is possible to easily configure the correlator of another preamble.

For example, when an input PLCP Preamble is correctly consistent with calculation of the correlator, it is possible to obtain a large correlator output. However, when the calculation is different, the correlator output decreases. Therefore, the packet to be detected can accordingly be selected. Here, definition of the "correlator output" is the same as the above-described definition of the "correlator output."

For example, the calculation of the correlator may be switched to correspond to the preamble sequence of the physical header with the decided index or the detection threshold may be switched without changing the calculation. Both of the calculation and the detection threshold may be switched. Thus, it is possible to realize the process of selecting the packet to be detected according to a situation. FIG. 26 shows an example in which both of the calculation and the detection threshold are switched.

In FIG. 26, the control unit 150 of the information processing device 100 switches the calculation of the corrrelator and the detection threshold to correspond to the preamble sequence of the physical header with the decided index (step S773). That is, the calculation of the correlator and the detection threshold are set based on the decided index (step S773).

Subsequently, the control unit 150 of the information processing device 100 compares the correlator output to the corresponding detection threshold to determine whether the value of the correlator output is greater than the detection threshold (step S774).

When the value of the correlator output is greater than the detection threshold (step S774), the control unit 150 of the information processing device 100 sets the packet detection determination result as "detection" (step S775).

When the value of the correlator output is equal to or less than the detection threshold (step S774), the control unit 150 of the information processing device 100 compares the measured RSSI to the energy detection threshold ED (step S776). Then, the control unit 150 of the information processing device 100 determines whether the RSSI is greater than the energy detection threshold ED (step S776).

When the RSSI is greater than the energy detection threshold ED (step S776), the control unit 150 of the information processing device 100 sets the packet detection determination result to "only-energy detection" (step S777).

When the RSSI is equal to or less than the energy detection threshold ED (step S776), the control unit 150 of the information processing device 100 sets the packet detection determination result to "non-detection" (step S778).

7. Seventh Embodiment

In the first to sixth embodiments of the present technology, the communication examples between the master and slave stations in the star type topology configured by the master and subordinate slave stations have been described. In the communication examples, the destination of the subordinate slave stations is restricted to the master station. Here, the first to sixth embodiments of the present technology can also be applied to direct communication between subordinate slave stations.

Accordingly, in a seventh embodiment of the present technology, an example in which direct communication between subordinate slave stations (for example, communication between information processing devices 101 and 104 shown in FIG. 28) is performed will be described.

[Configuration Example of Communication System]

Figure 28:
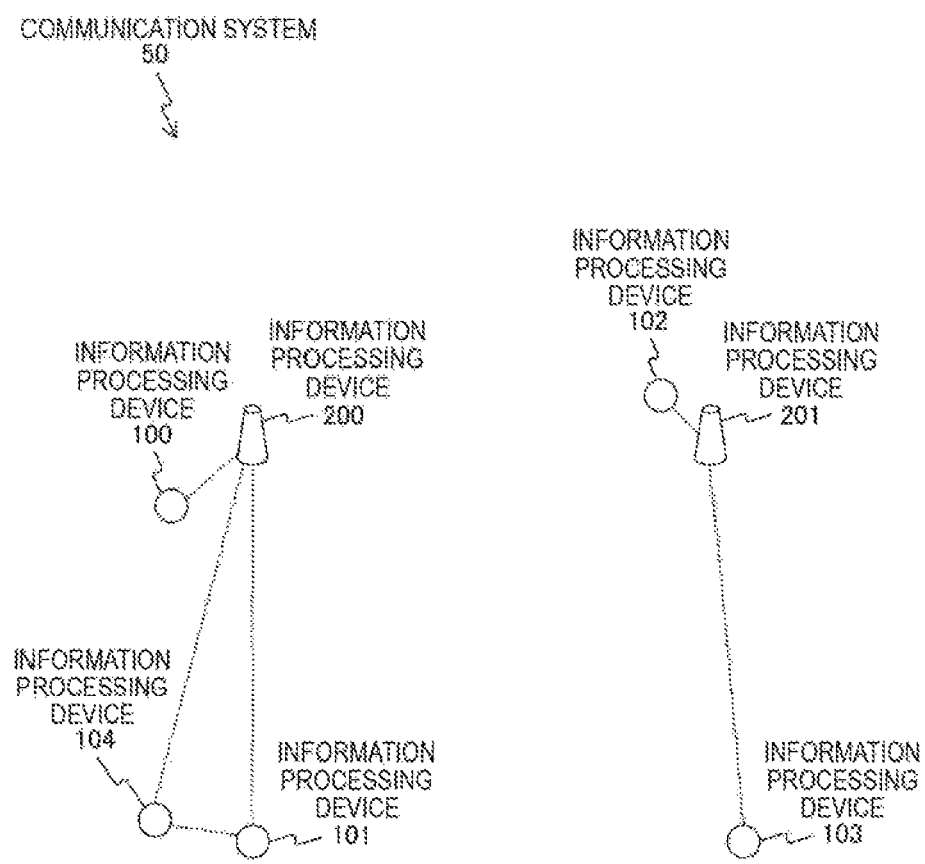
FIG. 28 is a diagram showing a system configuration example of a communication system 50 according to a seventh embodiment of the present technology.

FIG. 28 is a diagram showing a system configuration example of a communication system 50 according to the seventh embodiment of the present technology.

FIG. 28 is a modification example of FIG. 1 and is different from FIG. 1 in that the information processing device 104 is added. The configuration of the information processing device 104 is substantially the same as the configurations of the information processing devices 100 to 103, 200, and 201 shown in FIG. 1 and the like. Therefore, the same reference numerals as those of the first to sixth embodiments of the present technology are given to common portions to those of the first to sixth embodiments of the present technology, and the description thereof will be partially omitted.

The communication system 50 is configured to include information processing devices 100 to 104, 200, and 201.

The information processing device 104 is an information processing device corresponding to the information processing devices 100 to 103 and is, for example, a portable information processing device that has a wireless communication function.

In this way, in the seventh embodiment of the present technology, an example in which direct communication between subordinate slave stations (for example, communication between the information processing devices 101 and 104) in the star type topology configured by the master and subordinate slave stations is performed will be described.

[Communication Example]

Figure 29:
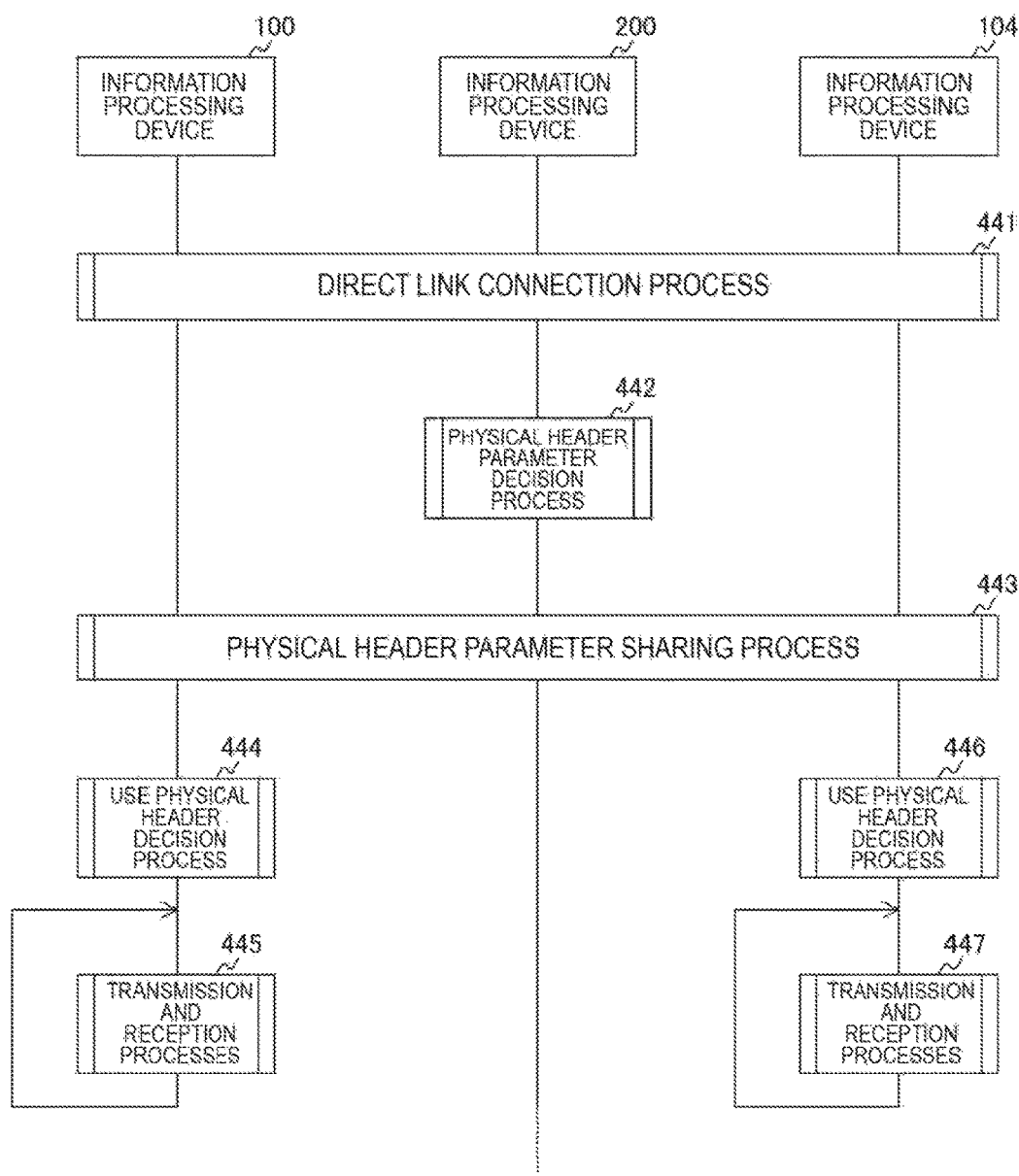
FIG. 29 is a sequence chart showing a communication processing example between devices included in a communication system 50 according to the seventh embodiment of the present technology.

FIG. 29 is a sequence chart showing a communication processing example between the devices included in the communication system 50 according to the seventh embodiment of the present technology.

FIG. 29 shows an example of a communication process when direct transmission between the information processing devices 100 and 104 is performed. The same also applies to a relation between the other slave stations.

Here, a setup process of the direct communication basically conforms to a tunneling direct link setup (TDLS) function of the IEEE 802.11 standard. In FIG. 29, a state in which the information processing devices 100 and 104 are already connected to the information processing device 200 and the operation described in the first embodiment of the present technology is performed is assumed in the description.

First, a direct link connection process is performed among the information processing devices 100, 104, and 200 (441). That is, each of the information processing devices 100 and 104 performs an establishment protocol of the direct link via the access point (the information processing device 200) (441). Thus, a direct link searching process can be performed without alteration of the protocol. The direct link connection process is the same as the standard definition, and thus the detailed description will be omitted herein.

Subsequently, the control unit of the information processing device 200 performs a physical header parameter decision process (442). In this way, in the seventh embodiment of the present technology, the master station (the information processing device 200) decides the physical header parameters used in the direct link between subordinate slave stations. Therefore, the slave stations do not perform the physical header parameter decision process. The physical header parameter decision process by the master station is the same as that of the first embodiment of the present technology.

Subsequently, a physical header parameter sharing process is performed among the information processing devices 100, 104, and 200 (443). In this way, in the seventh embodiment of the present technology, the physical header parameters to be used in the direct link between the subordinate slave stations are also decided by the master station (the information processing device 200). Therefore, the physical header parameter sharing process is not performed between the slave stations performing the direct link. The physical header parameter sharing process between the master and slave stations is the same as that of the first embodiment of the present technology.

Subsequently, each of the information processing devices 100 and 104 performs the use physical header decision process (444 and 446). Here, the physical header for the partner during the direction link connection is decided according the communication quality of the link with the partner independently from the master station. The standard or the like of the determination is the same as that of the first embodiment of the present technology. That is, the use physical header decision process between the slave stations is the same as that of the first embodiment of the present technology.

Subsequently, each of the information processing devices 100 and 104 performs the transmission and reception process (445 and 447). The transmission and reception process is the same as that of the first embodiment of the present technology except that the transmission and reception between the slave stations are performed instead of the transmission and reception between the master and slave stations. The format of the PPDU in the seventh embodiment of the present technology is the same as that of the first embodiment of the present technology.

8. Eighth Embodiment

In the seventh embodiment of the present technology, the example in which the master station decides the physical header parameters used for the direct link has been described. However, the slave stations (the slave stations performing direct link) may decide the physical header parameters used for the direct link.

Accordingly, in an eighth embodiment of the present technology, an example in which slave stations (slave stations performing the direct link) decide physical header parameters used for the direct link will be described.

The system configuration according to the eighth embodiment of the present technology is the same as that of the seventh embodiment of the present technology. Therefore, the same reference numerals as those of the seventh embodiment of the present technology are given to common portions to those of the seventh embodiment of the present technology, and the description thereof will be partially omitted.

[Communication Example]

Figure 30:
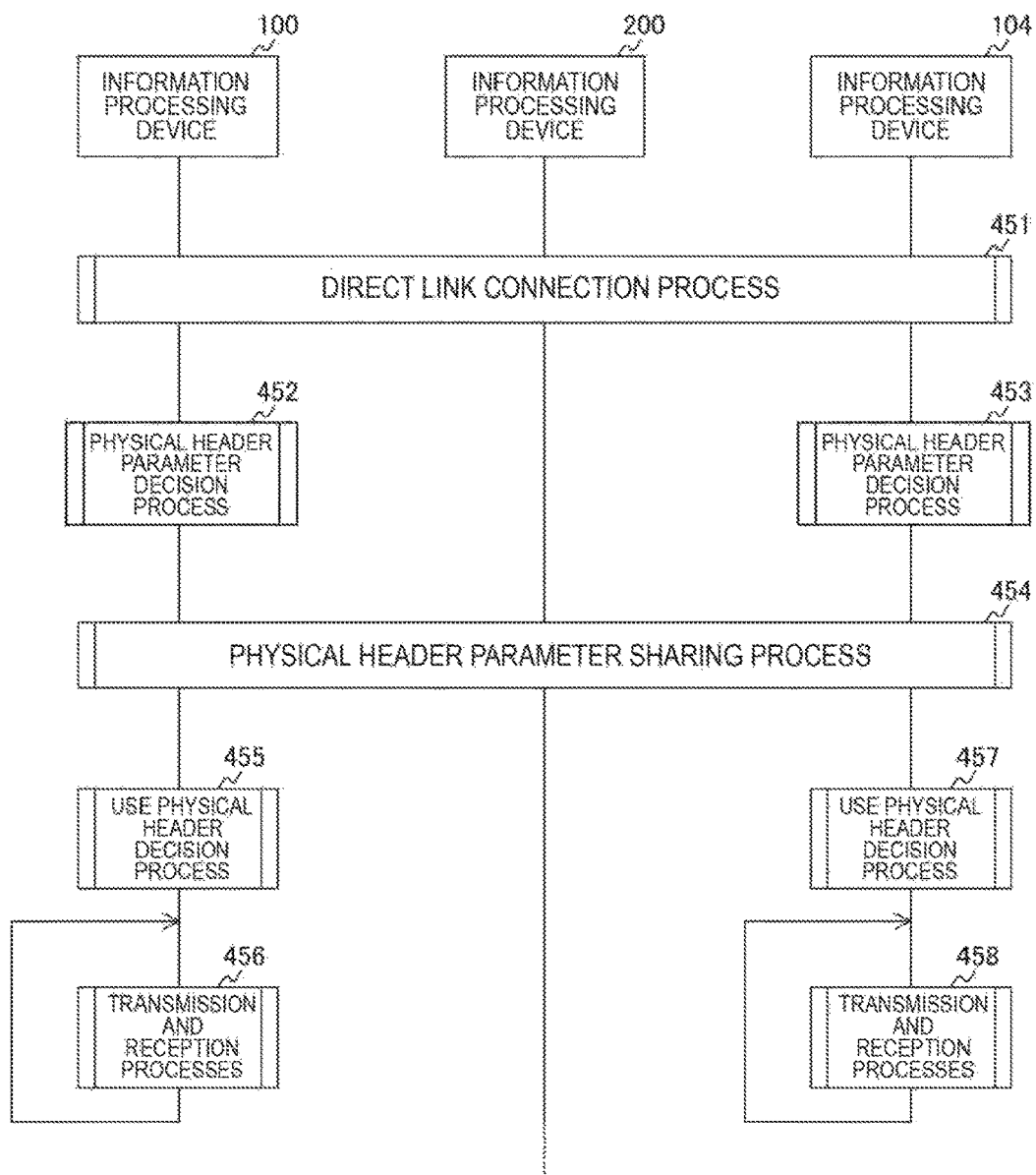
FIG. 30 is a sequence chart showing a communication processing example between devices included in a communication system 50 according to an eighth embodiment of the present technology.

FIG. 30 is a sequence chart showing a communication processing example between devices included in a communication system 50 according to the eighth embodiment of the present technology.

FIG. 30 is a modification example of FIG. 29 and there are common portions to those of FIG. 29. Therefore, the description of the common portions to those of FIG. 29 will be partially omitted.

First, a direct link connection process is performed among the information processing devices 100, 104, and 200 (451). The direct link connection process is the same as that of the seventh embodiment of the present technology.

Subsequently, each of the information processing devices 100 and 104 performs a physical header parameter decision process (452 and 453). In this way, in the eighth embodiment of the present technology, the slave stations (the information processing devices 100 and 104) with which there are connection destinations other than the master station autonomously decide the physical header parameters for the direct link. The physical header parameter decision process can be performed in substantially the same way as the process performed by the master station (the information processing device 200) in the first embodiment of the present technology. However, sampling targets of COL_self near and COL_self_far are the same BSSID, but are different in that the sampling targets are restricted to the slave stations (the information processing devices) directly connected to the self-device.

Subsequently, a physical header parameter sharing process is performed between the information processing devices 100 and 104 (454). In this way, each of the information processing devices 100 and 104 performing the direct link periodically exchanges the physical header parameters for the direct link decided through the physical header parameter decision process in the direct link. Then, each of the information processing devices 100 and 104 ascertains an operation expected by the direct link partner. A frame to be used for the exchange may be set to a data frame or may be set to a management frame.

Subsequently, each of the information processing devices 100 and 104 performs a use physical header decision process (455 and 457). In this way, each of the information processing devices 100 and 104 independently decides the physical header for each partner based on the parameters notified of by the direct link partner apart from the parameters for the master station. The standard or the like of the determination is the same as that of the first embodiment of the present technology.

Subsequently, each of the information processing devices 100 and 104 performs the transmission and reception process (456 and 458). The transmission and reception process is the same as that of the seventh embodiment of the present technology.

9. Ninth Embodiment

In the first embodiment of the present technology, the example in which Link Strength Category field is set up in the SIGNAL field of the IEEE 802.11 standard has been described.

In a ninth embodiment of the present technology, an example in which a field storing information regarding a BSS identifier is added to the SIGNAL field of the IEEE 802.11 standard in addition to Link Strength Category field will be described. By storing the information regarding the BSS identifier in this way, it is possible to further improve packet selection precision. The configurations of information processing devices in the ninth embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

Some of the processes and the formats in the ninth embodiment of the present technology are common to those of the first embodiment of the present technology. Therefore, the same reference numerals as those of the first embodiment of the present technology are given to common portions to those of the first embodiment of the present technology, and the description thereof will be partially omitted.

[Example of Format of PPDU]

FIG. 31 is a diagram showing an example of the format of a PPDU exchanged between the devices included in the communication system 10 according to the ninth embodiment of the present technology.

Here, the example shown in FIG. 31 is the same as the example shown in FIG. 7 except that a BSS COLOR field is set up in the SIGNAL field. Accordingly, the same reference numerals as those of FIG. 7 are given to common portions to those of FIG. 7, and the description thereof will be partially omitted.

The PPDU is configured to include Preamble 301, SIGNAL 331, Extension 303, Service 304, MPDU 305, and FCS 306.

In the ninth embodiment of the present technology, the "Link Strength Category" field and the "BSS COLOR" field storing information (COLOR information) regarding the BSS identifier are set up in parts of the SIGNAL field of the physical header. In FIG. 31, the "Link Strength Category" field is indicated by Link Strength Category and the "BSS COLOR" field is indicated by COLOR.

Here, the COLOR information (BSS COLOR information) is information which is informed of in advance by a connected partner device (for example, the master station) and is information (for example, a numerical value) which can identify a basic service set (BSS) to which the self-device belongs. That is, the COLOR information (BSS COLOR information) is an example of an identifier for identifying a network. The BSSID is stored as the same information in the MAC header. Here, the COLOR information can be expressed in a physical layer (PLCP layer) in a simpler form than the BSSID.

An example of a case in which the information processing device (the master or slave station) transmitting the physical header belongs to the BSS set to "1" as the COLOR information is shown in a and b of FIG. 31.

In this way, in the ninth embodiment of the present technology, the "Link Strength Category" field and the "COLOR" field are set up in portions treated as being reserved in the SIGNAL 311. Thus, it is possible to realize the specific function in the ninth embodiment of the present technology without interfering with reception of the legacy device.

In the ninth embodiment of the present technology, a physical header of Link Strength Category=0 is referred to as a "long-distance physical header." Further, a physical header of Link Strength Category=1 is referred to as a "short-distance physical header." A physical header transmitted from a legacy device is assumed to be treated as a "long-distance physical header."

The information processing device (other than the legacy device) receiving a packet that includes at least one of the Link Strength Category field and the COLOR field can acquire content of each of the fields. Then, based on the content of each of the fields, the information processing device can change the reception operation and the detection threshold to be applied.

A connection process is the same as that of the first embodiment of the present technology. A physical header parameter decision process is also substantially the same as that of the first embodiment of the present technology. Here, the COLOR information is information which can be acquired in the physical layer. Therefore, unlike the BSSID information, the COLOR information can be used without waiting for a combination of FCS (present at the end of the PPDU) in the PPDU. Accordingly, when the physical header parameter decision process is performed, classification can be performed using the COLOR information rather than the BSSID when the master station collects information regarding communication quality of packets from other BSSs (OBSSs).

The order of a physical header parameter sharing process is the same as that of the first embodiment of the present technology. In the ninth embodiment of the present technology, however, information regarding "COLOR" (the BSS identifier in the physical layer) and "TxPower" (transmission power of the master station) is also additionally transferred in addition to "Multi Detect Parameter." An example of the frame format used in this case is shown in FIG. 32.

[Example of Beacon Frame Format]

Figure 32:
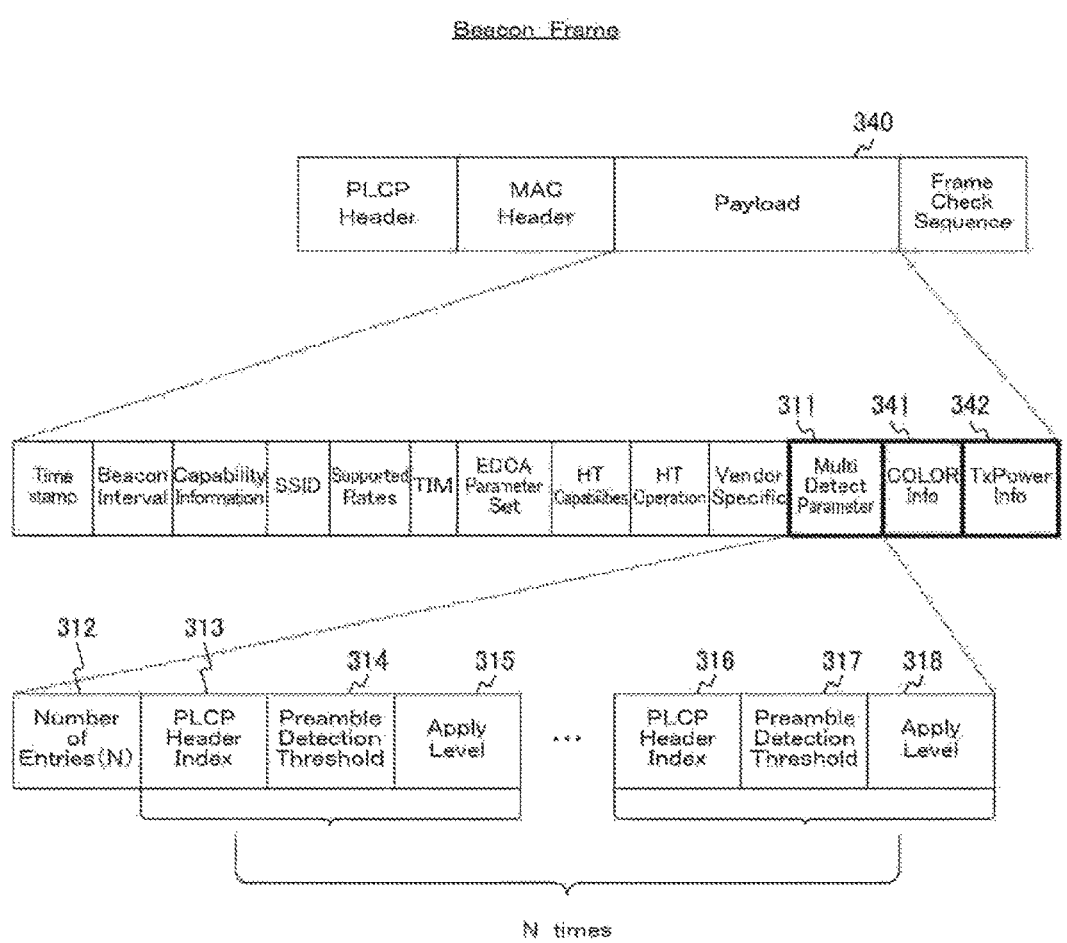
FIG. 32 is a diagram showing an example of a beacon frame format exchanged between the devices included in the communication system 10 according to the ninth embodiment of the present technology.

FIG. 32 is a diagram showing an example of a beacon frame format exchanged between the devices included in a communication system 10 according to the ninth embodiment of the present technology. Since FIG. 32 is a modification example of FIG. 14, the same reference numerals as those of FIG. 14 are given to common portions to those of FIG. 14, and the description thereof will be partially omitted.

FIG. 32 shows an example in which elements such as "COLOR Info" 341 and "TxPower Info" 342 are newly added to Payload 340 in addition to "Multi Detect Parameter" 311.

The BSS identifier in the physical layer is stored in "COLOR Info" 341. The BSS identifier corresponds to the BSS identifier stored in the "BSS COLOR" field shown in FIG. 31.

Information regarding transmission power of the information processing device (for example, the master station) transmitting a beacon is stored in "TxPower Info" 342.

For example, the control unit of the information processing device 200 transmits a beacon in which the information is stored in "Multi Detect Parameter" 311, "COLOR Info" 341, and "TxPower Info" 342 to the nearby information processing devices to inform the nearby information processing devices of the beacon.

The information processing device informed of the beacon acquires the information stored in "Multi Detect Parameter" 311, "COLOR Info" 341, and "TxPower Info" 342 from the beacon to retain the information. That is, the information processing device retains content of "Multi Detect Parameter," the BSS identifier in the physical layer, and the transmission power of a communication partner (for example, the master station).

When the content of the beacon is retained and subsequently information included in a subsequent beacon is changed, information included in a latest beacon (latest information) is adopted and retained.

The master station may notify of the content of "Multi Detect Parameter," the BSS identifier in the physical layer, and the transmission power of the self-device using a signal other than the beacon transmission. For example, the master station may perform the notification using a unicast data frame or management frame to a subordinate terminal using determination by the self-device or an information acquisition request from the subordinate terminal as a trigger.

[Example of Backoff Process]

Figure 33:
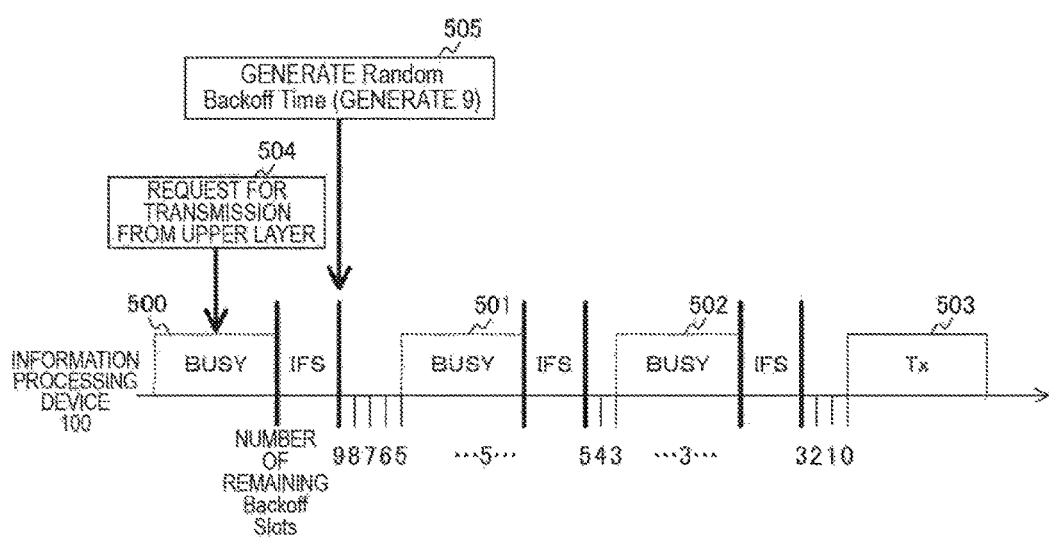
FIG. 33 is a diagram showing the flow of a backoff process in the IEEE 802.11 standard.

FIG. 33 is a diagram showing the flow of a backoff process in the IEEE 802.11 standard. In FIG. 33, the horizontal axis represents a time axis. On the upper side of the horizontal axis, states of the information processing device (BUSY 500 to BUSY 502, IFS, and Tx 503) are schematically indicated by rectangles. On the lower side of the horizontal axis, numerical values indicating the number of backoff slots (backoff counters) are shown. A timing of a request 504 for transmission from an upper layer and a timing of random backoff time generation 505 are schematically indicated by rectangles and arrows.

For example, when a carrier sense state transitions to an IDLE state after BUSY, a latency time of the IFS is inserted every time. For example, when the carrier sense state transitions to the IDLE state after BUSY 500 to BUSY 502, the latency time of the IFS is inserted. The backoff counter remains stopped during reception of the physical header, as indicated by numerical values on the lower side of the horizontal axis shown in FIG. 33.

[Example of Backoff Process when Reception is Cancelled]

Figure 34:
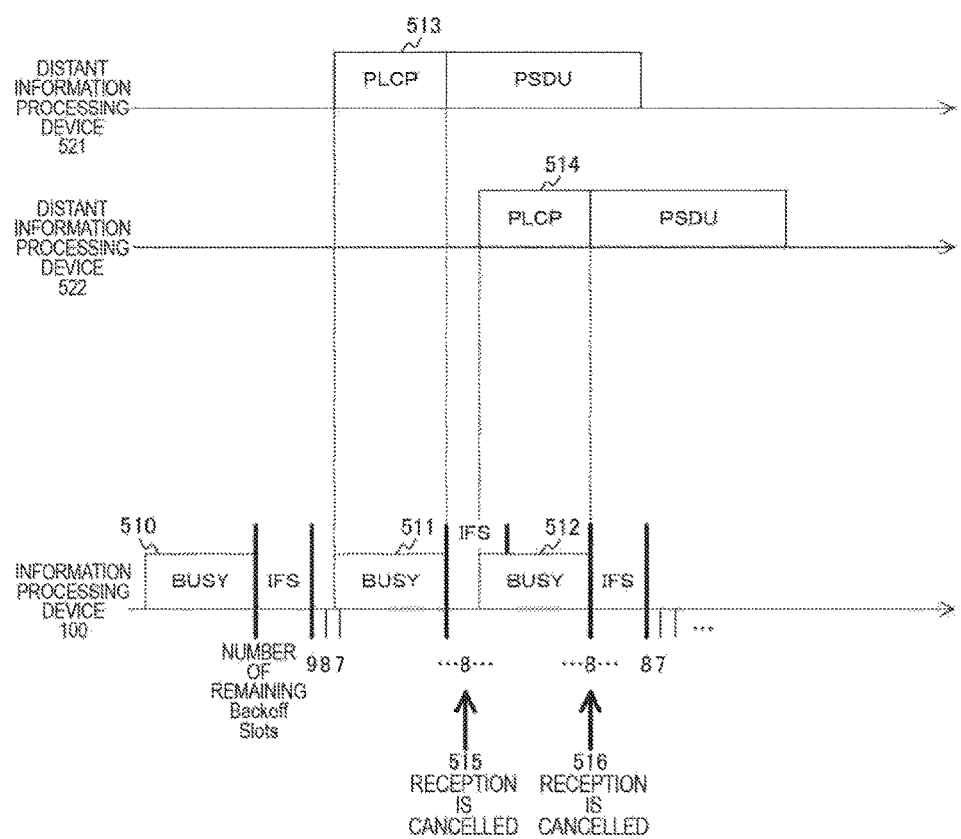
FIG. 34 is a diagram showing the flow of a backoff process by an information processing device 100 according to the ninth embodiment of the present technology.

FIG. 34 is a diagram showing the flow of a backoff process by the information processing device 100 according to the ninth embodiment of the present technology. The horizontal axis, states (BUSY 510 to BUSY 512 and IFS) of the information processing device on the upper side of the horizontal axis, and numerical values indicating the number of backoff slots (backoff counter) on the lower side of the horizontal axis shown in FIG. 34 are the same as those in FIG. 33.

FIG. 34 shows an example of a case in which two information processing devices 521 and 522 located at positions distant from the information processing device 100 transmit packets. The horizontal axis related to the information processing devices 521 and 522 and states (PLCP 513, PLCP 514, and PSDU) of the information processing devices on the upper side of the horizontal axis are the same as those in FIG. 33.

FIG. 34 shows an example in which the information processing device 100 stops receiving packets based on PLCP 513 and PLCP 514 included in the packets when the information processing device 100 receives the packets transmitted from the information processing devices 521 and 522 (515 and 516). Thus, it is possible to shorten times of BUSY 511 and BUSY 512.

However, for example, in an environment that is crowded with the information processing devices and in which traffic is congested, the backoff counter is assumed not to decrease even when a process of stopping the reception from the distant information processing devices and transitioning to the IDLE state is performed. For example, as shown in FIG. 34, even when the reception of the packets from the information processing devices 521 and 522 is stopped (515 and 516), the backoff counter remains "8" and does not decrease from "8" in this state. In this way, even when the frame reception determined to be ignorable is cancelled, IFS is added after transition from BUSY to IDLE. Therefore, during the IFS, the backoff counter does not decrease in this state. Until the backoff counter becomes 0, the information processing device 100 may not perform transmission. In this way, in the crowded environment (congested environment), there is a concern of a transmission opportunity not increasing even when the reception of ignorable packets is stopped. Accordingly, it is important to improve an advantageous effect of obtaining a transmission opportunity of the information processing device 100. An example in which the transmission opportunity of the information processing device 100 is improved is shown in FIG. 35.

[Example of Backoff Process when Backoff Counter Decreases without Inserting IFS]

Figure 35:
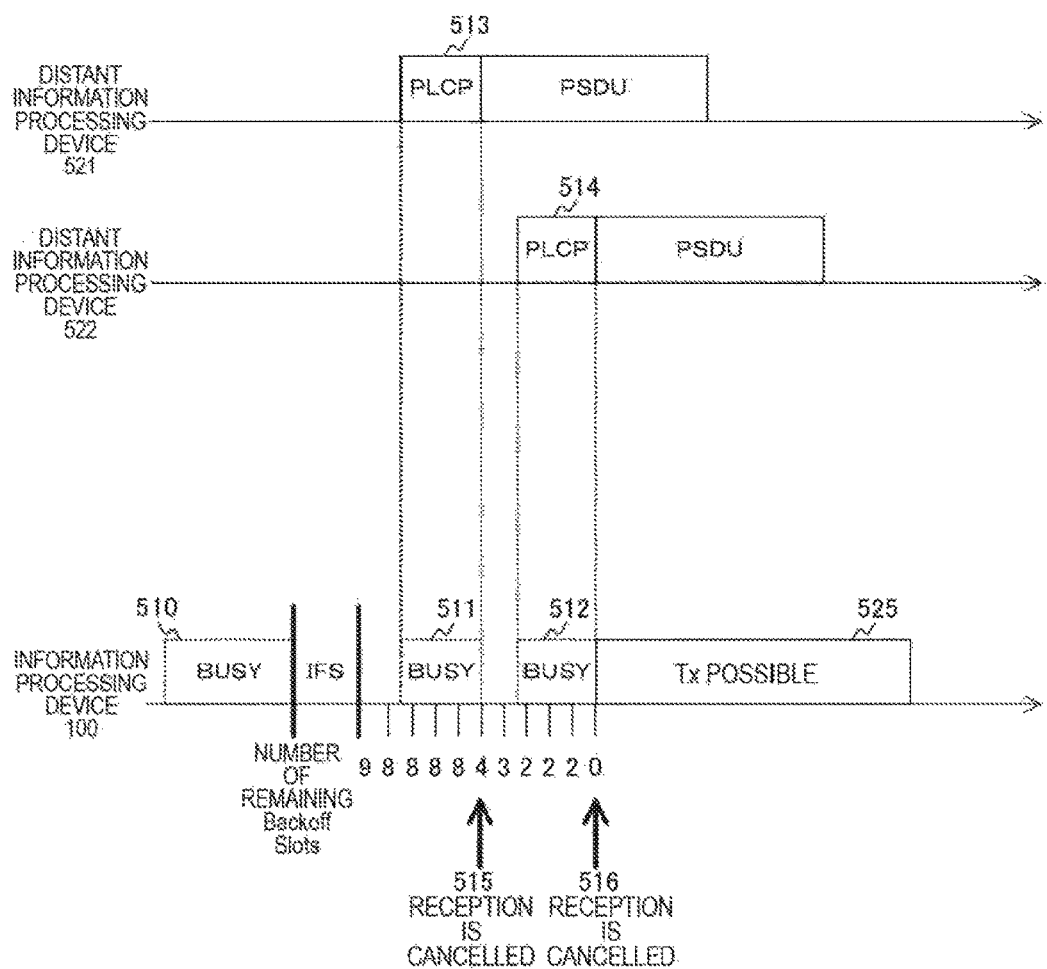
FIG. 35 is a diagram showing the flow of a backoff process by the information processing device 100 according to the ninth embodiment of the present technology.

FIG. 35 is a diagram showing the flow of a backoff process by the information processing device 100 according to the ninth embodiment of the present technology. Since FIG. 35 is an example corresponding to FIG. 34, the same reference numerals are given to common portions to those of FIG. 34, and the description thereof will be partially omitted.

As in FIG. 34, FIG. 35 shows an example in which, when the information processing device 100 receives packets transmitted from the information processing devices 521 and 522, the reception is stopped based on the PLCP 513 and PLCP 514 included in the packets (515 and 516). In FIG. 35, the reception is stopped (the reception is cancelled) and the backoff counter decreases by a time (elapsed time) related to the reception, assuming the IDLE state. In FIG. 35, immediately after the reception is stopped (the reception is cancelled), the backoff counter decreases without latency of IFS (that is, without inserting IFS).

For example, as shown in FIG. 35, when reception of a packet from the information processing device 521 is stopped (515), a time length from a start time of the physical header to a current time is calculated. Then, a time slot conversion value of the length (time length) is subtracted from the backoff counter at a time. For example, "4 (=8−4)" is calculated as the time length from the start time of the physical header to the current time. Then, the value "4" is subtracted from the backoff counter "8" and "4" is obtained as the backoff counter. Further, application of IFS before subsequent carrier sense is also cancelled and subtraction of the backoff counter instantly starts.

In this way, by cancelling the application of IFS and subtracting the backoff counter corresponding to a physical header time, it is possible to efficiently obtain a transmission opportunity.

Here, for example, when enhanced distributed channel access (EDCA) is used, a plurality of backoff counters operate in some cases. Accordingly, when the plurality of backoff counters operate, this process is performed on all of the counters.

In this way, the control unit 150 of the information processing device 100 can perform control such that a latency time corresponding to IFS does not occur after the stop of the reception. In this case, after the stop of the reception of the packet, the control unit 150 can convert a time length from a transition time of the carrier sense to BUSY to a reception stop time at the time of reception of the packet into a slot time and can subtract the slot time from the backoff counter.

Here, in the above-described subtraction process, the backoff counter after the subtraction is also assumed to be a negative value. In this case, the counter can be set to 0. That is, when a result after the subtraction is a negative value, the control unit 150 of the information processing device 100 can treat the result as 0.

As another variation, when the backoff counter after the subtraction is a negative value, the result may be returned to the positive absolute value of the negative value and then used. For example, when a time slot conversion value of the time length in which a counter value before subtraction is 1 and is BUSY is 2, a value "−1 (=1−2)" after the subtraction is returned and the counter value can remain 1. Thus, when there are different information processing devices under the same condition that the counter value before the subtraction be 2, cases in which counts simultaneously become 0 and collision occurs can be reduced. However, in the return case, the return in the result is greater than the counter value before the subtraction is prohibited. That is, when a result after the subtraction is a negative value, the control unit 150 of the information processing device 100 can set a value obtained by returning the negative value to a positive value so that the value does not exceed the backoff counter before the subtraction.

As still another variation, when the backoff counter after the subtraction is a negative value, a random number may be generated in the range between a value equal to or less than the backoff counter before the subtraction and 0 and the random number may be set to a value after the subtraction. That is, the random backoff may be performed with a width of the original value of the backoff counter before Busy.

In this example, the carrier sense of the physical layer has been described. However, when transmission suppression is applied by virtual carrier sense and a BUSY state is entered, the above-described process at the time of stop of the reception may not be performed.

[Operation Example of Use Physical Header Decision Process]

Figure 36:
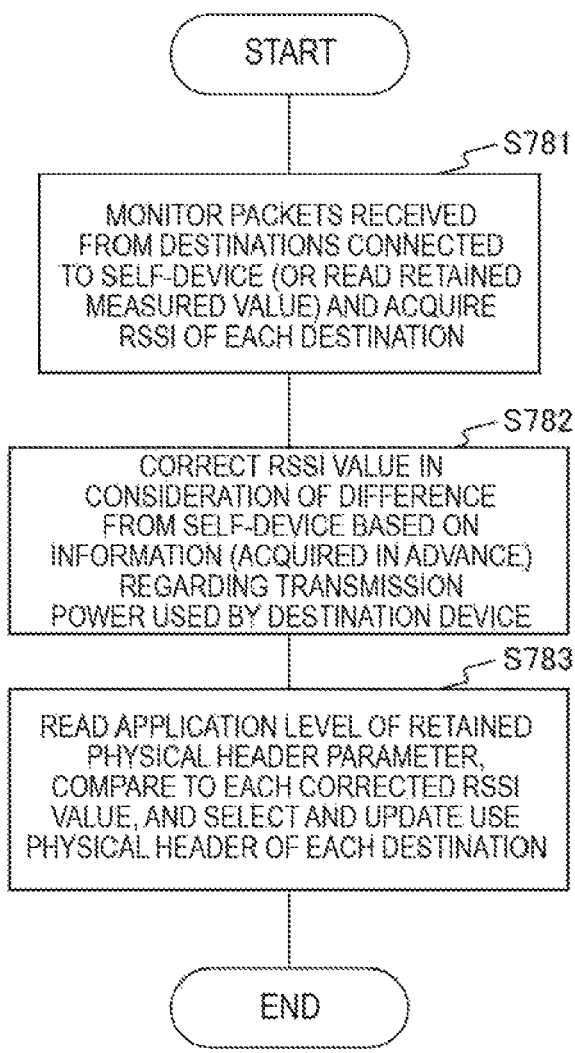
FIG. 36 is a flowchart showing an example of a processing order of a use physical header decision process by the information processing device 100 according to the ninth embodiment of the present technology.

FIG. 36 is a flowchart showing an example of a processing order of a use physical header decision process (transmission physical header selection process) by the information processing device 100 according to the ninth embodiment of the present technology. The use physical header decision process is basically the same as that of the first embodiment of the present technology, but is different in that RSSI_peer is corrected based on TxPower notified of by a partner.

First, the control unit 150 of the information processing device 100 monitors packets received from designations connected to the self-device and acquires the RSSI of each designation (step S781). The RSSI (monitoring result) acquired in this way is set to RSSI_peer.

When measured values of the packets received from the destinations connected to the self-device are retained, the control unit 150 of the information processing device 100 may read the measured value to acquire the RSSI of each destination (step S781).

Here, in the case of the information processing device (for example, the information processing device 100) connected to the master station (for example, the information processing device 200), only the master station is basically set as the destination. In this case, the reception level of a previous beacon may be used as a monitoring result.

Subsequently, the control unit 150 of the information processing device 100 corrects the acquired RSSI_peer in consideration of a transmission power difference (step S782). For example, "TxPower" information (stored in "TxPower Info" 342 shown in FIG. 32) notified of by the master station in the physical header parameter sharing process is referred to as TP_peer. Further, transmission power to be used for transmission to the master station by the information processing device 100 is referred to as TP_self. In this case, the corrected RSSI_adjusted can be obtained by the following Expression 13. Here, Expression 13 is description in which calculation in logarithm (dB) is assumed.

$$\text{RSSI\_adjusted} = \text{RSSI\_peer} + (\text{TP\_self} - \text{TP\_peer}) \quad \text{Expression 13}$$

Here, RSSI_adjusted indicates an estimated value of the RSSI expected when the master station side receives transmission from the information processing device 100. However, when information corresponding to T_Peer may not be obtained, RSSI_adjusted may be substituted with RSSI_peer.

Subsequently, the control unit 150 of the information processing device 100 compares the corrected RSSI_adjusted to the application level L_near of the physical header and decides the index of the physical header to be used for transmission by the self-device based on the comparison result (step S783). The application level L_near of the physical header is included in a beacon transmitted from the information processing device 200.

For example, when the corrected RSSI_adjusted is greater than the application level L_near of the physical header, the control unit 150 of the information processing device 100 decides 1 (for the short distance) as the index of the physical header to be used for transmission by the self-device (step S783). Conversely, when the corrected RSSI_adjusted is equal to or less than the application level L_near of the physical header, the control unit 150 of the information processing device 100 decides 0 (for the long distance) as the index of the physical header to be used for transmission by the self-device (step S783).

When the index of the physical header to be used for transmission by the self-device is already decided and a new index is decided, the already decided index is updated to the new index (step S783).

In FIG. 36, the example in which the use physical header is decided based on the classification of two values of the short distance and the long distance has been described, but the use physical header may be decided based on classification of three or more values (N values). For example, the application levels of the physical headers are set to L_0, L_1, . . . , L_N in order for the long distance. In this case, n satisfying the following relation expression (Expression 14) is selected as the index of the physical header to be used for transmission. Here, Expression 14 is description in which calculation in logarithm (dB) is assumed.

$$L\_n \leq \text{RSSI\_adjusted} < L\_n+1 \quad \text{Expression 14}$$

(where n=0 to N)

In FIG. 36, the operation example on the slave station side in the case of uplink transmission from the slave station side to the master station side has been described. However, in the case of downlink transmission, the same operation may be performed on the master station side. In this case, the content of the process on the master station side is the same as the content of the process shown in FIG. 36. However, when there are a plurality of connection partners, classification of monitoring results of received packets is assumed to be managed for each of the packet transmission sources and RSSI_adjusted is assumed to be calculated individually for each link.

The example in which the RSSI is used has been described in FIG. 36. However, the correlation output strength COL may be used instead of the RSSI.

[Operation Example of Transmission and Reception Process]

Figure 37:
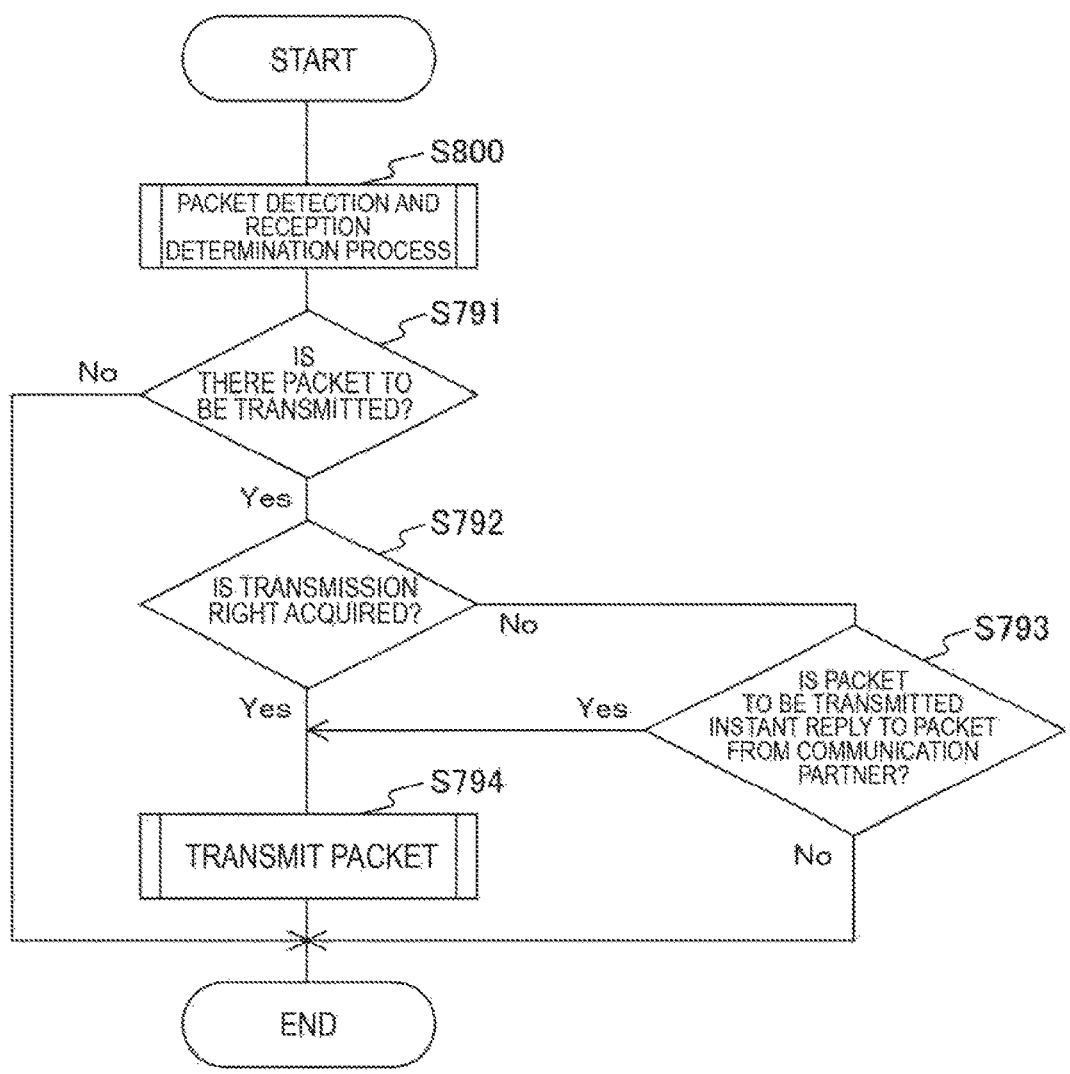
FIG. 37 is a flowchart showing an example of a processing order of a transmission and reception process by the information processing device 100 according to the ninth embodiment of the present technology.

FIG. 37 is a flowchart showing an example of a processing order of a transmission and reception process by the information processing device 100 according to the ninth embodiment of the present technology. In FIG. 37, the information processing device 100 will be described, but the same can also apply to the other information processing devices (for example, the information processing device 200). That is, the transmission and reception process is the same on both of the master station side and the terminal side.

The control unit 150 of the information processing device 100 performs a packet detection and reception determination process for a time other than during transmission and reception (step S800). The packet detection and reception determination process will be described in detail with reference to FIG. 39.

Subsequently, the control unit 150 of the information processing device 100 determines whether there is a packet to be transmitted (step S791). When there is no packet to be transmitted (step S791), the operation of the transmission and reception process ends.

When there is a packet to be transmitted (step S791), the control unit 150 of the information processing device 100 determines whether the information processing device 100 acquires a transmission right (step S792).

Here, the acquisition state of the transmission right is assumed to be, for example, a state in which a backoff counter in which the carrier sense result decreases according to an IDLE time is 0.

When the information processing device 100 acquires the transmission right (step S792), the control unit 150 of the information processing device 100 transmits the packet (step S794). When the information processing device 100 does not acquire the transmission right (step S792), the control unit 150 of the information processing device 100 determines whether the packet to be transmitted is an instant reply to a packet received from a communication partner (step S793).

A packet which is an instant reply to the packet received from the communication partner is, for example, a CTS frame, an ACK frame, a Block Ack frame.

When the packet to be transmitted is not the instant reply to the packet received from the communication partner (step S793), the operation of the transmission and reception process ends without transmitting the packet. When the packet to be transmitted is the instant reply to the packet received from the communication partner (step S793), the control unit 150 of the information processing device 100 transmits the packet (step S794). In this way, the packet which is the instant reply to the packet received from the communication partner can be transmitted irrespective of the carrier sense state.

In this way, the information processing device 100 transmits the packet when there is a packet to be transmitted and the transmission right is acquired and when the packet to be transmitted is the instant reply to the packet from the communication partner.

In this case, the control unit 150 of the information processing device 100 transmits the packet using the physical header with the format shown in a or b of FIG. 31 based on the index of the physical header decided in the use physical header decision process at the time of transmission of the packet.

For example, the control unit 150 of the information processing device 100 selects a modulation and communication path coding scheme by which a destination device can perform reception at a high probability according to the detection threshold corresponding to the decided physical header for the purpose of modulation used in a data portion, and performs the transmission using the selected modulation and communication path coding scheme. For example, the control unit 150 of the information processing device 100 may select a modulation and communication path coding scheme (MCS) by which a destination device can perform reception at a high probability according to the detection threshold corresponding to the decided physical header and perform the transmission.

[Operation Example of Packet Detection and Reception Determination Process]

FIG. 38 is a diagram showing an example of a relation (process classification table) between a physical header and a process performed by the information processing device 100 according to the ninth embodiment of the present technology. FIG. 38 will be described in detail with reference to FIG. 39.

FIG. 39 is a flowchart showing a packet detection and reception determination process (the processing order of step S800 shown in FIG. 37) in the transmission and reception process by the information processing device 100 according to the ninth embodiment of the present technology.

First, the control unit 150 of the information processing device 100 measures the RSSI on a signal input via the antenna 141 and retains the RSSI obtained through the measurement (step S801). The control unit 150 of the information processing device 100 performs the correlation calculation of a preamble pattern to obtain a correlator output (step S801). The correlator output is the above-described correlation output strength COL. That is, the correlator output is not a normalized correlator output level, but is a correlator output converted by reflecting reception power.

In this way, each of the master and slave stations corresponding to the respective functions in the ninth embodiment of the present technology performs measurement of the RSSI and monitoring of the correlator output on the signal input via the antenna during the waiting state (step S801).

Subsequently, the control unit 150 of the information processing device 100 performs the correlation calculation of the pattern and compares the output (the correlator output) to the tentative detection threshold (step S802). Here, the tentative detection threshold is a detection threshold for reading the SIGNAL field before this determination process. As the tentative detection threshold, for example, a value equal to or less than both of PD_near and PD_far can be used. For example, PD_default can be used as the tentative detection threshold.

When the value of the correlator output is equal to or less than the tentative detection threshold (step S802), the control unit 150 of the information processing device 100 compares the measured RSSI to the energy detection threshold ED (step S803). Then, the control unit 150 of the information processing device 100 determines whether the RSSI is greater than the energy detection threshold ED (step S803). The energy detection threshold ED may be set to be the same as the above-described value.

When the RSSI is greater than the energy detection threshold ED (step S803), the control unit 150 of the information processing device 100 retains the carrier sense BUSY state (step S804) and ends the packet detection and reception determination process. Conversely, when the RSSI is equal to or less than the energy detection threshold ED (step S803), the control unit 150 of the information processing device 100 transitions the state to a carrier sense IDLE state (step S805) and ends the packet detection and reception determination process.

When the value of the correlator output is greater than the tentative detection threshold (step S802), the control unit 150 of the information processing device 100 determines that the state is the tentative detection state and transitions the state to the carrier sense BUSY state (step S806).

Subsequently, the control unit 150 of the information processing device 100 decodes the subsequent SIGNAL field in the physical header to read information or the like in the SIGNAL field (step S807). Specifically, the "Link Strength Category" field, the "COLOR" field, and the cyclic redundancy check (CRC) of the physical header are read. As described above, the information indicating the detection threshold to be applied is stored in the "Link Strength Category" field.

The control unit 150 of the information processing device 100 combines the read information and the process classification table shown in FIG. 38 and decides a subsequent process (step S807).

Specifically, the control unit 150 of the information processing device 100 calculates the CRC of the physical header to confirm whether there is an error of the physical header. Here, when there is an error in the physical header, validity of the value of the field may not be confirmed. Therefore, as shown in FIG. 38, when there is an error in the physical header, a subsequent process is decided as "reception stop (ERROR)." When there is no error in the CRC of the physical header, the process is decided based on content of the "Link Strength Category" field and the "COLOR" field.

Here, the control unit 150 of the information processing device 100 decides the detection threshold to be applied based on "Preamble Detection Threshold" shared in the above-described physical header parameter sharing process. Specifically, when Link Strength Category=0, the detection threshold PD_far is used. When Link Strength Category=1, the detection threshold PD_near is used. Here, when the physical header having no Link Strength Category field is tentatively detected, a value (for example, PD_far) with the lowest level can be used as the detection threshold.

Subsequently, the control unit 150 of the information processing device 100 compares the decided detection threshold to the value of the correlator output. When the value of the correlator output is less than the decided detection threshold, as shown on the upper part of FIG. 38, the subsequent process is decided as "reception stop (IDLE)." However, as shown in the upper part of FIG. 38, when there is a COLOR field and the value of the COLOR field is the same as the value of the BSS to which the self-device belongs, the subsequent process is exceptionally decided as "reception." Thus, it is possible to avoid a case in which detection of the packet which is originally received fails due to a change in the reception level.

Conversely, when the value of the correlator output is equal to or greater than the decided detection threshold, as shown in the lower part of FIG. 38, the subsequent process is decided as "reception." However, as shown in the lower part of FIG. 38, when there is a COLOR field and the value of the COLOR field is different from the BSS to which the self-device belongs, the subsequent process is exceptionally decided as "reception stop (BUSY)." Thus, it is possible to avoid a case in which detection of a desired packet fails due to reception of a packet which it is not originally necessary to receive.

In this way, the control unit 150 of the information processing device 100 decides one of "reception," "reception stop (IDLE)," "reception stop (BUSY)," and "reception step (ERROR)" as the subsequent process (step S807).

Here, for example, when the long-distance detection threshold is used in the case of the device in the self-BSS, a packet is assumed to arrive with a weak level. Therefore, when the threshold (the long-distance detection threshold) which is a comparison target is inconsistent with a detection level, the packet can be estimated to be a packet from the other BSS. In this case, the reception can be stopped. For example, when the long-distance detection threshold is used and the RSSI is considerably large, the reception can be stopped.

Accordingly, here, when there is no COLOR field and the value of the correlator output is equal to or greater than the decided detection threshold (the threshold to be applied) in the process classification table shown in FIG. 38, a modification example of a case in which the subsequent process is decided as "reception" is indicated. For example, in this case, when the value of the correlator output is considerably greater than the threshold to be applied (for example, the value of the correlator output is equal to or greater by a given value or more), the subsequent process can be decided as "reception stop (BUSY)" or "reception stop (IDLE)."

For example, a case in which "Link Strength Category" in the PLCP header does not provide a detection threshold with the highest level or a case in which the value of the correlator output is considerably greater than the decided detection threshold (the threshold to be applied) is assumed. For example, when the use physical header is decided based on binary classification of the short distance and the long distance, the long-distance detection threshold is a value which does not provide the detection threshold with the highest level. In this case, when the value of the correlator output is considerably greater than the threshold to be applied, the threshold to be applied and the value of the correlator output are considered to be large and inconsistent. This state can be inferred to be a case in which the packet transmitted from the other BSS is detected. Accordingly, in this case, since it is not necessary to perform the reception to the end, the reception can be stopped.

For example, a case in which the detection thresholds are set to first, second, and third detection thresholds in descending order is assumed when the use physical header is decided based on ternary classification. In this case, the second or third detection threshold is the value which does not provide the detection threshold with the highest level. In this case, for example, when the threshold to be applied is the third detection threshold and the value of the correlator output is greater than the second detection threshold, the threshold to be applied and the value of the correlator output can be determined to be large and inconsistent. Similarly, for example, when the threshold to be applied is the second detection threshold and the value of the correlator output is greater than the first detection threshold, the threshold to be applied and the value of the correlator output can be determined to be large and inconsistent. This state can be inferred to be a case in which the packet transmitted from the other BSS is detected as in the above-described binary case, and thus the reception can be stopped. In particular, when the threshold to be applied is the third detection threshold and the value of the correlator output is greater than the first detection threshold, a possibility of detection of the packet transmitted from the other BSS is considered to be high.

For example, when the packet transmitted from the other BSS is also estimated to be detected in a case in which the use physical header is decided based on classification of 4 or more values, the reception can be stopped.

Whether "reception stop (BUSY)" is set or "reception stop (IDLE)" is set can be decided base on a comparison result between the threshold and the value of the correlator output. For example, a case in which the value of the correlator output is greater than the decided detection threshold (the threshold to be applied) by a given value (for example, 20 dB or more) is assumed to be an inconsistent treatment target. When the value of the correlator output is greater than the threshold one step higher than "Link Strength Category" in the PLCP header in the inconsistent treatment, "reception stop (BUSY)" can be set. For example, when the use physical header is decided based on the binary classification of the short distance and the long distance, the threshold one step higher is a short-distance detection threshold. When the value of the correlator output is not greater than the threshold one step higher than "Link Strength Category" in the PLCP header in the inconsistent treatment, "reception stop (IDLE)" can be set. For example, when the use physical header is decided based on the binary classification of the short distance and the long distance and the value of the correlator output is between the short-distance detection threshold and the long-distance detection threshold, "reception stop (IDLE)" can be set.

Even when there is no COLOR information in the SIGNAL field, the classification of the process may be set to "reception stop (IDLE)" or "reception stop (BUSY)" according to the strength of the correlator output and the content of the SIGNAL field. For example, when the format described in the SIGNAL field does not correspond to the self-device, the classification of the process is normally set to "reception stop (BUSY)." Exceptionally, when the format described in the SIGNAL field does not correspond to the self-device and the strength of the correlator output is equal to or less than a predetermined level, the classification of the process may be set to "reception stop (IDLE)."

When "reception" is decided as the subsequent process (step S808), the control unit 150 of the information processing device 100 continuously receives the tentatively detected packet to the end (step S809). When the received packet is destined for the self-device and an instant reply is requested, the physical header including the same "Link Strength Category" field as a target packet is added to be transmitted. That is, a portion in the SIGNAL field in which information regarding the detection threshold is stored is set to be identical, and information decided by the self-device is stored in other portions (for example, MCS and length).

When "reception stop (BUSY)" is decided as the subsequent process (step S808), the control unit 150 of the information processing device 100 stops the reception of the tentatively detected packet at an end time point of the physical header and returns the state to the waiting state (step S810). Here, the carrier sense state is treated as being BUSY up to the end time of the packet (step S811). A frame interval (Inter Frame Space (IFS)) before an attempt of subsequent transmission is set to arbitration IFS (AIFS) or distributed coordination function IFS (DIFS).

When "reception stop (IDLE)" is decided as the subsequent process (step S808), the control unit 150 of the information processing device 100 stops the reception of the tentatively detected packet at the end time point of the physical header and returns the state to the waiting state (step S812). Steps S807 to S812 are examples of a first procedure.

Subsequently, the control unit 150 of the information processing device 100 compares the measured RSSI to the energy detection threshold ED (step S813). When the measured RSSI is greater than the energy detection threshold ED (step S813), the control unit 150 of the information processing device 100 retains the carrier sense state as the BUSY state (step S814). The frame interval (IFS) before an attempt of subsequent transmission is set to AIFS or DIFS.

Conversely, when the measured RSSI is equal to or less than the energy detection threshold ED (step S813), the control unit 150 of the information processing device 100 transitions the carrier sense state to the IDLE state (step S815).

When the IDLE state transitions to the IDLE state (step S815 and S816) in this way, the frame interval (IFS) before an attempt of subsequent transmission is set to AIFS (step S819). Then, a process of tracing back up to a preamble start time (or a physical header start time) of the packet of which the reception is stopped, treating the carrier sense as IDLE, and invalidating the detection is performed (step S820).

Specifically, as in the example shown in FIG. 35, a time length (a time length from the packet detection determination time point by the Preamble or the start time of the physical header to a current time) in which the physical carrier sense result is BUSY is calculated. Then, the time slot conversion value of the length is subtracted from the backoff counter at a time. The application of the IFS previous to the subsequent carrier sense is also cancelled and subtraction of the backoff counter starts instantly (step S820). When the backoff counter after the subtraction is a negative value, as described above, for example, a random number generated in a range between 0 and a value equal to or less than a backoff counter value before the subtraction which is set to 0 and is returned to the positive absolute value of the negative value to be used can be set to a value after the subtraction.

When "reception stop (ERROR)" is decided as the subsequent process (step S808), the control unit 150 of the information processing device 100 stops receiving the tentatively detected packet at the end time point of the physical header and returns the state to the waiting state (step S812).

Subsequently, the control unit 150 of the information processing device 100 compares the measured RSSI to the energy detection threshold ED (step S813). When the measured RSSI is greater than the energy detection threshold ED (step S813), the control unit 150 of the information processing device 100 retains the carrier sense state in the BUSY state (step S814). The packet is treated as being an error and the frame interval (IFS) before an attempt of subsequent transmission is set to extended IFS (EIFS).

Conversely, when the measured RSSI is equal to or less than the energy detection threshold ED (step S813), the control unit 150 of the information processing device 100 transitions the carrier sense state to the IDLE state (step S815).

Since "reception stop (ERROR)" is decided as the subsequent process (step S816), the frame interval (IFS) before an attempt of subsequent transmission is set to EIFS (step S817). Then, the control unit 150 of the information processing device 100 determines whether the correlator output strength is less than a minimum detection threshold (step S818). That is, it is determined whether the correlator output strength is less than the minimum detection threshold in "Preamble Detection Threshold" shared in the above-described PLCP header parameter sharing process (step S818).

When the correlator output strength is less than the minimum detection threshold (step S818), the process proceeds to step S820. That is, the control unit 150 of the information processing device 100 traces back up to the preamble start time (or the physical header start time) of the stopped packet, treats the carrier sense as IDLE, and invalidates the detection (step S820). Steps S807, S808, S812, S813, and S815 to S820 are examples of a second procedure.

In this way, it is possible to more effectively acquire the transmission opportunity by stopping the reception and transiting to the IDLE state.

Here, when the IEEE 802.11 standard is assumed, the detection threshold of the L-STF portion can be set as the "detection threshold" in the ninth embodiment of the present technology. However, instead of the detection threshold of the L-STF portion, the detection threshold of the L-LTE portion may be set or the detection threshold common to both of the IT-STF portion and the L-LTF portion may be set. By independently changing the detection thresholds of the L-STF portion and the L-LTF portion, both of the detection thresholds may be designated as the physical header parameters.

In this way, the control unit 150 of the information processing device 100 performs control such that the reception of the packet is stopped during the reception according to a first condition. In this case, the control unit 150 of the information processing device 100 can perform an operation according to a second condition assuming that a carrier sense is in an idle state for a time from start of the reception of the packet to stop of the reception of the packet.

For example, a condition that the COLOR information designated in the physical header in the received packet be different from the COLOR information of a network belonging to the information processing device 100 can be set as the first condition. For example, a condition that a preamble correlator output level of the packet during the reception in antenna input conversion be less than a packet detection threshold derived from information described in the physical header of the packet can be set as the first condition. In this case, the control unit 150 can derive the packet detection threshold based on matching between an index described in the physical header of the packet and a table of thresholds shared in advance.

For example, a condition that a CRC calculation result obtained when a physical header of the received packet is a target be identical to the CRC described in the physical header can be set as the first condition.

For example, a condition that reception power of the packet during the reception be less than a pre-decided energy detection threshold can be set as the second condition. For example, a condition that transmission suppression by virtual carrier sense not be applied at the time of stopping of the reception of the packet can be set as the second condition.

For example, a condition related to a CRC calculation result obtained when a physical header of the packet is a target and related to a preamble correlator output level in antenna input conversion can be set as the second condition. For example, a condition that a CRC calculation result obtained when a physical header of the packet is a target not be identical to CRC information described in the physical header and the preamble correlator output level be less than a minimum packet detection threshold among applicable packet detection thresholds can be set as the second condition. In this case, the control unit 150 of the information processing device 100 can determine necessity and non-necessity of the operation using the second condition.

For example, when the second condition is not satisfied after stop of the reception of the packet, the control unit 150 of the information processing device 100 prohibits transmission from the information processing device 100 during a transmission continuity period of the packet transfer. However, in this case, when the frame which is destined for the information processing device 100 and requests a reply is received, the control unit 150 may transmit the reply to the frame.

For example, the second condition may include the first condition.

When the packet detection condition is satisfied (for example, the value of the correlator output is equal to or greater than the decided detection threshold), the control unit 150 of the information processing device 100 decides the subsequent process as "reception." However, when the COLOR information is present in the COLOR field and the COLOR information is different from the COLOR information of the network to which the information processing device 100 belongs, the subsequent process is decided as "reception stop (IDLE)." That is, the reception of the packet is stopped and the state returns to the waiting state.

For example, when the packet detection condition is not satisfied (for example, the value of the correlator output is less than the decided detection threshold), the control unit 150 decides the subsequent process as "reception stop (IDLE)." However, when the COLOR information is present in the COLOR field and the COLOR information is identical to the COLOR information of the network to which the information processing device 100 belongs, the subsequent process is decided as "reception." That is, the packet reception process is continued.

10. Tenth Embodiment

In the fourth embodiment of the present technology, the example in which the plurality of Preamble sequences are defined has been described. In a tenth embodiment of the present technology, as in the fourth embodiment of the preset technology, an example in which selection precision is further improved by defining a plurality of Preamble sequences and using COLOR information together will be described. The configurations of information processing devices in the tenth embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

The tenth embodiment of the present technology is a modification example of the fourth embodiment of the present technology. Therefore, some of processes and formats in the tenth embodiment of the present technology are also common portions to those of the fourth embodiment of the present technology. Therefore, the same reference numerals as those of the fourth embodiment of the present technology are given to common portions to those of the fourth embodiment of the present technology, and the description thereof will be partially omitted.

[Example of Format of PPDU]

FIG. 40 is a diagram showing an example of the format of a PPDU exchanged between the devices included in the communication system 10 according to the tenth embodiment of the present technology.

Here, the example shown in FIG. 40 is the same as the example shown in FIG. 21 except that a BSS COLOR field is set up in the SIGNAL field. Accordingly, the same reference numerals as those of FIG. 21 are given to common portions to those of FIG. 21, and the description thereof will be partially omitted.

The PPDU is configured to include Preamble 311, SIGNAL 351, Extension 303, Service 304, MPDU 305, and FCS 306.

Here, in the tenth embodiment of the present technology, a "BSS COLOR" field storing information (COLOR information) regarding a BSS identifier is set up in a part of the SIGNAL field of the physical header. In FIG. 40, the "BSS COLOR" field is indicated as COLOR. BSS COLOR information is the same as that of the ninth embodiment of the present technology.

An example of a case in which the information processing device (the master or slave station) transmitting the physical header belongs to the BSS set to "1" as the COLOR information is shown in a and b of FIG. 40.

In this way, in the tenth embodiment of the present technology, the "COLOR" field is set up in a portion treated as being reserved in the SIGNAL 311.

The connection process is the same as the first embodiment of the present technology. The orders of the physical header parameter decision process, the physical header parameter sharing process, and the use physical header decision process are the same as those of the ninth embodiment of the present technology.

The transmission and reception process is the same as that of the ninth embodiment of the present technology except for the packet detection and reception determination process (the processing order of step S800 shown in FIG. 37). Accordingly, the packet detection and reception determination process will be described with reference to FIGS. 41 and 42.

[Operation Example of Packet Detection and Reception Determination Process]

FIG. 41 is a diagram showing an example of a relation (process classification table) between a physical header and a process performed by the information processing device 100 according to the tenth embodiment of the present technology. FIG. 41 will be described in detail with reference to FIG. 42.

Figure 42:
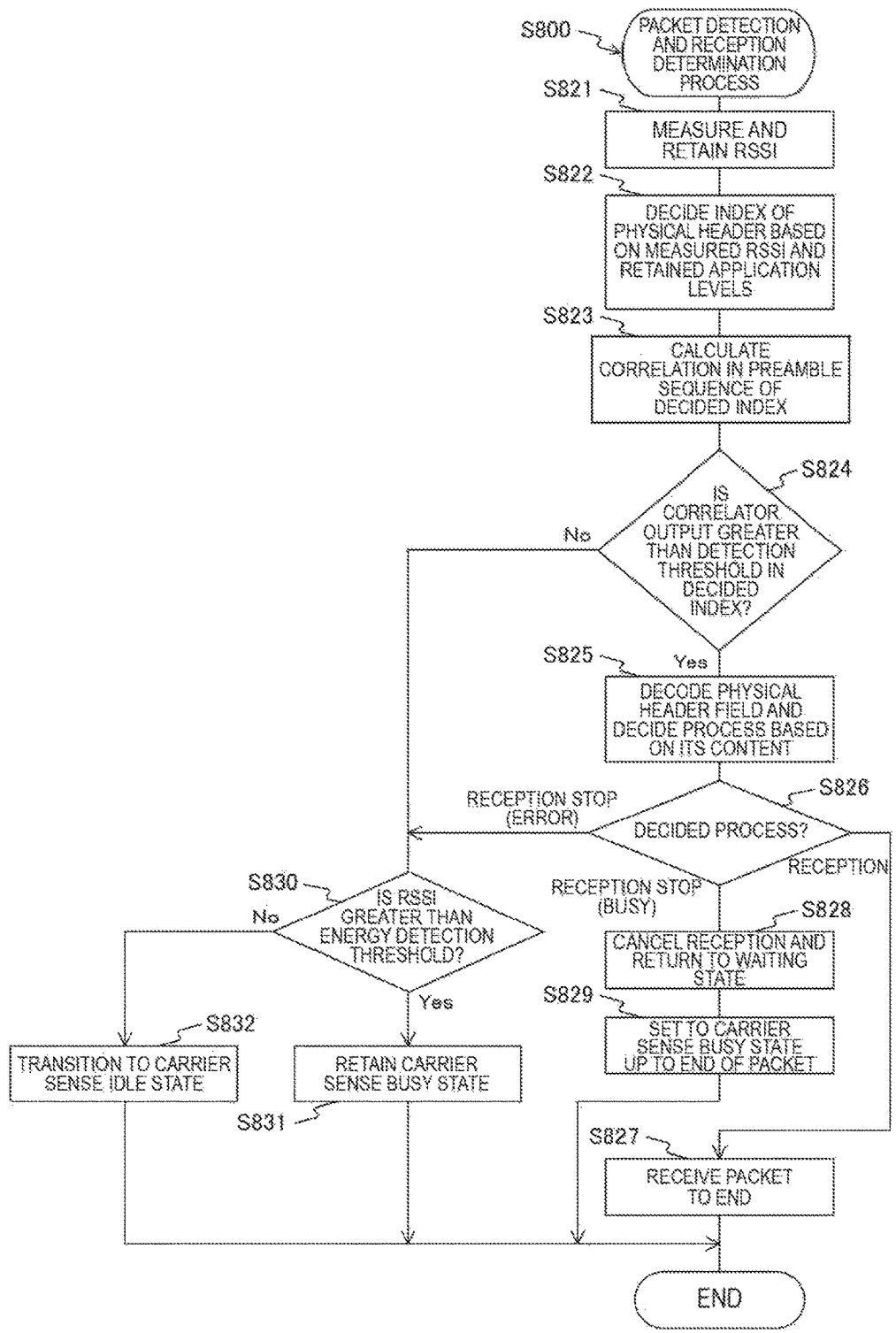
FIG. 42 is a flowchart showing a packet detection and reception determination process in the transmission and reception process by the information processing device 100 according to the tenth embodiment of the present technology.

FIG. 42 is a flowchart showing a packet detection and reception determination process (the processing order of step S800 shown in FIG. 37) in the transmission and reception process by the information processing device 100 according to the tenth embodiment of the present technology.

First, the control unit 150 of the information processing device 100 performs measurement of the RSSI on a signal input via the antenna 141 and retains the RSSI obtained through the measurement (step S821).

Subsequently, the control unit 150 of the information processing device 100 compares the measured RSSI to the retained application levels (L_far and L_near) of the physical headers and decides the index of the physical header to be applied to detection (step S822). For example, as in the selection method of selecting the transmission physical header of the self-device, it is possible to decide the index of the physical header to be applied to the detection.

For example, when the measured RSSI is compared to the value of L_near and the measured RSSI is greater than L_near, the control unit 150 of the information processing device 100 decides 1 (for the short distance) as the index of the physical header to be used for the correlation detection of the self-device. Conversely, when the measured RSSI is equal to or less than L_near, the control unit 150 of the information processing device 100 decides 0 (for the long distance) as the index of the physical header to be used for the correlation detection of the self-device.

Subsequently, the control unit 150 of the information processing device 100 performs correlation calculation using the correlator corresponding to the preamble sequence generated by the different rules, as described above, in the physical header with the decided index (step S823). Here, a correlator output is a correlation output strength COL as in the first embodiment of the present technology. That is, the correlator output is not a normalized correlator output level, but is a correlator output converted by reflecting reception power.

Subsequently, the control unit 150 of the information processing device 100 compares the correlator output of the selected correlator to the detection threshold of the physical header in the decided index to determine whether the value of the correlator output is greater than the detection threshold (step S824).

When the value of the correlator output is greater than the detection threshold (step S824), the control unit 150 of the information processing device 100 decodes the subsequent SIGNAL field in the physical header and reads information or the like in the SIGNAL field (step S825). Specifically, the "COLOR" field and the CRC of the physical header are read. The control unit 150 of the information processing device 100 decides one of "reception," "reception stop (IDLE)," "reception stop (BUSY)," and "reception stop (ERROR)" as the subsequent process (step S825).

Specifically, the control unit 150 of the information processing device 100 calculates the CRC of the physical header to confirm whether there is an error in the physical header. Here, when there is an error in the physical header, validity of the value of the field may not be confirmed. Therefore, as shown in FIG. 41, when there is an error in the physical header, a subsequent process is decided as "reception stop (ERROR)."

When there is no error in the CRC of the physical header, the process is decided based on content of the "COLOR" field. That is, when there is no error in the CRC of the physical header, the subsequent process is basically decided as "reception." However, as shown in FIG. 41, when there is a COLOR field and the value of the COLOR field is different from the value of the BSS to which the self-device belongs, the subsequent process is exceptionally decided as "reception stop (BUSY)." Thus, it is possible to avoid a case in which detection of a desired packet fails due to reception of a packet which it is not originally necessary to receive.

A processing order (step S827) when "reception" is decided as the subsequent process corresponds to the processing order (step S809) shown in FIG. 39. A processing order (steps S828 and S829) when "reception stop (BUSY)" is decided as the subsequent process corresponds to the processing order (steps S810 and S811) shown in FIG. 39. A processing order (steps S830 to S832) when "reception stop (IDLE)" or "reception stop (ERROR)" is decided as the subsequent process corresponds to the processing order (steps S813 to S815) shown in FIG. 39.

When the value of the correlator output is equal to or less than the detection threshold (step S824), the process proceeds to step S830. That is, when the value of the correlator output is equal to or less than the detection threshold (step S824), subsequent processes are not performed and the Preamble non-detection state remains.

11. Eleventh Embodiment

In the ninth embodiment of the present technology, the example in which the physical header parameter decision process is performed has been described. In an eleventh embodiment of the present technology, an example in which the physical header parameter decision process is omitted will be described.

The configurations of information processing devices in the eleventh embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

The eleventh embodiment of the present technology is a modification example of the ninth embodiment of the present technology. Therefore, some of processes and formats in the eleventh embodiment of the present technology are also common portions to those of the ninth embodiment of the present technology. Therefore, the same reference numerals as those of the ninth embodiment of the present technology are given to common portions to those of the ninth embodiment of the present technology, and the description thereof will be partially omitted.

[Example of Format of PPDU]

FIG. 43 is a diagram showing an example of the format of a PPDU exchanged between the devices included in the communication system 10 according to the eleventh embodiment of the present technology.

Here, the example shown in FIG. 43 is the same as the example shown in FIG. 31 except that "Requested Detection Level" is set up in the SIGNAL field instead of "Link Strength Category." Accordingly, the same reference numerals as those of FIG. 31 are given to common portions to those of FIG. 31, and the description thereof will be partially omitted.

The PPDU is configured to include Preamble 301, SIGNAL 361, Extension 303, Service 304, MPDU 305, and FCS 306.

Here, in the eleventh embodiment of the present technology, a "Requested Detection Level" field and a "BSS COLOR" field storing COLOR information are set up in parts of the SIGNAL field of the physical header.

When the "Requested Detection Level" field in the SIGNAL field of the physical header is set up in this way, the information processing device can directly designate a signal level desired to be used for the detection determination in regard to destinations at the time of transmission. Here, a quantization method and a unit of the signal level are assumed to be shared between the destinations.

Each information processing device changes content of the "Requested Detection Level" field according to quality of link with the destination.

In this way, in the eleventh embodiment of the present technology, the "Requested Detection Level" field and the "COLOR" field are set up in portions treated as being reserved in the SIGNAL 361. Thus, it is possible to realize a specific function in the eleventh embodiment of the present technology without interfering with reception of the legacy device.

The information processing device (other than the legacy device) receiving the packet including the "Requested Detection Level" field can acquire the content of the "Requested Detection Level" field. Then, the information processing device can directly use the content of the "Requested Detection Level" field as the detection threshold to be applied.

The connection process is the same as that of the first embodiment of the present technology. The physical header parameter decision process can be omitted, as described above.

In the eleventh embodiment of the present technology, exchange of information between the master and slave stations in regard to the detection application threshold can be omitted. Therefore, the physical header parameter sharing process can be omitted. In the eleventh embodiment of the present technology, however, information regarding "COLOR" (the BSS identifier in the physical layer) and "TxPower" (transmission power of the master station) is also additionally transferred in addition to "Multi Detect Parameter." An example of the frame format used in this case is shown in FIG. 44.

[Example of Beacon Frame Format]

FIG. 44 is a diagram showing an example of a beacon frame format exchanged between the devices included in a communication system 10 according to the eleventh embodiment of the present technology. Since FIG. 44 is a modification example of FIG. 32, the same reference numerals as those of FIG. 32 are given to common portions to those of FIG. 32, and the description thereof will be partially omitted.

FIG. 44 illustrates an example in which "Multi Detect Parameter" 311 is omitted in Payload 340 shown in FIG. 32. "COLOR Info" 371 and "TxPower Info" 372 correspond to "COLOR Info" 341 and "TxPower Info" 342 shown in FIG. 32.

For example, the control unit of the information processing device 200 transmits a beacon in which information is stored in "COLOR Info" 371 and "TxPower Info" 372 to nearby information processing devices to inform the nearby information processing devices of the beacon.

The information processing device informed of the beacon acquires the information stored in "COLOR Info" 371, and "TxPower Info" 372 from the beacon to retain the information. That is, the information processing device retains content of the BSS identifier in the physical layer and the transmission power of a communication partner (for example, the master station).

When the content of the beacon is retained and subsequently information included in a subsequent beacon is changed, information included in a latest beacon (latest information) is adopted and retained.

The master station may notify of the content of the BSS identifier in the physical layer and the transmission power of the self-device using a signal other than the beacon transmission. For example, the master station may perform the notification using a unicast data frame or management frame to a subordinate terminal using determination by the self-device or an information acquisition request from the subordinate terminal as a trigger.

[Operation Example of Use Physical Header Decision Process]

Figure 45:
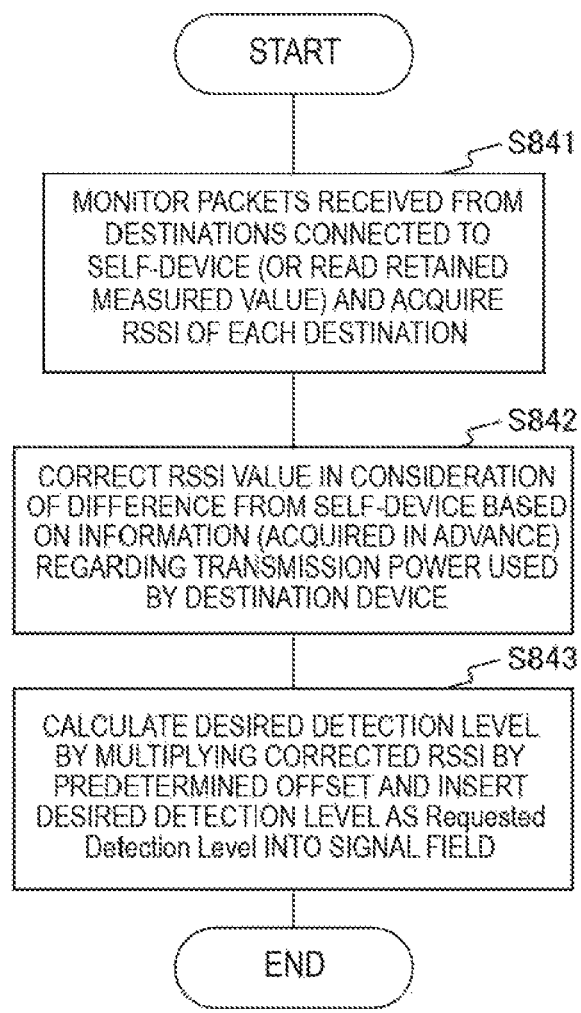
FIG. 45 is a flowchart showing an example of a processing order of a use physical header decision process by the information processing device 100 according to the eleventh embodiment of the present technology.

FIG. 45 is a flowchart showing an example of a processing order of a use physical header decision process (transmission physical header selection process) by the information processing device 100 according to the eleventh embodiment of the present technology.

First, the control unit 150 of the information processing device 100 monitors packets received from destinations connected to the self-device and acquires the RSSI of each destination (step S841). The RSSI (the monitoring result (the RSSI measurement result for each destination)) acquired in this way is set to RSSI_peer. In the eleventh embodiment of the present technology, RSSI information from the master station to which the information processing device 100 is connected can be set to RSSI_peer.

When measured values of the packets received from the destinations connected to the self-device are retained, the control unit 150 of the information processing device 100 may read the measured value to acquire the RSSI of each destination (step S841).

Here, in the case of the information processing device (for example, the information processing device 100) connected to the master station (for example, the information processing device 200), only the master station is basically set as the destination. In this case, the reception level of a previous beacon may be used as a monitoring result.

Subsequently, the control unit 150 of the information processing device 100 corrects the acquired RSSI_peer in consideration of a transmission power difference (step S842). For example, "TxPower" information (which is stored in "TxPower Info" 372 shown in FIG. 44) notified of with the beacon by the master station is set to TP_peer. Transmission power used for transmission to the master station by the information processing device 100 is set to TP_self. In this case, the corrected RSSI_adjusted can be obtained by the following Expression 13 (which is the same as Expression 13 in the ninth embodiment of the present technology).

$$RSSI\_adjusted = RSSI\_peer + (TP\_self - TP\_peer) \quad \text{Expression 13}$$

Here, RSSI_adjusted indicates an estimated value of the RSSI expected when the master station side receives transmission from the information processing device 100. However, when information corresponding to TP_peer may not be obtained, RSSI_adjusted may be substituted with RSSI_peer.

Subsequently, the control unit 150 of the information processing device 100 converts RSSI_adjusted into an application desired detection level Lreq using the following Expression 15. Here, Expression 15 is description in which calculation in logarithm (dB) is assumed.

$$L\_req = RSSI\_adjusted + O \quad \text{Expression 15}$$

Here, O is an offset amount of a margin for a preamble detection error by a variation in a reception level. For example, O can be set to a range of about −10 dBm to −20 dBm.

A value of the application desired detection level L_req obtained in this way is quantized in predetermined units shared in advance to be stored in the "Requested Detection Level" field 361 (which is a portion of "xx" shown in FIG. 43).

The example in which the RSSI is used has been described in FIG. 45. However, the correlation output strength COL may be used instead of the RSSI.

[Operation Example of Transmission and Reception Process]

A transmission and reception process is substantially the same as that of the ninth embodiment of the present technology and only a process classification table of the physical header after tentative detection is different. Accordingly, an example of the process classification table used in the eleventh embodiment of the present technology is shown in FIG. 46.

FIG. 46 is a diagram showing an example of a relation (process classification table) between a physical header and a process performed by the information processing device 100 according to the eleventh embodiment of the present technology.

In the ninth embodiment of the present technology, the example in which the application detection threshold is acquired from the threshold list retained in advance using "Link Strength Category" has been described. However, in the eleventh embodiment of the present technology, a detection threshold to be applied is directly described in the "Requested Detection Level" field. Therefore, in the eleventh embodiment of the present technology, the detection threshold (the application desired detection level Lreq) described in the "Requested Detection Level" field can be used without change.

In this way, the process classification table in the eleventh embodiment of the present technology is different from the process classification table (shown in FIG. 38) in the ninth embodiment of the present technology in the detection threshold to be applied. The other remaining processes are the same as those of the ninth embodiment of the present technology, and thus the description thereof will be omitted.

12. Twelfth Embodiment

In the first embodiment of the present technology, the example in which Link Strength Category field is set up in the SIGNAL field of the IEEE 802.11 standard has been described.

In a twelfth embodiment of the present technology, an example in which the Link Strength Category field is not set up in the SIGNAL field of the IEEE 802.11 standard and a field storing information regarding a BSS identifier is set up will be described. In the twelfth embodiment of the present technology, an example in which a packet is selected with only the BSS identifier will be described. The configurations of information processing devices in the twelfth embodiment of the present technology are substantially the same as the configurations of the information processing devices 100 to 103, 200, and 201 shown in FIG. 1 and the like. Therefore, the same reference numerals as those of the first embodiment of the present technology are given to common portions to those of the first embodiment of the present technology, and the description thereof will be partially omitted.

Some of the processes and the formats in the twelfth embodiment of the present technology are common to those of the first embodiment of the present technology. Therefore, the same reference numerals as those of the first embodiment of the present technology are given to common portions to those of the first embodiment of the present technology, and the description thereof will be partially omitted.

[Example of Format of PPDU]

FIG. 47 is a diagram showing an example of the format of a PPDU exchanged between the devices included in the communication system 10 according to the twelfth embodiment of the present technology.

Here, the example shown in FIG. 47 is the same as the example shown in FIG. 7 except that the BSS COLOR field is set up in the SIGNAL field rather than Link Strength Category field. Accordingly, the same reference numerals as those of FIG. 7 are given to common portions to those of FIG. 7, and the description thereof will be partially omitted.

The PPDU is configured to include Preamble 301, SIGNAL 381, Extension 303, Service 304, MPDU 305, and FCS 306.

In the twelfth embodiment of the present technology, the "BSS COLOR" field storing information (COLOR information) regarding the BSS identifier is set up in a part of the SIGNAL field of the physical header. In FIG. 47, the "BSS COLOR" field is indicated by COLOR.

An example of a case in which an information processing device (master or slave station) transmitting the physical header belongs to the BSS in which "1" is set as the COLOR information (that is, COLOR=1) is shown in a of FIG. 47. Here, b of FIG. 47 corresponds to c of FIG. 7.

In this way, in the twelfth embodiment of the present technology, a "COLOR" field is set up in the SIGNAL 311. When there is a portion treated as being reserved in the SIGNAL field with the existing format, it is possible to realize a specific function in the twelfth embodiment of the present technology without interfering with reception of the legacy device by storing the COLOR field in that portion. When the format of the SIGNAL field is newly defined, the COLOR information is stored in that portion.

The information processing device (other than the legacy device) receiving the packet including the COLOR field can acquire content of the COLOR field. Then, based on the content of the COLOR field, the information processing device can change the reception operation and the detection threshold to be applied.

[Example of Connection Process]

A connection process is the same as that of the first embodiment of the present technology.

[Operation Example of Physical Header Parameter Decision Process]

Figure 48:
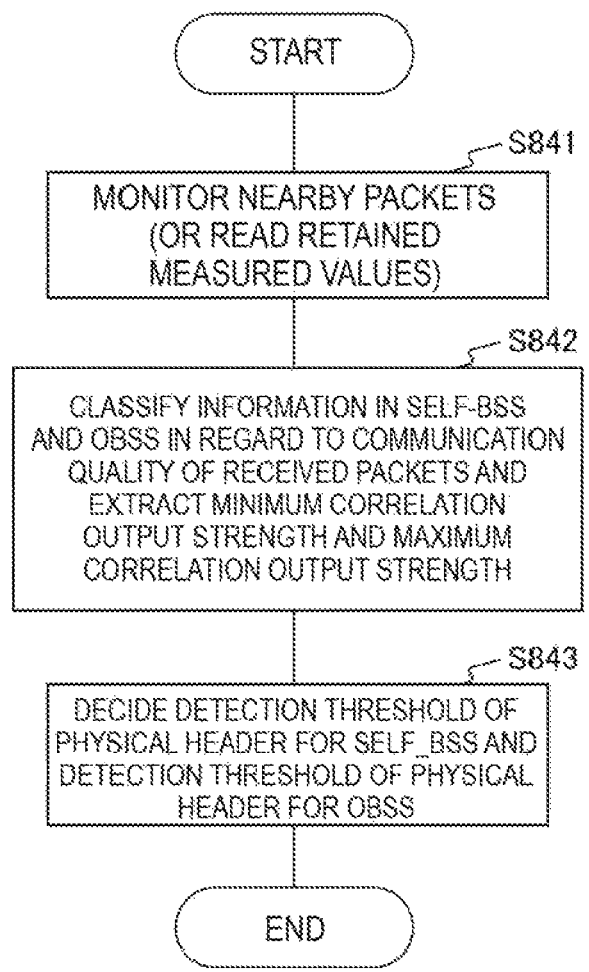
FIG. 48 is a flowchart showing an example of a processing order of a physical header parameter decision process by the information processing device 200 according to the twelfth embodiment of the present technology.

FIG. 48 is a flowchart showing an example of a processing order of a physical header parameter decision process by the information processing device 200 according to the twelfth embodiment of the present technology.

When connection is established, the control unit of the information processing device 200 generates physical header parameters (for example, detection thresholds of the physical header) to be used by subordinate terminals and the self-device in the self-BSS (updates the physical header parameters when the parameters are already present). Specifically, a difference in the physical header in the twelfth embodiment of the present technology is a difference in matching or non-matching of the BSS identifier information (COLOR information) in the physical header with information of the BSS to which the self-device belongs.

First, the control unit of the information processing device 200 performs packet monitoring (step S841). Then, the control unit of the information processing device 200 acquires information regarding communication quality with each subordinate information processing device in the self-BSS and information regarding communication quality of packets from other BSSs (OBSSs) (step S841).

Here, an example in which RSSI or correlation output strength of the PLCP preamble is used as an index of the communication quality will be described. The correlation output strength is not a correlator output in which power is normalized, but is assumed to indicate an absolute level obtained by multiplying a correlator output by a RSSI. That is, the correlation output strength is a correlator output corrected to an antenna input conversion. When there is a reception history at a relatively close time, a record of the correlation output strength at that time may be properly used. At the time of monitoring, the detection threshold may be temporarily lowered so that a more reliable sample is collected.

Subsequently, the control unit of the information processing device 200 classifies communication quality of packets received from the subordinate information processing devices in the self-BSS and communication quality of packets received from the other BSS (OBSS) (step S842). Then, the control unit of the information processing device 200 extracts a minimum correlation output strength in regard to the self-BSS and a maximum correlation output strength in regard to the OBSS (step S842).

Here, the minimum correlation output strength in regard to the self-BSS is a minimum correlation output strength of a packet for which the BSS identifier (the BSSID in the MAC header or the BSS COLOR information in the physical header) is the same as that of the BSS to which the self-device belongs and is set to COL_self. Further, the maximum correlation output strength in regard to the OBSS is a maximum correlation output strength of a packet for which the BSS identifier (the BSSID in the MAC header or the BSS COLOR information in the physical header) is different from that of the BSS to which the self-device belongs and is set to COL_other.

COL for which there is no packet sample of a corresponding condition is replaced with PD_default. Here, PD_default indicates a reference level of preamble detection used by a legacy device. In the IEEE 802.11 standard, as a standard value, a value such as −82 dBm every 20 MHz bandwidth is referred to.

Subsequently, the control unit of the information processing device 200 decides a detection threshold PD_self for the physical header indicating the self-BSS and a detection threshold PD_other for the physical header indicating the OBSS based on the extracted correlation output strengths (step S843). For example, the detection threshold PD_self and the detection threshold PD_other can be decided in a range in which relations of the following Expressions 16, 17, and 18 are established. The decision of PD_self may be omitted. In this case, PD_self is substituted with PD_default.

$$PD\_self < COL\_self \qquad \text{Expression 16}$$

$$PD\_other < COL\_other \qquad \text{Expression 17}$$

$$PD\_other < COL\_self \qquad \text{Expression 18}$$

In this case, when there is no PD_other which simultaneously satisfies Expression 17 and 18, Expression 18 is preferred.

PD_other may be individually decided for each subordinate information processing device. An index of the information processing device is set to n and PD_other to be used by an n-th subordinate information processing device is set to PD_other(n). The control unit of the information processing device 200 classifies the packets transmitted from the subordinate information processing devices in the self-BSS in the above-described monitoring result for each transmission source. When the minimum correlation output strength obtained from the packet from the n-th subordinate information processing device is set to COL_self(n), PD_other(n) is decided so that the following Expression 19 is satisfied.

$$PD\_other(n) < COL\_self(n) \qquad \text{Expression 19}$$

Even when PD_other is individually decided, PD_other (n) may not necessarily be designated in all of the subordinate devices. In this case, information regarding common PD_other to be used by the devices which are not individually designated is additionally decided.

Here, an example of a carrier sense detection range of each information processing device set based on the detection threshold PD_self and the detection threshold PD_other (n) will be described. Here, examples of the carrier sense detection ranges of the information processing devices 100, 102, 200, and 201 will be described with reference to FIGS. 12 and 13.

As described above, in FIG. 12, carrier sense detection ranges 31 to 34 of the information processing devices 100 and 102 are schematically indicated by dotted circles. In FIG. 13, carrier sense detection ranges 41 to 44 of the information processing devices 200 and 201 are schematically indicated by dotted circles.

For example, in FIG. 12, the carrier sense detection range 31 corresponds to a carrier sense detection range of the information processing device 100 set based on the detection threshold PD_self for the physical header indicating the self-BSS of the information processing device 100. Further, the carrier sense detection range 33 corresponds to a carrier sense detection range of the information processing device 100 set based on the detection threshold PD_other(n) for the physical header indicating the OBSS of the information processing device 100.

In FIG. 12, the carrier sense detection range 32 indicates a carrier sense detection range of the information processing device 102 set based on the detection threshold PD_self for the physical header indicating the self-BSS of the information processing device 102. Further, the carrier sense detection range 34 corresponds to a carrier sense detection range of the information processing device 102 set based on the detection threshold PD_other(n) for the physical header indicating the OBSS of the information processing device 102.

In FIG. 13, the carrier sense detection range 41 corresponds to a carrier sense detection range of the information processing device 200 set based on the detection threshold PD_self for the physical header indicating the self-BSS of the information processing device 200. Further, the carrier sense detection range 43 corresponds to a carrier sense detection range of the information processing device 200 set based on the detection threshold PD_other(n) for the physical header indicating the OBSS of the information processing device 200.

In FIG. 13, the carrier sense detection range 42 indicates a carrier sense detection range of the information processing device 201 set based on the detection threshold PD_self for the physical header indicating the self-BSS of the information processing device 201. Further, the carrier sense detection range 44 corresponds to a carrier sense detection range of the information processing device 201 set based on the detection threshold PD_other(n) for the physical header indicating the OBSS of the information processing device 201.

The monitoring and the decision of the setting values shown in FIG. 48 may be performed for each given time or may be performed whenever connection of a new subordinate device is detected, so that the setting values can be updated sequentially.

[Example of Physical Header Parameter Sharing Process]

The order of a physical header parameter sharing process is the same as that of the first embodiment of the present technology. In the twelfth embodiment of the present technology, however, the physical header parameters are detection thresholds (the detection threshold PD_self of the physical header for the self-BSS and the detection threshold PD_other of the physical header for the OBSS). An example of the frame format used in this case is shown in FIG. 49.

[Example of Beacon Frame Format]

Figure 49:
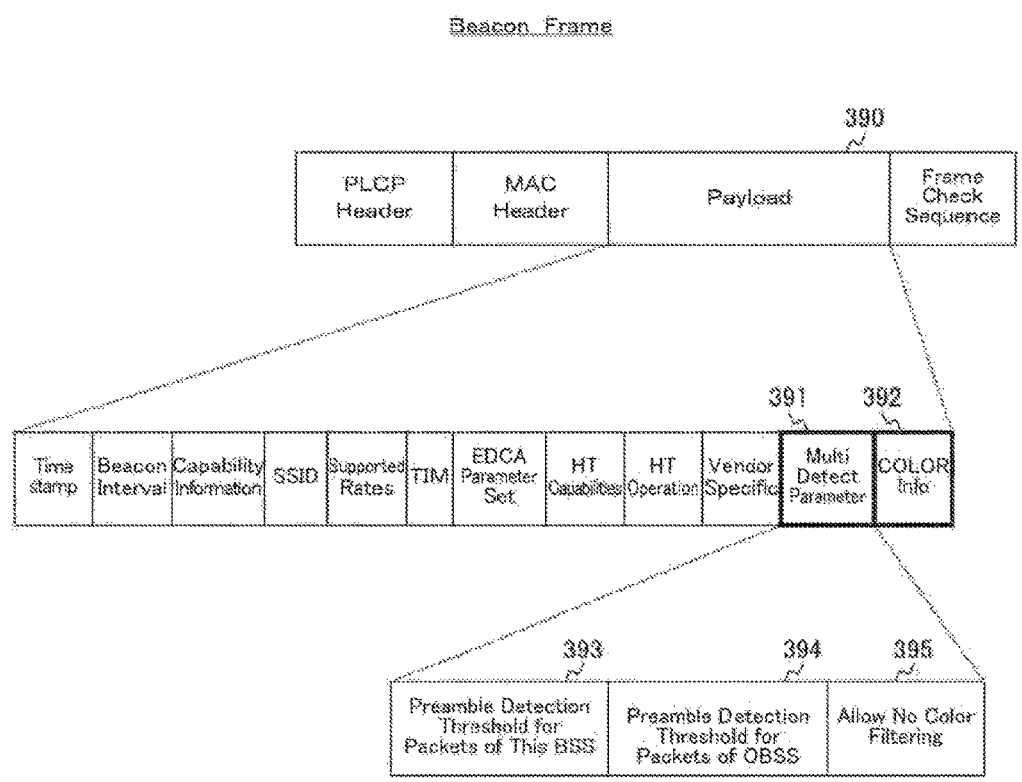
FIG. 49 is a diagram showing an example of a beacon frame format exchanged between the devices included in the communication system 10 according to the twelfth embodiment of the present technology.

FIG. 49 is a diagram showing an example of a beacon frame format exchanged between the devices included in a communication system 10 according to the twelfth embodiment of the present technology. Since FIG. 49 is a modification example of FIG. 14, the description of common portions to those of FIG. 14 will be partially omitted.

FIG. 49 shows an example in which elements such as "Multi Detect Parameter" 391 and "COLOR info" 392 are newly added to Payload 390.

Three fields 393 to 395 are set up in "Multi Detect Parameter" 391.

The detection threshold PD_self of the physical header of the self-BSS is stored in Preamble Detection Threshold for Packets of This BSS 393. The detection threshold PD_other of the physical header for the OBSS is stored in Preamble Detection Threshold for Packets of OBSS 394. Here, it is necessary to store the detection threshold PD_other of the physical header OBSS, but the detection threshold of the physical header for the self-BSS may not be stored. In this way, when the detection threshold of the physical header for the self-BSS is not stored, each information processing device can substitute the detection threshold as PD_self=PD_default. When PD_other can be individually decided for each subordinate information processing device in the above-described physical header parameter decision process (that is, PD_other(n) is decided), information regarding all PD_other(n) is stored in this field along with information for specifying the subordinate device corresponding to the information. When PD_other(n) is not designated in regard to any of the subordinate devices, information regarding PD_other commonly used by undesignated devices is also stored.

Information indicating whether reception stop is permitted in regard to a packet not including BSS COLOR is stored in Allow No Color Filtering 395. Whether to permit the reception stop can be set, for example, according to a device connected to the information processing device 200. For example, when only one device (for example, a legacy device) for which the COLOR information may not be added is not present in subordination to the information processing device 100, the control unit of the information processing device 200 can perform setting such that the reception step is permitted.

In regard to the information stored in Allow No Color Filtering 395, this field may be substituted with another field, when the field can be substituted with the other field. In this way, when the field is substituted with another field, information to be stored in Allow No Color Filtering 395 may not be stored in "Multi Detect Parameter."

The BSS identifier in the physical layer is stored in "COLOR Info" 392. The BSS identifier corresponds to the BSS identifier stored in the "BSS COLOR" field shown in FIG. 47.

For example, the control unit of the information processing device 200 transmits a beacon in which information is stored in "Multi Detect Parameter" 391 and "COLOR Info" 392 to nearby information processing devices to inform the nearby information processing devices of the beacon.

The information processing device informed of the beacon acquires the information stored in "Multi Detect Parameter" 391 and "COLOR Info" 392 from the beacon to retain the information. That is, the information processing device retains content of "Multi Detect Parameter" and the BSS identifier in the physical layer. When PD_other to be used by the information processing device is individually designated, PD_other(n) corresponding to the self-device is assumed to be retained as the value of PD_other. When PD_other is not individually designated, the value of PD_other to be commonly used by the subordinate devices is retained.

When the content of the beacon is retained and subsequently information included in a subsequent beacon is changed, information included in a latest beacon (latest information) is adopted and retained.

The master station may notify of the content of "Multi Detect Parameter" and the BSS identifier in the physical layer using a signal other than the beacon transmission. For example, the master station may perform the notification using a unicast data frame or management frame to a subordinate terminal using determination by the self-device or an information acquisition request from the subordinate terminal as a trigger.

[Example of Use Physical Header Decision Process]

In the twelfth embodiment of the present technology, BSS COLOR information to be used in the self-BSS is added to the physical header. The PLCP header is not changed according to a link state. The use physical header decision process is performed in the same way in an uplink and a downlink.

[Example of Transmission and Reception Process]

The order of a transmission and reception process according to the twelfth embodiment of the present technology is the same as that of the ninth embodiment of the present technology (the transmission and reception process shown in FIG. 37). For example, both of the master and slave station sides can perform the transmission and reception process shown in FIG. 37 in the same way. For example, both of the master and slave station sides are assumed to perform a packet detection and reception determination process basically for a time other than during transmission and reception.

[Operation Example of Packet Detection and Reception Determination Process]

The packet detection and reception determination process according to the twelfth embodiment of the present technology is basically the same as that of the ninth embodiment (the operation example shown in FIG. 39) of the present technology. However, a process classification table to be referred to is different.

FIG. 50 is a diagram showing an example of a relation (process classification table) between a physical header and a process performed by the information processing device 100 according to the twelfth embodiment of the present technology. FIG. 50 will be described in detail with reference to FIG. 39.

As shown in FIG. 39, each of the master and slave stations corresponding to the respective functions in the twelfth embodiment of the present technology performs measurement of the RSSI and monitoring of the correlator output on the signal input via the antenna during the waiting state (step S801).

Subsequently, the control unit 150 of the information processing device 100 performs the correlation calculation of the Preamble pattern and compares the output (the correlator output) to the tentative detection threshold (step S802). Here, the tentative detection threshold is a detection threshold for reading the SIGNAL field before this determination process. As the tentative detection threshold, for example, a value equal to or less than both of PD_self and PD_other can be used. For example, PD_default can be used as the tentative detection threshold.

The "correlator output" mentioned herein means the above-described correlation output strength COL. The correlator output is not a normalized correlator output level, but is a correlator output converted by reflecting reception power.

When the value of the correlator output is greater than the tentative detection threshold (step S802), the control unit 150 of the information processing device 100 determines that the state is the tentative detection state and transitions the state to the carrier sense BUSY state (step S806). Subsequently, the control unit 150 of the information processing device 100 decodes the subsequent SIGNAL field in the physical header to read information or the like in the SIGNAL field (step S807). Specifically, the "COLOR" field and the CRC of the physical header are read.

The control unit 150 of the information processing device 100 combines the read information and the process classification table shown in FIG. 50 and decides a subsequent process (step S807).

Specifically, the control unit 150 of the information processing device 100 calculates the CRC of the physical header to confirm whether there is an error in the physical header. Here, when there is an error in the physical header, validity of the value of the field may not be confirmed. Therefore, as shown in FIG. 50, when there is an error in the physical header, a subsequent process is decided as "reception stop (ERROR)." When there is no error in the CRC of the physical header, the process is decided based on content of the "COLOR" field and the information shared in the physical header parameter sharing process.

Specifically, when the COLOR information in the physical header is identical to the COLOR information of the self BSS, the subsequent process is decided as "reception."

When the COLOR information in the physical header is different from the COLOR information of the self-BSS, the control unit 150 of the information processing device 100 compares the decided detection threshold to the value of the correlator output.

When the COLOR information in the physical header is different from the COLOR information of the self-BSS and the value of the correlator output is lower on the basis of the detection threshold PD_other for the physical header indicating the OBSS, the subsequent process is decided as "reception stop (IDLE)."

Further, when the COLOR information in the physical header is different from the COLOR information of the self-BSS and the value of the correlator output is higher on the basis of the detection threshold PD_other for the physical header, the subsequent process is decided as "reception stop (BUSY)."

The case in which the value of the correlator output is lower on the basis of the detection threshold PD_other is a case in which the value of the correlator output is equal to or less than the detection threshold PD_other or a case in which the value of the correlator output is less than the detection threshold PD_other. The case in which the value of the correlator output is higher on the basis of the detection threshold PD_other is a case in which the value of the correlator output is equal to or greater than the detection threshold PD_other or a case in which the value of the correlator output is greater than the detection threshold PD_other. When the case in which the value of the correlator output is lower on the basis of the detection threshold PD_other is set to the case in which the value of the correlator output is equal to or less than the detection threshold PD_other, the case in which the value of the correlator output is higher on the basis of the detection threshold PD_other is set to the case in which the value of the correlator output is greater than the detection threshold PD_other. Similarly, when the case in which the value of the correlator output is lower on the basis of the detection threshold PD_other is set to the case in which the value of the correlator output is less than the detection threshold PD_other, the case in which the value of the correlator output is higher on the basis of the detection threshold PD_other is set to the case in which the value of the correlator output is equal to or greater than the detection threshold PD_other.

When there is no COLOR information in the physical header, the subsequent process is decided as "reception." Exceptionally, the same determination as that of the case of the COLOR mismatch described above is performed only when the reception stop of the packet in which the COLOR information is not included is permitted in the BSS. Whether to permit the reception stop can be determined based on information stored in Allow No COLOR Filtering 395 shown in FIG. 49.

The other remaining processes are the same as those of the ninth embodiment of the present technology, and thus the description thereof will be omitted herein.

As described above, for example, the condition that the preamble correlator output level of the packet during the reception in the antenna input conversion be less than the packet detection threshold derived from the information described in the physical header of the packet can be set as the first condition. In this case, the control unit 150 can perform the derivation through conversion based on a value described in the physical header of the packet and information regarding a unit and quantization shared in advance.

In the embodiments of the present technology, the communication system including the access points (the information processing devices 200 and 201) has been described as an example, but the embodiments of the present technology can also be applied to a communication system including no access point. Examples of the communication system including no access point include a mesh network or an ad-hoc network.

For example, when quality of link with another information processing device that is not connected to the self-device is confirmed, a packet detection condition (a detection threshold of PLCP) in which a condition is relaxed most may be used in a period of time in which a reply is expected.

Here, when the number of slave stations increases in a CSMACA network, excessive transmission suppression occurs, and thus a situation in which transmission efficiency of an entire system deteriorates may happen in the carrier sense scheme. Accordingly, there is a method of increasing transmission opportunities by raising the detection threshold of the carrier sense. However, when a reception side terminal first receives an unrelated packet despite an increase in the number of transmission opportunities on a transmission side, a reception opportunity may be lost. For this reason, it is necessary for the reception side to appropriately raise the detection threshold.

However, in an information processing device (for example, an access point) for which a plurality of connection partners asynchronously performing transmission to the self-device are simultaneously present, it is assumed that it is difficult to optimally set a detection threshold in advance. For example, when the threshold is set to be normally high, a service area may be narrowed, and thus there is a concern of communication not being appropriately performed with some of the plurality of connection partners.

Accordingly, in an embodiment of the present technology, a plurality of physical headers to be used properly according to attenuation from destinations are defined and different detection thresholds corresponding to the physical headers are prepared. Thus, it is possible to appropriately change a detection operation according to a communication partner That is, according to an embodiment of the present technology, it is possible to avoid excessive transmission suppression as necessary, increase both transmission opportunities and reception opportunities, and improve use efficiency of radio resources. In other words, it is possible to efficiently use radio resources in channel access for wireless transmission.

13. Application Examples

The technology according to the present disclosure can be applied to various products. For example, the information processing devices 100 to 104, 200, and 201 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. Further, the information processing devices 100 to 104, 200, and 201 may be realized as terminals (also referred to as machine type communication (MTC) terminals) which perform machine to machine (M2M) communication, such as smart meters, vending machine, remote monitoring devices and point of sale (POS) terminals. Furthermore, the information processing devices 100 to 104, 200, and 201 may be wireless communication modules mounted in such terminals (for example, integrated circuit modules configured in one die).

For example, the information processing devices 200, and 201 may be realized as a wireless LAN access point (which is also referred to as a wireless base station) that has no router function or has a router function. The information processing devices 200, and 201 may be realized as a mobile wireless LAN router. Furthermore, the information processing devices 200, and 201 may be wireless communication modules mounted in such devices (for example, integrated circuit modules configured in one die).

<13-1. First Application Example>

Figure 51:
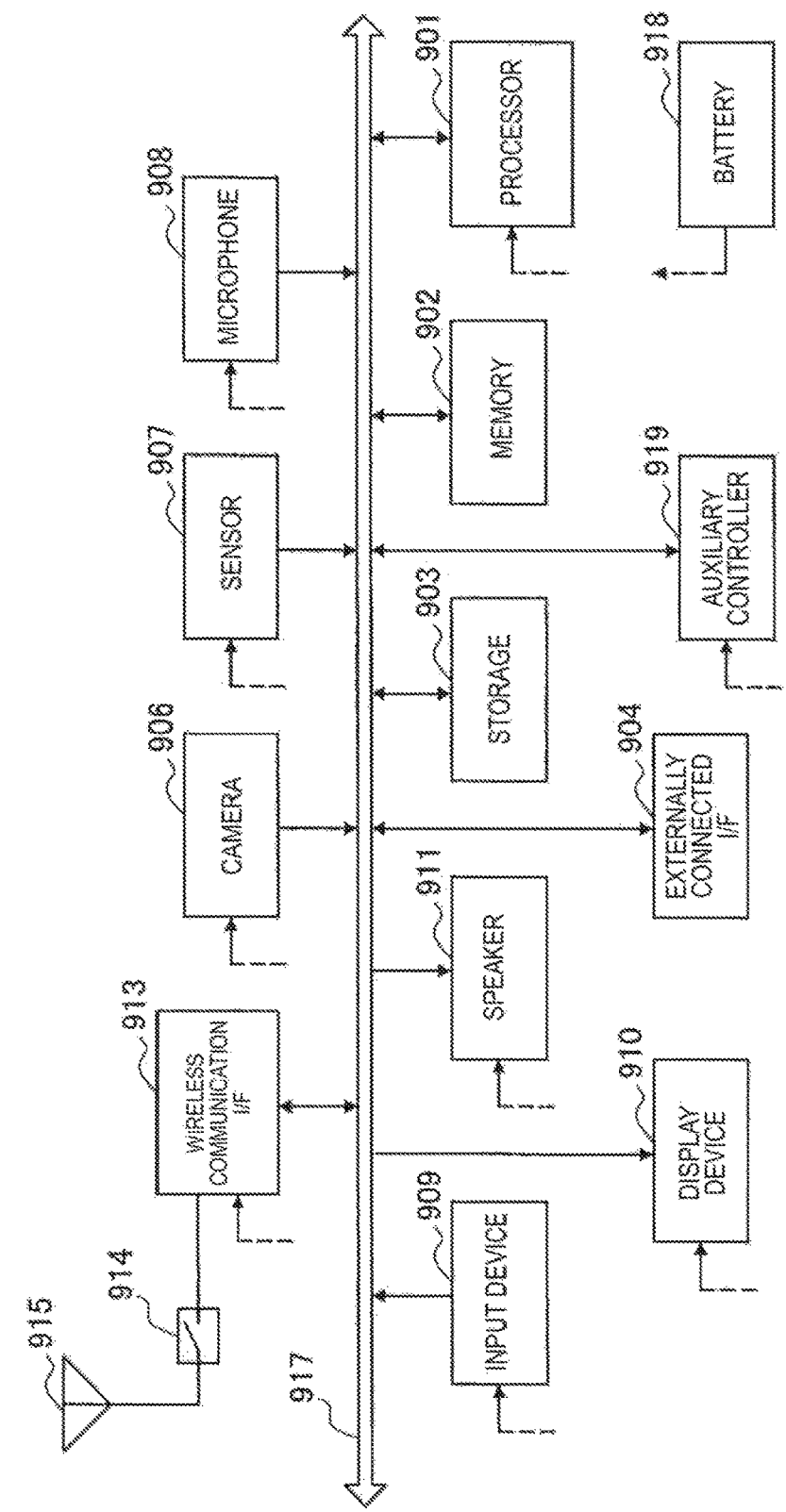
FIG. 51 is a block diagram showing an example of a schematic configuration of a smartphone.

FIG. 51 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 51. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 51 via power supply lines partially indicated by dashed lines in the drawing. The auxiliary controller 919 causes, for example, required minimum functions of the smartphone 900 to be operated in a sleep mode.

In the smartphone 900 shown in FIG. 51, the control unit 150 described with reference to FIG. 5 may be mounted on the wireless communication interface 913. At least some of the functions may be mounted on the processor 901 or the auxiliary controller 919. For example, saving radio resources by grouping can reduce the power consumption of the battery 918.

The smartphone 900 may operate as a wireless access point (software AP) when the processor 901 performs an access point function at an application level. The wireless communication interface 913 may have the wireless access point function.

<13-2. Second Application Example>

Figure 52:
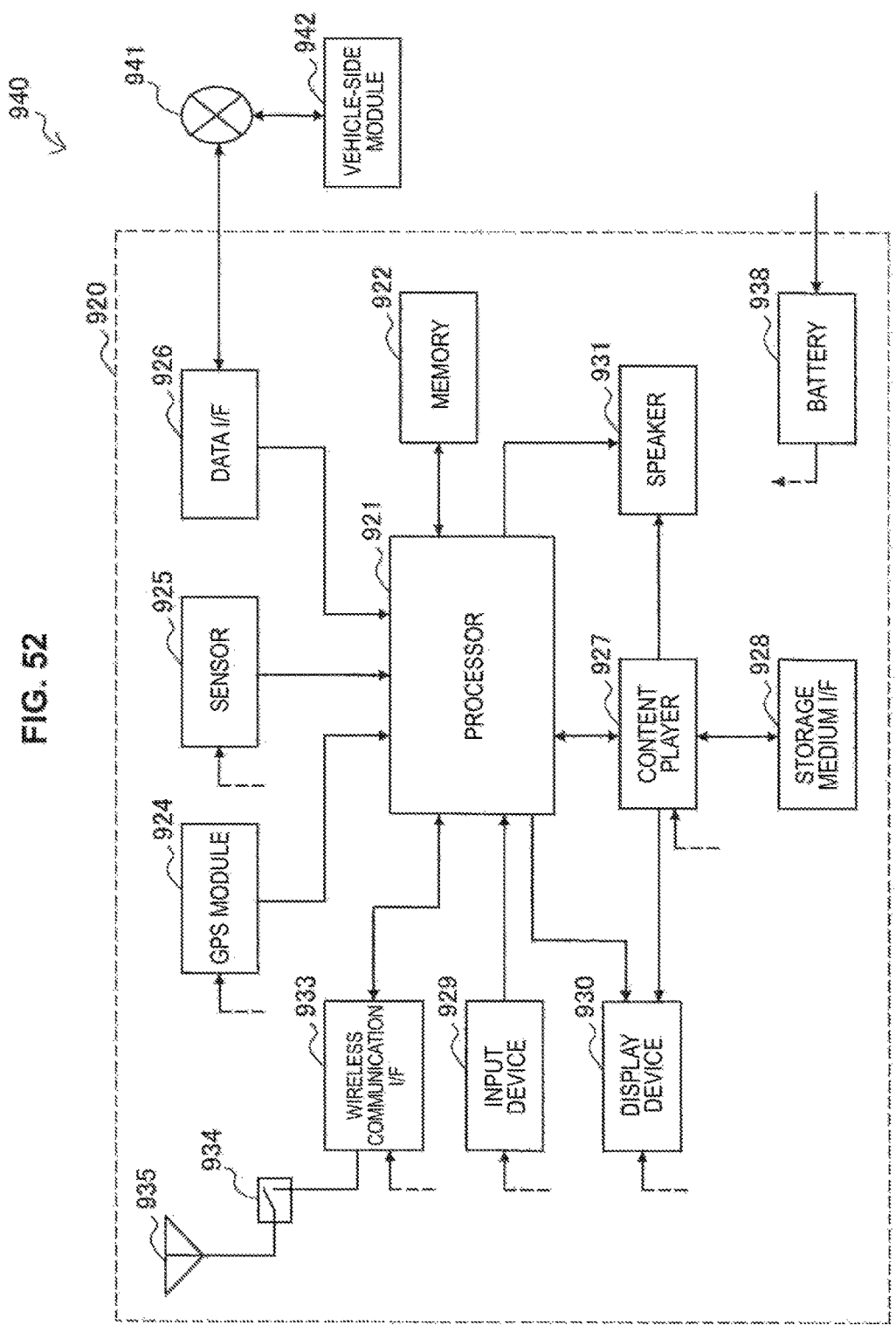
FIG. 52 is a block diagram showing an example of a schematic configuration of a car navigation device.

FIG. 52 is a block diagram showing an example of a schematic configuration of a car navigation apparatus 920 to which the technology of the present disclosure can be applied. The car navigation apparatus 920 includes a processor 921, a memory 922, a global positioning system (OPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support, another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 52. In this case, the antenna switch 934 may be omitted from the configuration of the car navigation apparatus 920.

The battery 938 supplies electric power to each of the blocks of the car navigation apparatus 920 shown in FIG. 52 via power supply lines partially indicated by dashed lines in the drawing. In addition, the battery 938 accumulates electric power supplied from the vehicle.

In the car navigation apparatus 920 shown in FIG. 52, the control unit 150 described with reference to FIG. 5 may be mounted on the wireless communication interface 933. At least some of the functions may be mounted on the processor 921.

The wireless communication interface 933 may operate as the above-described information processing device 100 to provide wireless connection to a terminal carried by a user in a vehicle.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or Failure information and outputs the generated data to the in-vehicle network 941.

<13-3. Third Application Example>

Figure 53:
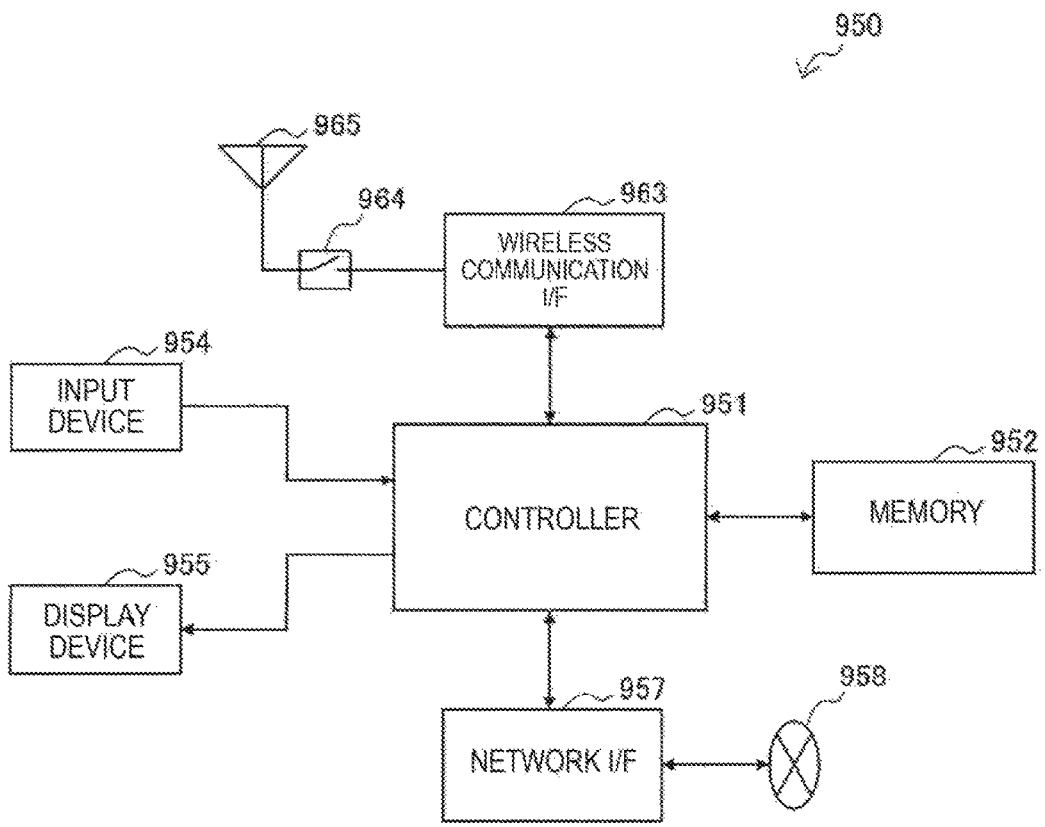
FIG. 53 is a block diagram showing an example of a schematic configuration of a wireless access point.

FIG. 53 is a block diagram showing an example of a schematic configuration of a wireless access point 950 to which a technology related to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single or a plurality of antenna elements and is used for transmission and reception of wireless signals from the wireless communication interface 963.

In the wireless access point 950 shown in FIG. 53, the control unit 150 described with reference to FIG. 5 may be mounted on the wireless communication interface 963. At least some of the functions may be mounted on the controller 951.

The above-described embodiments are examples for embodying the present technology and have correspondence relations with factors in embodiments and specific inventive factors in the claims. Similarly, specific inventive factors in the claims and factors in embodiments of the present technology to which the same names as the specific inventive factors are given have correspondence relations. However, the present technology is not limited to the embodiments, but may be realized in various modification forms of the embodiments within the scope without departing from the gist of the present technology.

The processing orders described in the above-described embodiments may be ascertained as methods including the series of orders or may be ascertained as a program causing a computer to execute the series of orders or a recording medium storing the program. As the recording medium, for example, a compact disc (CD), a minidisc (MD), a digital versatile disc (DVD), a memory card, or a Blu-ray (registered trademark) disc can be used.

The advantageous effects described in the present specification are merely examples and are not limitative, and other advantageous effects may be achieved.

Additionally, the present technology may also be configured as below.

(1)

An information processing device including:

a control unit configured to perform control such that one packet detection condition is selected to be used from a plurality of packet detection conditions and one reception operation is selected to be performed from a plurality of reception operations in regard to a plurality of packets transmitted from another information processing device using wireless communication.

(2)

The information processing device according to (1), wherein the control unit selects a correlator to be applied based on a reception signal strength of an incoming packet and sets a condition that an output of the selected correlator be great on the basis of a detection threshold as the packet detection condition.

(3)

The information processing device according to (1), wherein the control unit selects a detection threshold of a correlator output to be applied based on a reception signal strength of an incoming packet and sets a condition that the correlator output be great on the basis of the selected detection threshold as the packet detection condition.

(4)

The information processing device according to (1), wherein, when a plurality of correlators in which detection thresholds in antenna input conversion are different are disposed in parallel, the control unit sets a condition that one of the correlators be great on the basis of the corresponding detection threshold as the packet detection condition.

(5)

The information processing device according to any of (1) to (4), wherein, when information regarding an identifier for identifying a network is present in a specific field subsequent to a preamble of an incoming packet and the identifier is different from an identifier of a network to which the information processing device belongs despite satisfaction of the packet detection condition, the control unit stops reception of the packet and returns to a waiting state.

(6)

The information processing device according to (1), further including:

one or more preamble correlators, wherein the control unit sets a condition that a correlator output in antenna input conversion be great on the basis of a detection threshold specified by content of a specific field subsequent to a preamble after tentative detection in each correlator as the packet detection condition.

(7)

The information processing device according to (6), wherein the control unit uses a more relaxed condition than the packet detection conditions as a preamble detection condition in the tentative detection.

(8)

The information processing device according to (6) or (7), wherein the control unit stops subsequent reception when the packet detection condition is not satisfied after the tentative detection.

(9)

The information processing device according to any of (6) to (8), wherein the content of the specific field indicates a packet detection condition of a signal including the specific field.

(10)

The information processing device according to (6) or (7), wherein, when information regarding an identifier for identifying a network is present in the specific field and the identifier is different from an identifier of a network to which the information processing device belongs despite satisfaction of the packet detection condition, the control unit stops reception of the packet and returns to a waiting state.

(11)

The information processing device according to (6) or (7), wherein, when information regarding an identifier for identifying a network is present in the specific field and the identifier is identical to an identifier of a network to which the information processing device belongs despite non-satisfaction of the packet detection condition, the control unit continues a process of receiving the packet.

(12)

The information processing device according to (1), wherein, when the packet detection condition is not satisfied and reception power strength of the plurality of packets is not greater than an energy detection threshold of carrier sense, the control unit returns to a waiting state and treats a wireless state as a vacant state.

(13)

The information processing device according to (1), wherein, when the packet detection condition is not satisfied and reception power strength of the plurality of packets is greater than an energy detection threshold of carrier sense, the control unit prohibits transmission from the information processing device during a continuity period of the plurality of packets.

(14)

The information processing device according to (13), wherein, when a frame which is destined for the information processing device and requests a reply is received, the control unit transmits the reply.

(15)

The information processing device according to any of (1) to (14), wherein the control unit uses the packet detection condition in which a condition is most relaxed until a connection process with the other information processing device is completed.

(16)

The information processing device according to (1), wherein the control unit decides the plurality of packet detection conditions and physical header selection conditions corresponding to the packet detection conditions based on communication quality of communication with the other information processing device.

(17)

The information processing device according to (16), wherein the control unit performs control such that the plurality of packet detection conditions and the selection conditions are transmitted to the other information processing device using wireless communication.

(18)

The information processing device according to (17), wherein the control unit performs control such that an identifier for identifying a network to which the information processing device belongs is transmitted to the other information processing device using wireless communication.

(19)

The information processing device according to (1), wherein the control unit decides the plurality of packet detection conditions and physical header selection conditions corresponding to the packet detection conditions based on information described in a packet transmitted from the other information processing device.

(20)

The information processing device according to any of (1) to (19), wherein, when a packet which is destined for the information processing device and is received requests an instant reply, the control unit adds the same kind of physical header as the packet and transmits the reply.

REFERENCE SIGNS LIST

10, 50 communication system.
100 to 104, 200, 201 information processing device
110 data processing unit
120 transmission processing unit
130 modulation and demodulation unit
140 wireless interface unit
141 antenna
150 control unit
160 memory
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation apparatus
921 processor
922 memory
924 GPS module
925 sensor
926 data interface
927 content player
928 storage medium interface
929 input device
930 display device
931 speaker
933 wireless communication interface
934 antenna switch
935 antenna 938 battery
941 in-vehicle network
942 vehicle-side module
950 wireless access point
951 controller
952 memory
954 input device
955 display device
957 network interface
958 wired communication network
963 wireless communication interface
964 antenna switch
965 antenna

The invention claimed is:

1. An information processing device comprising:
a memory configured to have instructions stored therein; and
circuitry that in response to executing the instruction is configured to select a packet detection condition to be used from a plurality of packet detection conditions and select a reception operation to be performed from a plurality of reception operations in regard to a plurality of packets transmitted from another information processing device using wireless communication based on an information regarding an identifier, that is present in a specific field of a physical header subsequent to a preamble and identifies a self-basic service set (BSS) of an incoming packet, and is compatible with devices that select the reception operation based on the specific field and legacy devices that do not select the reception operation based on the specific field.

2. The information processing device according to claim 1,
wherein the circuitry is further configured to select a correlator to be applied based on a reception signal strength of an incoming packet and sets a condition that an output of the selected correlator be great on the basis of a detection threshold as the packet detection condition.

3. The information processing device according to claim 1,
wherein the circuitry is further configured to select a detection threshold of a correlator output to be applied based on a reception signal strength of an incoming packet and sets a condition that the correlator output be great on the basis of the selected detection threshold as the packet detection condition.

4. The information processing device according to claim 1,
wherein, when a plurality of correlators in which detection thresholds in antenna input conversion are different are disposed in parallel, the circuitry is further configured to set a condition that one of the correlators be great on the basis of the corresponding detection threshold as the packet detection condition.

5. The information processing device according to claim 1,
wherein, when the identifier is different from an identifier of a network to which the information processing device belongs despite satisfaction of the packet detection condition, the circuitry is further configured to stop reception of the packet and returns to a waiting state.

6. The information processing device according to claim 1, further comprising:
one or more preamble correlators,
wherein the circuitry is further configured to set a condition that a correlator output in antenna input conversion be great on the basis of a detection threshold specified by content of a specific field subsequent to a preamble after tentative detection in each correlator as the packet detection condition.

7. The information processing device according to claim 6,
wherein the circuitry is further configured to use a more relaxed condition than the packet detection conditions as a preamble detection condition in the tentative detection.

8. The information processing device according to claim 6,
wherein the circuitry is further configured to stop subsequent reception when the packet detection condition is not satisfied after the tentative detection.

9. The information processing device according to claim 6,
wherein the content of the specific field indicates a packet detection condition of a signal including the specific field.

10. The information processing device according to claim 6,
wherein, when information regarding an identifier for identifying a network is present in the specific field and the identifier is different from an identifier of a network to which the information processing device belongs despite satisfaction of the packet detection condition, the circuitry is further configured to stop reception of the packet and returns to a waiting state.

11. The information processing device according to claim 6,
wherein, when information regarding an identifier for identifying a network is present in the specific field and the identifier is identical to an identifier of a network to which the information processing device belongs despite non-satisfaction of the packet detection condition, the circuitry is further configured to continue a process of receiving the packet.

12. The information processing device according to claim 1,
wherein, when the packet detection condition is not satisfied and reception power strength of the plurality of packets is not greater than an energy detection threshold of carrier sense, the circuitry is further configured to return to a waiting state and treats a wireless state as a vacant state.

13. The information processing device according to claim 1,
wherein, when the packet detection condition is not satisfied and reception power strength of the plurality of packets is greater than an energy detection threshold of carrier sense, the circuitry is further configured to prohibit transmission from the information processing device during a continuity period of the plurality of packets.

14. The information processing device according to claim 13,
wherein, when a frame which is destined for the information processing device and requests a reply is received, the circuitry is further configured to transmit the reply.

15. The information processing device according to claim 1,
wherein the circuitry is further configured to use the packet detection condition in which a condition is most relaxed until a connection process with the other information processing device is completed.

16. The information processing device according to claim 1,
wherein the circuitry is further configured to decide the plurality of packet detection conditions and physical header selection conditions corresponding to the packet detection conditions based on communication quality of communication with the other information processing device.

17. The information processing device according to claim 16,
wherein the circuitry is further configured to transmit the plurality of packet detection conditions and the selection conditions to the other information processing device using wireless communication.

18. The information processing device according to claim 17,
wherein the circuitry is further configured to transmit an identifier for identifying a network to which the information processing device belongs to the other information processing device using wireless communication.

19. The information processing device according to claim 1,
wherein the circuitry is further configured to decide the plurality of packet detection conditions and physical header selection conditions corresponding to the packet detection conditions based on information described in a packet transmitted from the other information processing device.

20. The information processing device according to claim 1,
wherein, when a packet which is destined for the information processing device and is received requests an instant reply, the circuitry is further configured to add the same kind of physical header as the packet and transmits the reply.

* * * * *